United States Patent
Tazume

(10) Patent No.: US 12,060,225 B2
(45) Date of Patent: Aug. 13, 2024

(54) CONTROL DEVICE, VEHICLE, SYSTEM, AND METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 802 days.

(21) Appl. No.: 17/263,692

(22) PCT Filed: Sep. 26, 2019

(86) PCT No.: PCT/JP2019/038011
§ 371 (c)(1),
(2) Date: Jan. 27, 2021

(87) PCT Pub. No.: WO2021/059458
PCT Pub. Date: Apr. 1, 2021

(65) Prior Publication Data
US 2021/0292090 A1    Sep. 23, 2021

(51) Int. Cl.
*G08G 1/00* (2006.01)
*B65G 1/137* (2006.01)
(Continued)

(52) U.S. Cl.
CPC ......... *B65G 1/1373* (2013.01); *G05D 1/0291* (2013.01); *G06Q 10/0631* (2013.01); *G06Q 10/087* (2013.01)

(58) Field of Classification Search
CPC .. B65G 1/1373; G05D 1/0291; G05D 1/0297; G05D 1/0216; G05D 1/0251; G06Q 10/0631; G06Q 10/087; G08G 1/00
See application file for complete search history.

(56) References Cited

U.S. PATENT DOCUMENTS 4,926,544 A * 5/1990 Koyanagi ............ G05D 1/0297
29/714
9,120,622 B1 * 9/2015 Elazary .................... B66F 9/07
(Continued)

FOREIGN PATENT DOCUMENTS

| JP | 8-44429 A | 2/1996 |
|----|-----------|--------|
| JP | 2019-96126 A | 6/2019 |
| WO | 2015/052825 A1 | 4/2015 |

*Primary Examiner* — Patrick H Mackey
(74) *Attorney, Agent, or Firm* — Sughrue Mion, PLLC

(57) ABSTRACT

A control device (500) includes a selector (550) that selects one of a first vehicle and a second vehicle as a remaining vehicle that stores a first article and a second article and that remains at a receiving location where the first article and the second article are to be received, and selects another of the first vehicle and the second vehicle as a departing vehicle that departs from the receiving location, when the second vehicle storing the second article arrives at the receiving location while the first vehicle storing the first article stays at the receiving location. Additionally, the control device (500) includes a storage controller (560) that identifies the first article or the second article stored in the selected departing vehicle as a transfer article to be transferred from the departing vehicle to the remaining vehicle, and causes the identified transfer article to be stored in the remaining vehicle. Furthermore, the control device (500) includes a movement controller (540) that causes the departing vehicle to depart from the receiving location when the transfer article is stored in the remaining vehicle.

20 Claims, 32 Drawing Sheets

(51) Int. Cl.
*G05D 1/00* (2006.01)
*G06Q 10/0631* (2023.01)
*G06Q 10/087* (2023.01)

(56) References Cited

U.S. PATENT DOCUMENTS

| | | | |
|---|---|---|---|
| 9,139,363 B2* | 9/2015 | Lert | B65G 1/0492 |
| 9,147,175 B2* | 9/2015 | Schmidt | B66C 19/007 |
| 10,166,976 B2* | 1/2019 | Cheaz | B60W 30/00 |
| 10,894,664 B1* | 1/2021 | Brady | B65G 1/1378 |
| 11,551,554 B2* | 1/2023 | Woodrow | G08G 5/0013 |
| 2007/0185604 A1 | 8/2007 | Kobayashi | |
| 2016/0236869 A1* | 8/2016 | Kimura | B65G 1/1378 |
| 2019/0180238 A1 | 6/2019 | Ono | |
| 2021/0261333 A1* | 8/2021 | Lindley | G06Q 30/0202 |
| 2021/0389751 A1* | 12/2021 | Wise | B65G 1/1373 |

\* cited by examiner

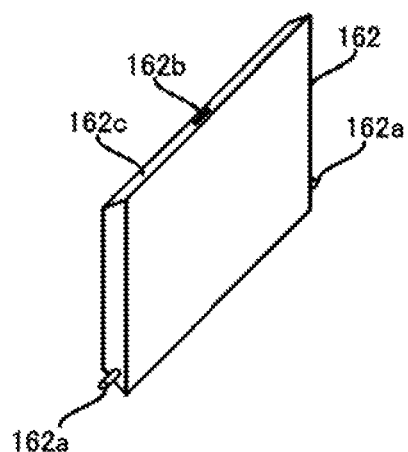

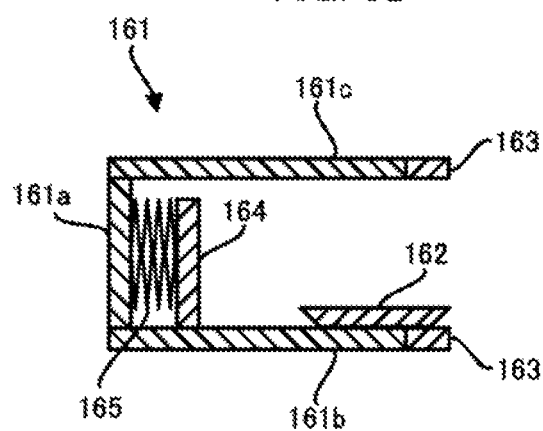

FIG. 8

ARTICLE TABLE

| ARTICLE ID | RECEIVING LOCATION | SPECIFIED TIME BLOCK | | CONTACT INFORMATION | STATE |
|---|---|---|---|---|---|
| | | START TIME | END TIME | | |
| G1 | P1 | 09:20 | 09:50 | 901@xxx.com | UNDELIVERED |
| G2 | P1 | 09:40 | 10:00 | 902@xxx.com | UNDELIVERED |
| G3 | P2 | 10:30 | 11:20 | 903@xxx.com | UNDELIVERED |
| G4 | P2 | 10:30 | 10:50 | 904@xxx.com | UNDELIVERED |
| G5 | P3 | 11:10 | 11:20 | 905@xxx.com | UNDELIVERED |
| ... | ... | ... | ... | ... | ... |

FIG. 9

SCHEDULE TABLE

| VEHICLE | RECEIVING LOCATION | MOVEMENT START TIME | SCHEDULED ARRIVAL TIME | SCHEDULED DEPARTURE TIME | ARTICLE ID | STATE |
|---|---|---|---|---|---|---|
| 100 | P1 | 09:00 | 09:10 | 09:50 | G1 | NON-DEPARTED |
| 100 | P2 | 10:10 | 10:20 | 11:20 | G3 | NON-DEPARTED |
| 100 | P0 | 11:20 | 11:30 | - | - | NON-DEPARTED |
| 200 | P1 | 09:20 | 09:30 | 10:00 | G2 | NON-DEPARTED |
| 200 | P2 | 10:10 | 10:20 | 10:50 | G4 | NON-DEPARTED |
| 200 | P3 | 10:50 | 11:00 | 11:20 | G5 | NON-DEPARTED |
| 200 | P0 | 11:20 | 11:30 | - | - | NON-DEPARTED |

FIG. 10

| | FIRST VEHICLE | SECOND VEHICLE |
|---|---|---|
| 09:00 ~ 09:10 | MOVE | SECOND VEHICLE |
| 09:10 ~ 09:20 | MOVE | |
| 09:20 ~ 09:30 | FIRST RECEIVING LOCATION (G1) | MOVE |
| 09:30 ~ 09:40 | FIRST RECEIVING LOCATION (G1) | FIRST RECEIVING LOCATION (G2) |
| 09:40 ~ 09:50 | FIRST RECEIVING LOCATION (G1) | FIRST RECEIVING LOCATION (G2) |
| 09:50 ~ 10:00 | MOVE | FIRST RECEIVING LOCATION (G2) |
| 10:00 ~ 10:10 | MOVE | FIRST RECEIVING LOCATION (G2) |
| 10:10 ~ 10:20 | MOVE | MOVE |
| 10:20 ~ 10:30 | SECOND RECEIVING LOCATION (G3) | MOVE |
| 10:30 ~ 10:40 | SECOND RECEIVING LOCATION (G3) | SECOND RECEIVING LOCATION (G4) |
| 10:40 ~ 10:50 | SECOND RECEIVING LOCATION (G3) | SECOND RECEIVING LOCATION (G4) |
| 10:50 ~ 11:00 | SECOND RECEIVING LOCATION (G3) | MOVE |
| 11:00 ~ 11:10 | MOVE | THIRD RECEIVING LOCATION (G5) |
| 11:10 ~ 11:20 | MOVE | THIRD RECEIVING LOCATION (G5) |
| 11:20 ~ 11:30 | OFFICE | MOVE |
| 11:30 ~ 11:40 | OFFICE | OFFICE |

FIG. 11

STORAGE BOX TABLE

| VEHICLE | BOX ID | DISPOSAL POSITION | ARTICLE ID | PASSWORD | TRANSFER FLAG |
|---|---|---|---|---|---|
| 100 | B01 | LEFT, ROW 1 COLUMN 1 | G1 | password1 | TRUE |
| 100 | B02 | LEFT, ROW 1 COLUMN 2 | -- | NULL | false |
| 100 | B03 | LEFT, ROW 2 COLUMN 1 | G3 | password3 | false |
| 100 | B04 | LEFT, ROW 2 COLUMN 2 | -- | NULL | false |
| ... | ... | ... | ... | ... | ... |
| 100 | B11 | RIGHT, ROW 1 COLUMN 1 | -- | NULL | false |
| ... | ... | ... | ... | ... | ... |
| 200 | B01 | LEFT, ROW 1 COLUMN 1 | -- | NULL | false |
| ... | ... | ... | ... | ... | ... |
| 200 | B11 | RIGHT, ROW 1 COLUMN 1 | -- | NULL | false |
| 200 | B12 | RIGHT, ROW 1 COLUMN 2 | G2 | password2 | false |
| 200 | B13 | RIGHT, ROW 2 COLUMN 1 | -- | NULL | false |
| 200 | B14 | RIGHT, ROW 2 COLUMN 2 | G4 | password4 | TRUE |
| 200 | B15 | RIGHT, ROW 3 COLUMN 1 | G5 | password5 | false |
| ... | ... | ... | ... | ... | ... |

FIG. 17

SCHEDULE TABLE

| VEHICLE | RECEIVING LOCATION | MOVEMENT START TIME | SCHEDULED ARRIVAL TIME | SCHEDULED DEPARTURE TIME | ARTICLE ID | STATE |
|---|---|---|---|---|---|---|
| 100 | P1 | 09:00 | 09:10 | 09:40 | - | ARRIVED |
| 100 | P2 | 10:10 | 10:20 | 11:20 | G3, G4 | NON-DEPARTED |
| 100 | P0 | 11:20 | 11:30 | - | - | NON-DEPARTED |
| 200 | P1 | 09:20 | 09:30 | 10:00 | G1, G2 | ARRIVED |
| 200 | P3 | 10:50 | 11:00 | 11:20 | G5 | NON-DEPARTED |
| 200 | P0 | 11:20 | 11:30 | - | - | NON-DEPARTED |

FIG. 18

| Time | FIRST VEHICLE | SECOND VEHICLE |
|---|---|---|
| 09:00 ~ 09:10 | MOVE | |
| 09:10 ~ 09:20 | FIRST RECEIVING LOCATION (G1) | |
| 09:20 ~ 09:30 | FIRST RECEIVING LOCATION (G1) | MOVE |
| 09:30 ~ 09:40 | FIRST RECEIVING LOCATION (G1) | FIRST RECEIVING LOCATION (G2) |
| 09:40 ~ 09:50 | MOVE | FIRST RECEIVING LOCATION (G1, G2) |
| 09:50 ~ 10:00 | MOVE | FIRST RECEIVING LOCATION (G1, G2) |
| 10:00 ~ 10:10 | MOVE | FIRST RECEIVING LOCATION (G1, G2) |
| 10:10 ~ 10:20 | SECOND RECEIVING LOCATION (G3, G4) | |
| 10:20 ~ 10:30 | SECOND RECEIVING LOCATION (G3, G4) | |
| 10:30 ~ 10:40 | SECOND RECEIVING LOCATION (G3, G4) | |
| 10:40 ~ 10:50 | SECOND RECEIVING LOCATION (G3, G4) | MOVE |
| 10:50 ~ 11:00 | SECOND RECEIVING LOCATION (G3, G4) | MOVE |
| 11:00 ~ 11:10 | MOVE | THIRD RECEIVING LOCATION (G5) |
| 11:10 ~ 11:20 | MOVE | THIRD RECEIVING LOCATION (G5) |
| 11:20 ~ 11:30 | OFFICE | MOVE |
| 11:30 ~ 11:40 | OFFICE | OFFICE |

FIG. 19

| | FIRST VEHICLE | SECOND VEHICLE |
|---|---|---|
| 09:00 ~ 09:10 | MOVE | |
| 09:10 ~ 09:20 | MOVE | |
| 09:20 ~ 09:30 | FIRST RECEIVING LOCATION (G1) | MOVE |
| 09:30 ~ 09:40 | FIRST RECEIVING LOCATION (G1) | MOVE |
| 09:40 ~ 09:50 | FIRST RECEIVING LOCATION (G1) | FIRST RECEIVING LOCATION (G2) |
| 09:50 ~ 10:00 | FIRST RECEIVING LOCATION (G1) | FIRST RECEIVING LOCATION (G2) |
| 10:00 ~ 10:10 | FIRST RECEIVING LOCATION (G1) | FIRST RECEIVING LOCATION (G2) |
| 10:10 ~ 10:20 | MOVE | FIRST RECEIVING LOCATION (G2) |
| 10:20 ~ 10:30 | SECOND RECEIVING LOCATION (G3) | MOVE |
| 10:30 ~ 10:40 | SECOND RECEIVING LOCATION (G3) | SECOND RECEIVING LOCATION (G4) |
| 10:40 ~ 10:50 | SECOND RECEIVING LOCATION (G3) | SECOND RECEIVING LOCATION (G4) |
| 10:50 ~ 11:00 | SECOND RECEIVING LOCATION (G3) | SECOND RECEIVING LOCATION (G4) |
| 11:00 ~ 11:10 | MOVE | SECOND RECEIVING LOCATION (G4) |
| 11:10 ~ 11:20 | MOVE | SECOND RECEIVING LOCATION (G4) |
| 11:20 ~ 11:30 | MOVE | MOVE |
| 11:30 ~ 11:40 | OFFICE | OFFICE |

FIG. 20

| Time | FIRST VEHICLE | SECOND VEHICLE |
|---|---|---|
| 09:00 ~ 09:10 | MOVE | |
| 09:10 ~ 09:20 | FIRST RECEIVING LOCATION (G1) | |
| 09:20 ~ 09:30 | FIRST RECEIVING LOCATION (G1) | MOVE |
| 09:30 ~ 09:40 | FIRST RECEIVING LOCATION (G1) | FIRST RECEIVING LOCATION (G2) |
| 09:40 ~ 09:50 | FIRST RECEIVING LOCATION (G1) | FIRST RECEIVING LOCATION (G2) |
| 09:50 ~ 10:00 | FIRST RECEIVING LOCATION (G1) | FIRST RECEIVING LOCATION (G2) |
| 10:00 ~ 10:10 | MOVE | FIRST RECEIVING LOCATION (G2) |
| 10:10 ~ 10:20 | MOVE | FIRST RECEIVING LOCATION (G2) |
| 10:20 ~ 10:30 | SECOND RECEIVING LOCATION (G3) | MOVE |
| 10:30 ~ 10:40 | SECOND RECEIVING LOCATION (G3) | SECOND RECEIVING LOCATION (G4) |
| 10:40 ~ 10:50 | SECOND RECEIVING LOCATION (G3) | SECOND RECEIVING LOCATION (G4) |
| 10:50 ~ 11:00 | SECOND RECEIVING LOCATION (G3) | SECOND RECEIVING LOCATION (G4) |
| 11:00 ~ 11:10 | SECOND RECEIVING LOCATION (G3) | SECOND RECEIVING LOCATION (G4) |
| 11:10 ~ 11:20 | SECOND RECEIVING LOCATION (G3) | SECOND RECEIVING LOCATION (G4) |
| 11:20 ~ 11:30 | MOVE | MOVE |
| 11:30 ~ 11:40 | OFFICE | OFFICE |

FIG. 21

| | FIRST VEHICLE | SECOND VEHICLE |
|---|---|---|
| 09:00 ~ 09:10 | MOVE | |
| 09:10 ~ 09:20 | MOVE | MOVE |
| 09:20 ~ 09:30 | FIRST RECEIVING LOCATION (G1) | MOVE |
| 09:30 ~ 09:40 | FIRST RECEIVING LOCATION (G1) | FIRST RECEIVING LOCATION (G2) |
| 09:40 ~ 09:50 | FIRST RECEIVING LOCATION (G1) | FIRST RECEIVING LOCATION (G2) |
| 09:50 ~ 10:00 | MOVE | FIRST RECEIVING LOCATION (G2) |
| 10:00 ~ 10:10 | SECOND RECEIVING LOCATION (G3) | MOVE |
| 10:10 ~ 10:20 | SECOND RECEIVING LOCATION (G3) | SECOND RECEIVING LOCATION (G4) |
| 10:20 ~ 10:30 | SECOND RECEIVING LOCATION (G3) | SECOND RECEIVING LOCATION (G4) |
| 10:30 ~ 10:40 | SECOND RECEIVING LOCATION (G3) | SECOND RECEIVING LOCATION (G4) |
| 10:40 ~ 10:50 | SECOND RECEIVING LOCATION (G3) | SECOND RECEIVING LOCATION (G4) |
| 10:50 ~ 11:00 | SECOND RECEIVING LOCATION (G3) | MOVE |
| 11:00 ~ 11:10 | SECOND RECEIVING LOCATION (G3) | THIRD RECEIVING LOCATION (G5) |
| 11:10 ~ 11:20 | SECOND RECEIVING LOCATION (G3) | THIRD RECEIVING LOCATION (G5) |
| 11:20 ~ 11:30 | MOVE | MOVE |
| 11:30 ~ 11:40 | OFFICE | OFFICE |

FIG. 22

| | FIRST VEHICLE | SECOND VEHICLE |
|---|---|---|
| 09:00 ~ 09:10 | MOVE | |
| 09:10 ~ 09:20 | FIRST RECEIVING LOCATION (G1) | |
| 09:20 ~ 09:30 | FIRST RECEIVING LOCATION (G1) | MOVE |
| 09:30 ~ 09:40 | FIRST RECEIVING LOCATION (G1) | FIRST RECEIVING LOCATION (G2) |
| 09:40 ~ 09:50 | MOVE | FIRST RECEIVING LOCATION (G1, G2) |
| 09:50 ~ 10:00 | SECOND RECEIVING LOCATION (G3, G4) | FIRST RECEIVING LOCATION (G1, G2) |
| 10:00 ~ 10:10 | SECOND RECEIVING LOCATION (G3, G4) | MOVE |
| 10:10 ~ 10:20 | SECOND RECEIVING LOCATION (G3, G4) | THIRD RECEIVING LOCATION (G5) |
| 10:20 ~ 10:30 | SECOND RECEIVING LOCATION (G3, G4) | THIRD RECEIVING LOCATION (G5) |
| 10:30 ~ 10:40 | SECOND RECEIVING LOCATION (G3, G4) | THIRD RECEIVING LOCATION (G5) |
| 10:40 ~ 10:50 | SECOND RECEIVING LOCATION (G3, G4) | THIRD RECEIVING LOCATION (G5) |
| 10:50 ~ 11:00 | SECOND RECEIVING LOCATION (G3, G4) | THIRD RECEIVING LOCATION (G5) |
| 11:00 ~ 11:10 | SECOND RECEIVING LOCATION (G3, G4) | THIRD RECEIVING LOCATION (G5) |
| 11:10 ~ 11:20 | SECOND RECEIVING LOCATION (G3, G4) | THIRD RECEIVING LOCATION (G5) |
| 11:20 ~ 11:30 | MOVE | MOVE |
| 11:30 ~ 11:40 | OFFICE | OFFICE |

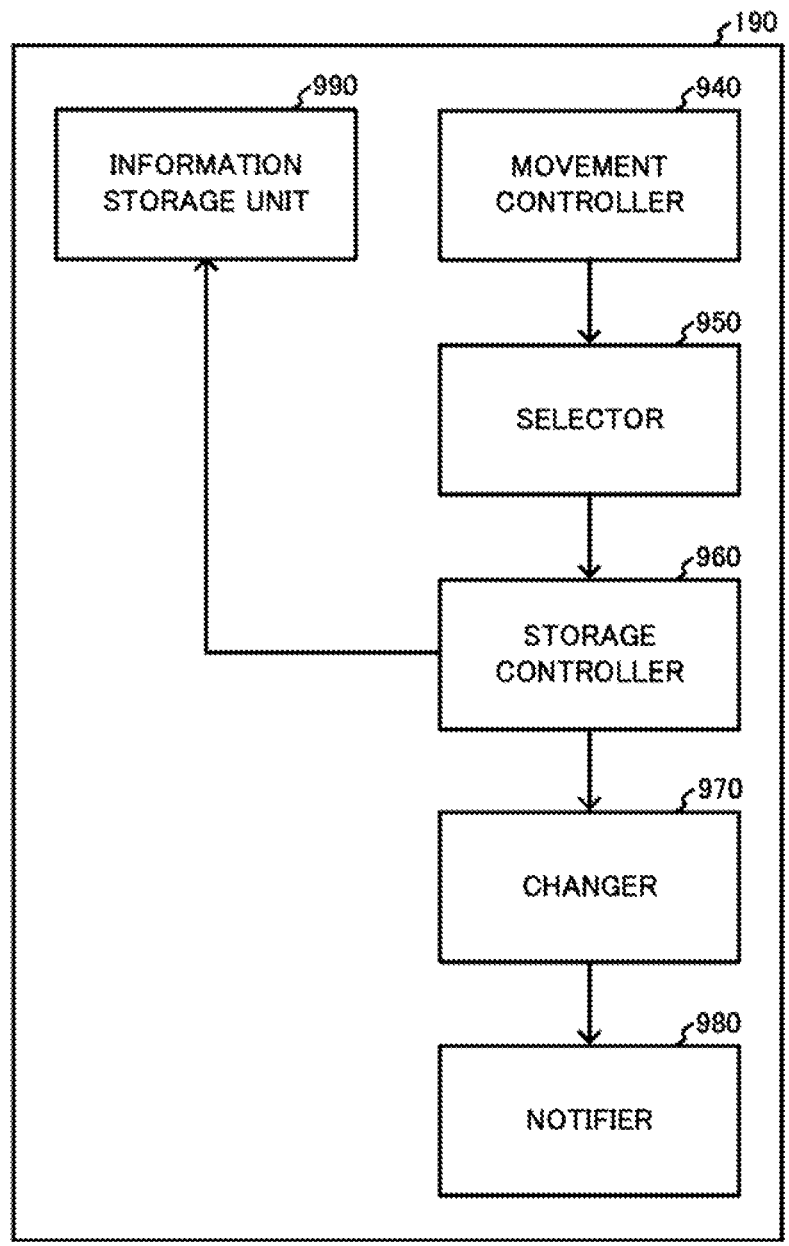

CONTROL DEVICE, VEHICLE, SYSTEM, AND METHOD

CROSS REFERENCE TO RELATED APPLICATIONS

This application is a National Stage of International Application No. PCT/JP2019/038011 filed Sep. 26, 2019.

TECHNICAL FIELD

The present disclosure relates to a control device, a vehicle, a system, and a method.

BACKGROUND ART

In the background art, a system is known that, for example, transfers an article, among a plurality of vehicles that transport articles, at a relay point prior to the receiving location of the article (for example, Patent Literature 1).

CITATION LIST

Patent Literature

Patent Literature 1: Unexamined Japanese Patent Application Publication No. H08-44429

SUMMARY OF INVENTION

Technical Problem

However, in the system of Patent Literature 1, when a plurality of vehicles arrives at a receiving location, the plurality of vehicles stay at that receiving location until the article arrives, for example. Consequently, the receiving location is occupied by the plurality of vehicles, which may result in a decrease in the use efficiency of the receiving location.

The present disclosure is made with the view of the above situation, and an objective of the present disclosure is to provide a control device, a vehicle, a system, and a method whereby the decrease in the use efficiency of the receiving location can be suppressed.

Solution to Problem

A control device according to a first aspect of the present disclosure that achieves the objective described above includes:
- a selector that selects one of a first vehicle and a second vehicle as a remaining vehicle that stores a first article and a second article and that remains at a receiving location where the first article and the second article are to be received, and selects another of the first vehicle and the second vehicle as a departing vehicle that departs from the receiving location, when the second vehicle storing the second article arrives at the receiving location while the first vehicle storing the first article stays at the receiving location;
- a storage controller that identifies the first article or the second article stored in the selected departing vehicle as a transfer article to be transferred from the departing vehicle to the remaining vehicle, and causes the identified transfer article to be stored in the remaining vehicle; and
- a movement controller that causes the departing vehicle to depart from the receiving location when the transfer article is stored in the remaining vehicle.

Advantageous Effects of Invention

According to the control device, the vehicle, the system, and the method of the present disclosure, the decrease in the use efficiency of the receiving location can be suppressed.

BRIEF DESCRIPTION OF DRAWINGS

FIG. 3C is a perspective view illustrating a door of the storage box:

FIG. 3D is an end view illustrating the door of the storage box, in an inward open state:

FIG. 8 is a drawing illustrating an example of an article table stored in the control device of the delivery system:

FIG. 9 is a drawing illustrating an example of schedule table at generation, stored in the control device of the delivery system:

FIG. 10 is a drawing illustrating an example of schedules at generation for the first vehicle and the second vehicle according to the embodiment:

FIG. 11 is a drawing illustrating an example of a storage box table stored in the control device of the delivery system:

FIG. 17 is a drawing illustrating an example of a modified schedule table, stored in the control device of the delivery system:

FIG. 18 is a drawing illustrating an example of modified schedules for the first vehicle and the second vehicle according to the embodiment:

FIG. 19 is a drawing illustrating an example of schedules at generation for the first vehicle and the second vehicle according to Modified Example 1 of the embodiment;

FIG. 20 is a drawing illustrating an example of schedules at generation for the first vehicle and the second vehicle according to Modified Example 3 of the embodiment:

FIG. 21 is a drawing illustrating an example of corrected schedules for the first vehicle and the second vehicle according to Modified Example 5 of the embodiment:

FIG. 22 is a drawing illustrating an example of modified schedules for the first vehicle and the second vehicle according to Modified Example 5 of the embodiment:

FIG. 27 is a functional block drawing illustrating an example of the functions of the control device of the first vehicle.

DESCRIPTION OF EMBODIMENTS

Embodiments

Figure 1:
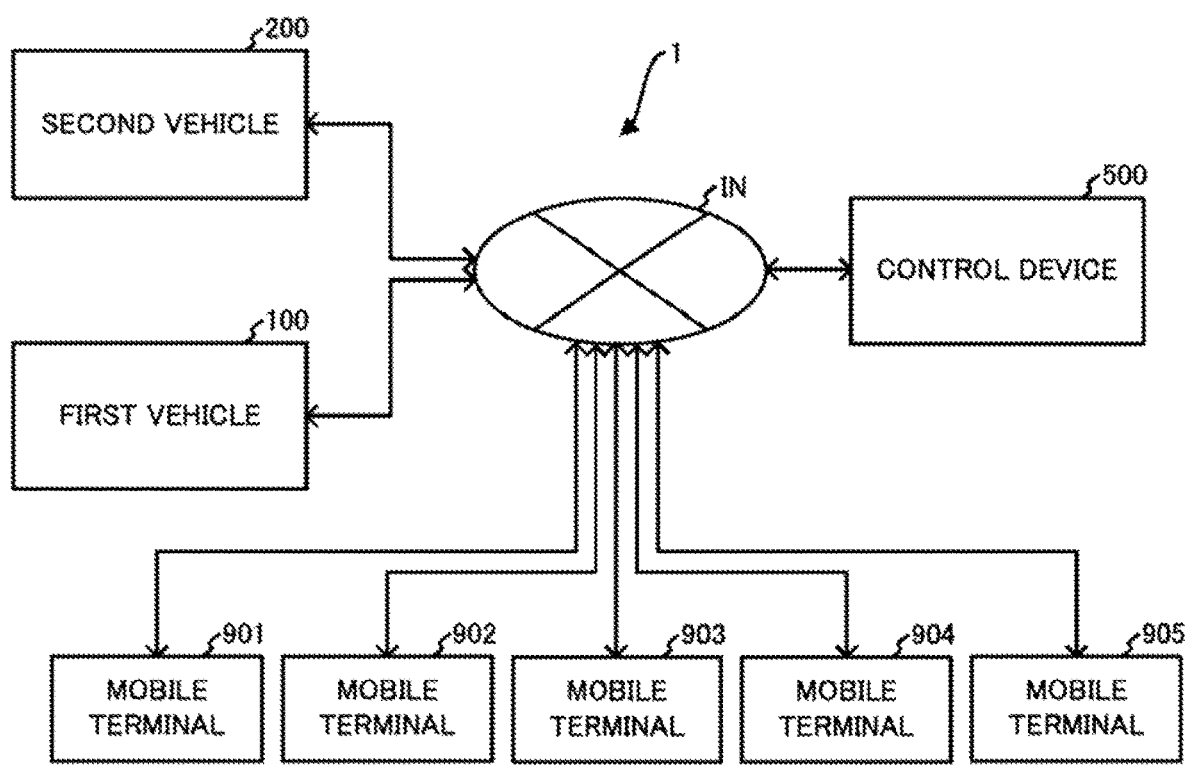
FIG. 1 is a system configuration drawing illustrating a configuration example of a delivery system according to an embodiment of the present disclosure.

Hereinafter, embodiments of the present disclosure are described while referencing the attached drawings.

A delivery system 1 according to an embodiment of the present disclosure includes a first vehicle 100 and a second vehicle 200 that move while storing articles, a control device 500 that controls the movements of the first vehicle 100 and the second vehicle 200, and mobile terminals 901 to 905 that are notified of a delivery state of the articles by the control device 500.

The first vehicle 100 and the second vehicle 200 have the same size, configuration, and functions. Therefore, in the following description, reference numerals, which correspond to the reference numerals used for the first vehicle 100, are used for the second vehicle 200 that has the same configuration as the first vehicle 100.

Figure 2:
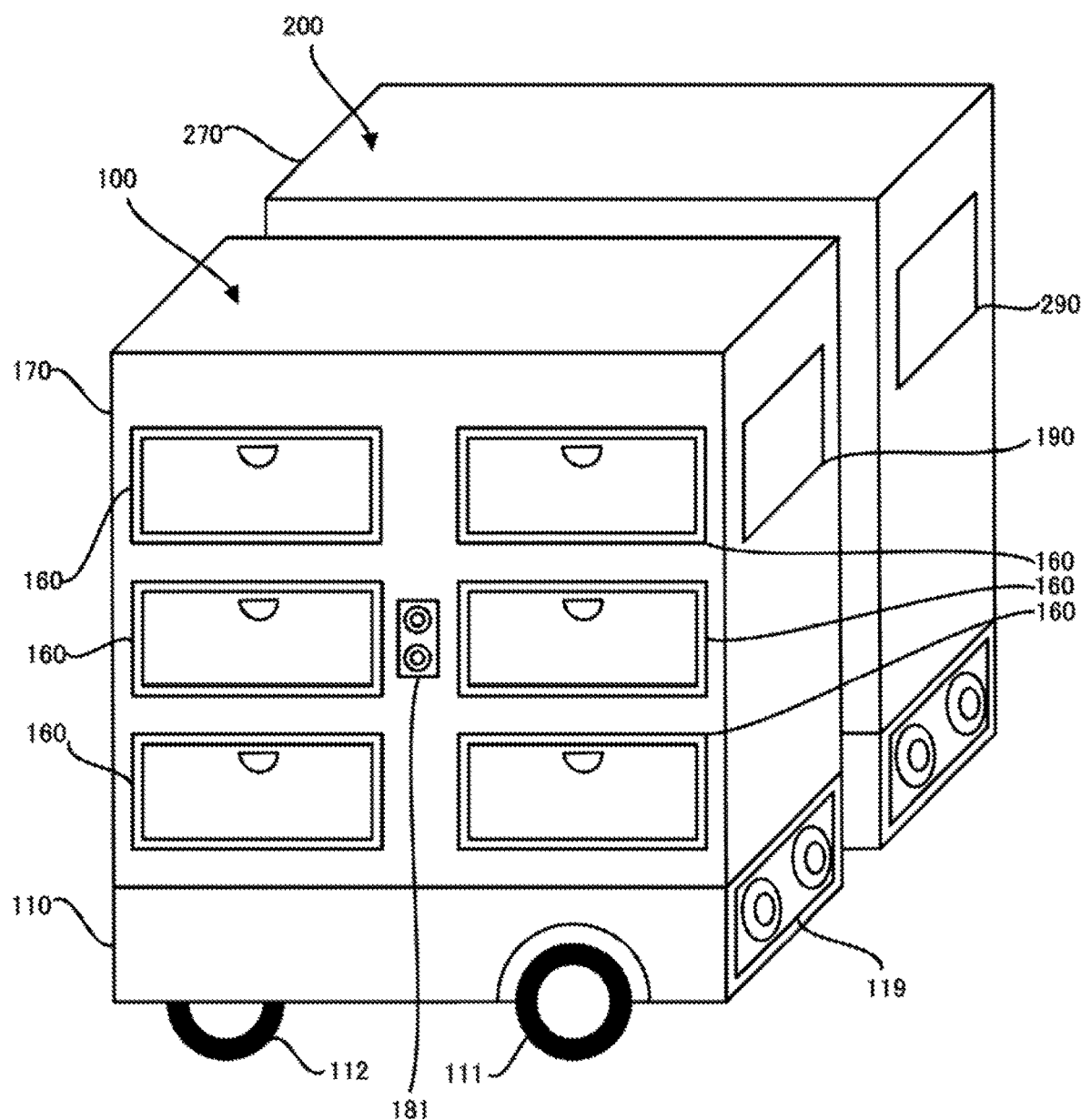
FIG. 2 is an appearance configuration drawing illustrating an example of the appearances of a first vehicle and a second vehicle according to the embodiment.

The first vehicle 100 is an unmanned ground vehicle that travels on the ground. As illustrated in FIG. 2, the first vehicle 100 includes a chassis 110 that is provided with a plurality of wheels including wheels 111 and 112, and a locker device 170 that has a cube shape and that is set on the chassis 110.

The chassis 110 includes an imaging device 119 that is set on the front surface of the chassis 110 and that has an optical axis that is directed in front of the chassis 110. In the present specification, a description is given in which directing the optical axis of an imaging device such as, for example, the imaging device 119, in a specific direction such as in front of the chassis 110 encompasses changing the optical axis such that at least a portion of a subject located in that specific direction is included in the imaging range of the imaging device.

The locker device 170 includes an imaging device 181 that is set on a right side surface of the locker device 170 and that has an optical axis that is directed in a direction that is a normal direction of the right side surface and is a direction toward the outside of the imaging device 181, and an imaging device 182 that is set on a left side surface of the locker device 170 and that has an optical axis that is directed in a direction that is a normal direction of the left side surface and is a direction toward the outside of the imaging device 182. Additionally, the locker device 170 includes a control device 190 that, on the basis of images output by each of the imaging devices 119, 181, and 182, drives a non-illustrated plurality of motors respectively installed in the plurality of wheels so as to travel while avoiding obstacles.

The locker device 170 includes, on each of the right side surface and the left side surface, a storage box 160 that is a box disposed so as to form a 3 row 2 column matrix and that is used to store a package. In the present embodiment, a description is given in which the first row is a topmost row, the third row is a bottommost row, the second row is a row between the first row and the third row, the first column is a front column, and the second column is a back column.

Figure 3A:
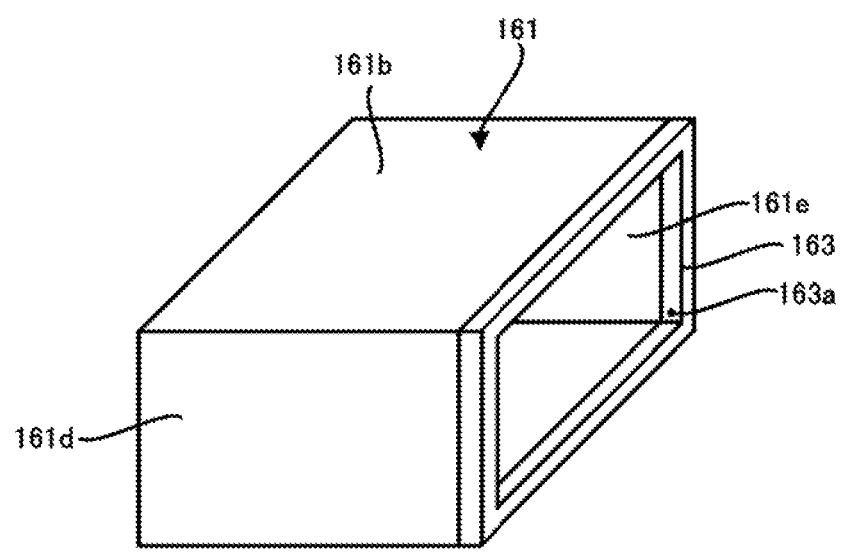
FIG. 3A is a perspective view illustrating a box body of a storage box.
Figure 3B:
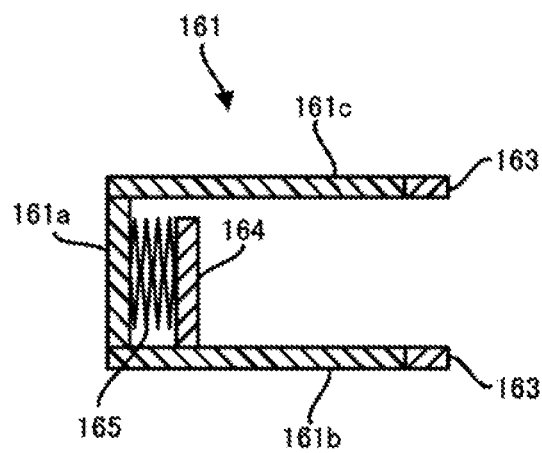
FIG. 3B is an end view illustrating the box body of the storage box.

As illustrated in FIGS. 3A and 3B, the storage box 160 includes box body 161 that is provided with a back plate 161a, a bottom plate 161b and a ceiling plate 161c, and a side plate 161d and a side plate 161e. These plates form an enclosed space that has an open front. The storage box 160 is set on the locker device 170 such that the bottom plate 161b is horizontal.

A door frame 163 such as illustrated in FIG. 3A is installed on the opening of the box body 161. Two shaft holes 163a are formed in the door frame 163. Two protrusions 162a protruding outward from the lower section of both side surfaces of a door 162 such as illustrated in FIG. 3C are inserted into the two shaft holes 163a. As a result, the door frame 163 axially holds the door 162 so as to be swingable inwardly, which is a direction from the opening toward the back plate 161a, and outwardly, which is a direction opposite that direction.

A non-illustrated motor is installed in the storage box 160. The non-illustrated motor causes the door 162 to swing by rotating, in accordance with a signal output from the control device 190, a non-illustrated gear formed on the protrusion 162a This motor changes the state of the door 162 to any state from an inwardly open state as illustrated in FIG. 3D in which the door 162 falls inward and the surface of the back side of the door 162 surface contacts the surface of the bottom plate 161b of the box body 161, through a closed state as illustrated in FIG. 3E in which the door is brought upright to close the opening, to an outwardly open state as illustrated in FIG. 3F in which the door 162 falls outward and the front side surface of the door 162 surface contacts the surface of the bottom plate 161b of the box body 161.

The door 162 includes, on a top surface 162c, a deadbolt 162b that is a bolt such as illustrated in FIG. 3C, and the door frame 163 includes, on an upper frame, a non-illustrated strike plate that is a seat for the deadbolt 162b.

The storage box 160 further includes a non-illustrated motor that, when the state of the door 162 is the closed state, locks the door 162 by inserting the deadbolt 162b into the strike plate in accordance with a signal output from the control device 190. The motor unlocks the door 162 by pulling the deadbolt 162b from the non-illustrated strike plate in accordance with a signal output from the control device 190.

Figure 3E:
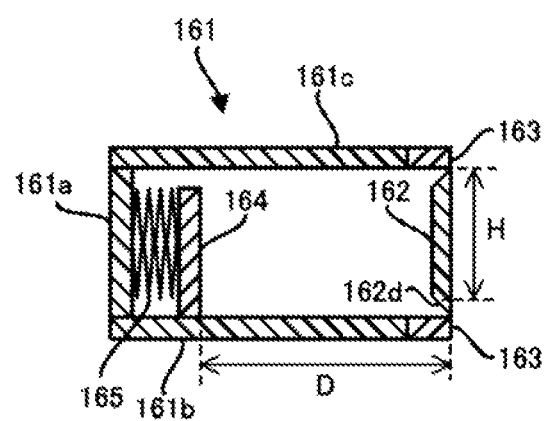
FIG. 3E is an end view illustrating the door of the storage box, in a closed state.
Figure 3F:
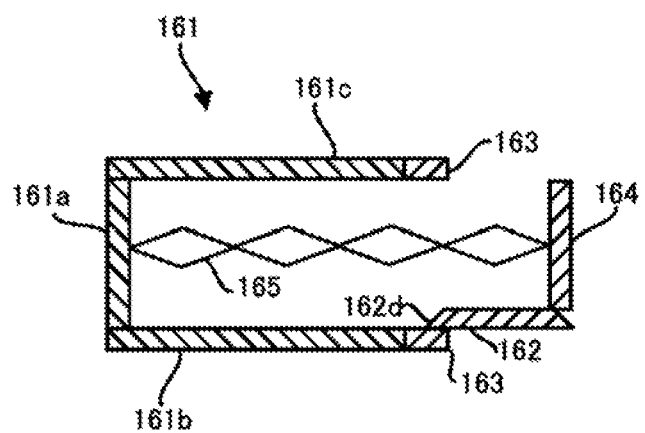
FIG. 3F is an end view illustrating the door of the storage box, in an outward open state.

One end of an expansion/contraction mechanism 165 such as illustrated in FIGS. 3B, 3D, and 3E is fixed to the back plate 161a of the box body 161. The other end of the expansion/contraction mechanism 165 is fixed to a slide plate 164 that is pushed by the expansion/contraction mechanism 165 to slide on the surface of the bottom plate 161b of the box body 161.

In the present embodiment, a description is given in which the expansion/contraction mechanism 165 is a lattice/grid-type expansion/contraction device in which a plurality of rhomboid lattices are combined in series, and the expansion/contraction mechanism 165 includes a non-illustrated screw that causes the expansion/contraction mechanism 165 to expand or contract by changing the distance between two opposing vertices of the rhomboids formed by the lattices. However, the present embodiment is not limited thereto, and any known expansion/contraction mechanism including, for example, an expansion/contraction mechanism in which a plurality of pantographs are combined in series, may be used as the expansion/contraction mechanism 165. Moreover, the expansion/contraction method is not limited to the screw method, and any known expansion/contraction method may be used including, for example, a hydraulic method.

Furthermore, a non-illustrated motor that rotates the screw of the expansion/contraction mechanism 165 is installed in the storage box 160. When the expansion/contraction mechanism 165 is contracted by this motor as illustrated in FIG. 3E to move the slide plate 164 farther inward than the door 162, a space enclosed by slide plate 164, the bottom plate 161b and the ceiling plate 161c, the slide plates 161d and 161e, and the door 162 is formed, and that space is used as storage space for storing an article.

As illustrated in FIG. 3E, a bottom surface 162d of the door 162 has a slope for which distance from the surface of the front side of the door 162 increases from the bottom toward the top of the door 162. As such, as illustrated in FIG. 3F, when the state of the door 162 is in the outwardly open state fallen outward, and the surface of the front side of the door 162 is in surface contact with the surface of the bottom plate 161b of the box body 161, the bottom surface 162d of the door 162 has a slope for which distance from the surface of the bottom plate 161b increases in the extension direction of the expansion/contraction mechanism 165.

As such, in a case in which an article is stored in the storage space and the door 162 is in the outwardly open state such as illustrated in FIG. 3F, when the expansion/contraction mechanism 165 is extended by the non-illustrated motor, the slide plate 164 is pushed by the expansion/contraction mechanism 165 and slides outward on the surface of the bottom plate 161b. Thereafter, the slide plate 164 is further pushed by the expansion/contraction mechanism 165 and further slides on the bottom surface 162d of the door 162 that is in the outwardly open state and, then, slides on the back surface of the door 162 to push the article stored in the storage space out of the box body 161.

When the expansion/contraction mechanism 165 is in a fully extended state in which the expansion/contraction mechanism 165 is fully extended, a length in the expansion/contraction direction of the expansion/contraction mechanism 165 is a value "D+2H", or greater, longer than a fully contracted state in which the expansion/contraction mechanism 165 is fully contracted. Note that the value "D" represents the depth of the storage space in the fully contracted state illustrated in FIG. 3E, and the value "H" represents the height of the door 162.

The length of the expansion/contraction mechanism 165 in the fully extended state is designed as described above because, as illustrated in FIG. 4, the article is transferred from the storage box 160 of the first vehicle 100 to a storage box 260 of the second vehicle 200 in a state in which the storage box 160 of the first vehicle 100 is made to directly face the storage box 260 of the second vehicle 200 separated a distance d that is shorter than the height H of the door 162.

That is, in order to transfer the article, the door 162 must be made to function as a bridge spanning between the storage box 160 and the storage box 260 by setting the state of the door 162 of the storage box 160 to the outwardly open state. Additionally, the state of the door 262 of the storage box 260 must be set to the inwardly open state so as not to prevent the door 162 from assuming the outwardly open state. Therefore, in order for the expansion/contraction mechanism 165 to cause the slide plate 164 to push the article stored in the storage box 160 to a position farther inside the storage box 260 than the door 162 and the door 262, the expansion/contraction mechanism 165 must extend the sum "D+2H", or greater, of the depth "D" of the storage space, the height "H" of the door 162, and the height "H" of the door 262.

The imaging devices 119, 181, and 182 are implemented as digital stereo cameras. The imaging devices 119, 181, and 182 respectively image in front, to the right, and to the left of the first vehicle 100 in accordance with signals output from the control device 190, and each output two images obtained by the imaging that have parallax with each other to the control device 190. The imaging devices 119, 181, and 182 each output the two images that have parallax with each other to the control device 190 because the control device 190 identifies, on the basis of the parallax, the positional coordinates in three-dimensional space, sizes, and the like of obstacles in front of, to the right of, and to the left of the first vehicle 100, and determines an advancing direction and the like on the basis of the identified positional coordinates and sizes.

Figure 5:
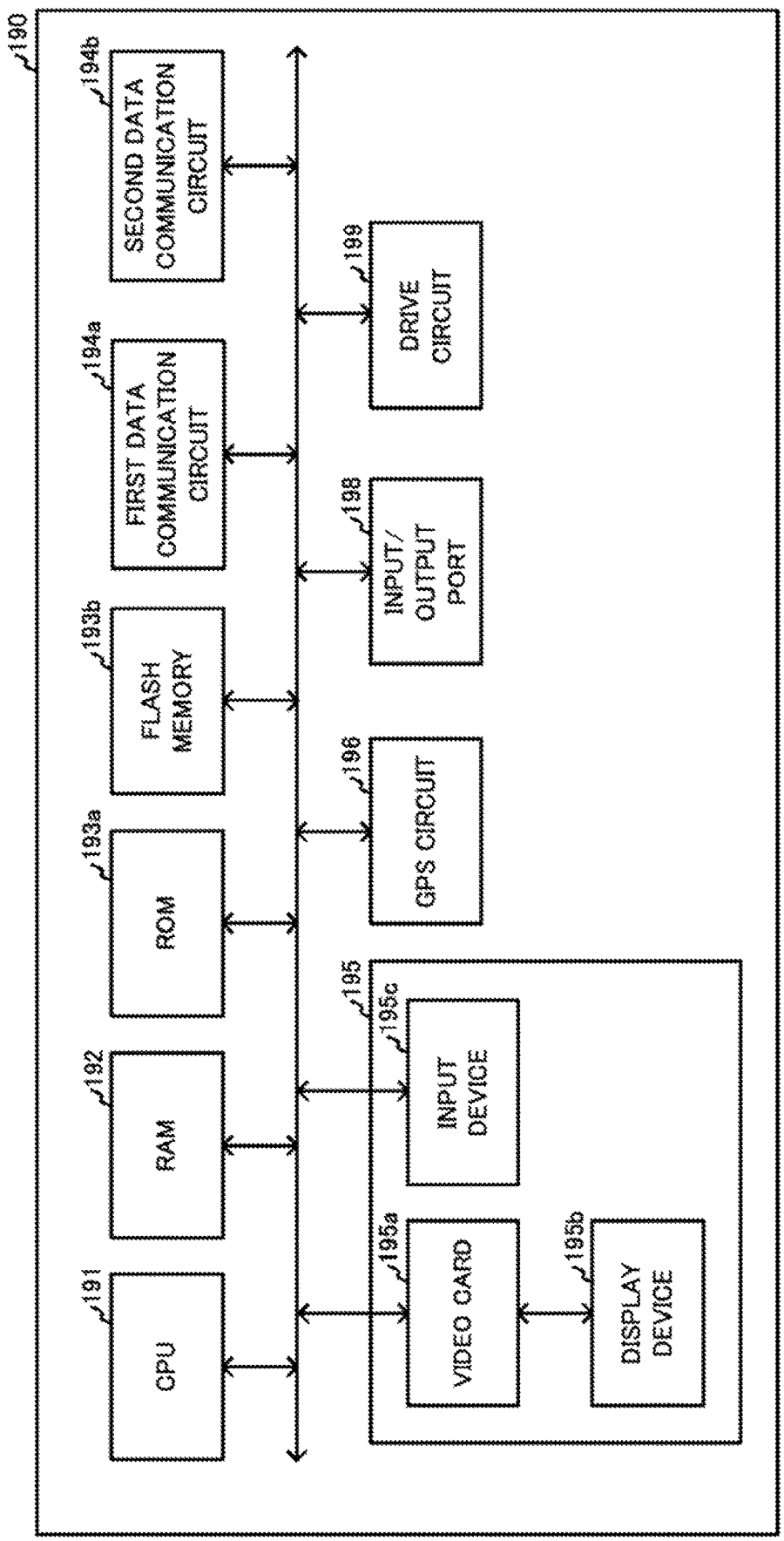
FIG. 5 is a hardware configuration drawing illustrating a configuration example of a control device of a vehicle.

As illustrated in FIG. 5, the control device 190 of the first vehicle 100 includes a central processing unit (CPU) 191, a random access memory (RAM) 192, a read only memory (ROM) 193a, a flash memory 193b, a first data communication circuit 194a, a second data communication circuit 194b, a touch screen 195, a global positioning system (GPS) circuit 196, an input/output port 198, and a drive circuit 199. In the present embodiment, it is described that the control device 190 includes one CPU 191, but the present embodiment is not limited thereto and the control device 190 may include a plurality of CPUs.

The CPU 191 carries out total control of the first vehicle 100 by executing programs stored in the ROM 193a or the flash memory 193b. The RAM 192 temporarily stores data to be processed at the times of execution of the programs by the CPU 191.

Various types of programs are stored in the ROM 193a and the flash memory 193b. The flash memory 193b also stores various types of data and tables in which data is stored that are used in the execution of the programs. The first vehicle 100 may include a hard disk instead of the flash memory 193b.

The first data communication circuit 194a is implemented as a network interface card (NIC) and, in one example, in accordance with a communication standard such as long term evolution (LTE) or 5th Generation (5G), carries out data communication using radio waves with a non-illustrated base station that is connected to the internet IN. Thus, the first data communication circuit 194a of the first vehicle 100 carries out data communication with the control device 500 that is connected to the internet IN. The second data communication circuit 194b is implemented as an NIC and, in one example, in accordance with a communication standard such as Bluetooth, carries out data communication using radio waves with the second vehicle 200.

The touch screen 195 includes a video card 195a, a display device 195b, and an input device 195c. The video card 195a renders images on the basis of digital signals output from the CPU 191, and outputs image signals that represent the rendered images. The display device 195b is implemented as an electroluminescence (EL) display, and displays images in accordance with the image signals output from the video card 195a. The mobile terminal 901 may include a plasma display panel (PDP) or a liquid crystal panel (LCD) instead of the EL display. The input device 195c is implemented as one or more of a button and a touch panel, and inputs signals corresponding to operations performed on the input device 195c.

The GPS circuit 196 receives a GPS signal emitted from a GPS satellite, measures the latitude and longitude expressing the location of the first vehicle 100 on the basis of the received GPS signal, and outputs a signal expressing the measured latitude and longitude.

The input/output port 198 is connected to non-illustrated cables respectively connected to the imaging device 119 set on the front surface of the chassis 110, and the imaging devices 181 and 182 respectively set on the right side surface and the left side surface of the locker device 170. The input/output port 198 outputs signals output by the CPU 191 to each of the imaging devices 119, 181, and 182, and inputs the two images output by each of the imaging devices 119, 181, and 182 into the CPU 191.

The drive circuit 199 is connected to cables connected to each of the non-illustrated plurality of motors that rotate each of the plurality of wheels including the wheels 111 and 112, and drives the plurality of motors in accordance with signals output by the CPU 191. Additionally, the drive circuit 199 is connected to cables connected to each of the non-illustrated motor that swings the door 162 of the locker device 170, non-illustrated motor that pulls the deadbolt 162b out of the strike plate or inserts the deadbolt 162b into the strike plate, and the non-illustrated motor that extends/contracts the expansion/contraction mechanism 165, and drives this plurality of motors in accordance with signals output by the CPU 191.

The second vehicle 200 includes a locker device 270 that has the same size, configuration, and functions as the locker device 170 of the first vehicle 100. Similar to the locker device 170 of the first vehicle 100, the locker device 270 includes, on each of a right side surface and a left side surface, a storage box 260 that is disposed so as to form a 3 row 2 column matrix. Additionally, similar to the locker device 170 of the first vehicle 100, the locker device 270 of the second vehicle 200 includes a control device 290 that controls the locking and the like of the storage box 260.

Figure 6:
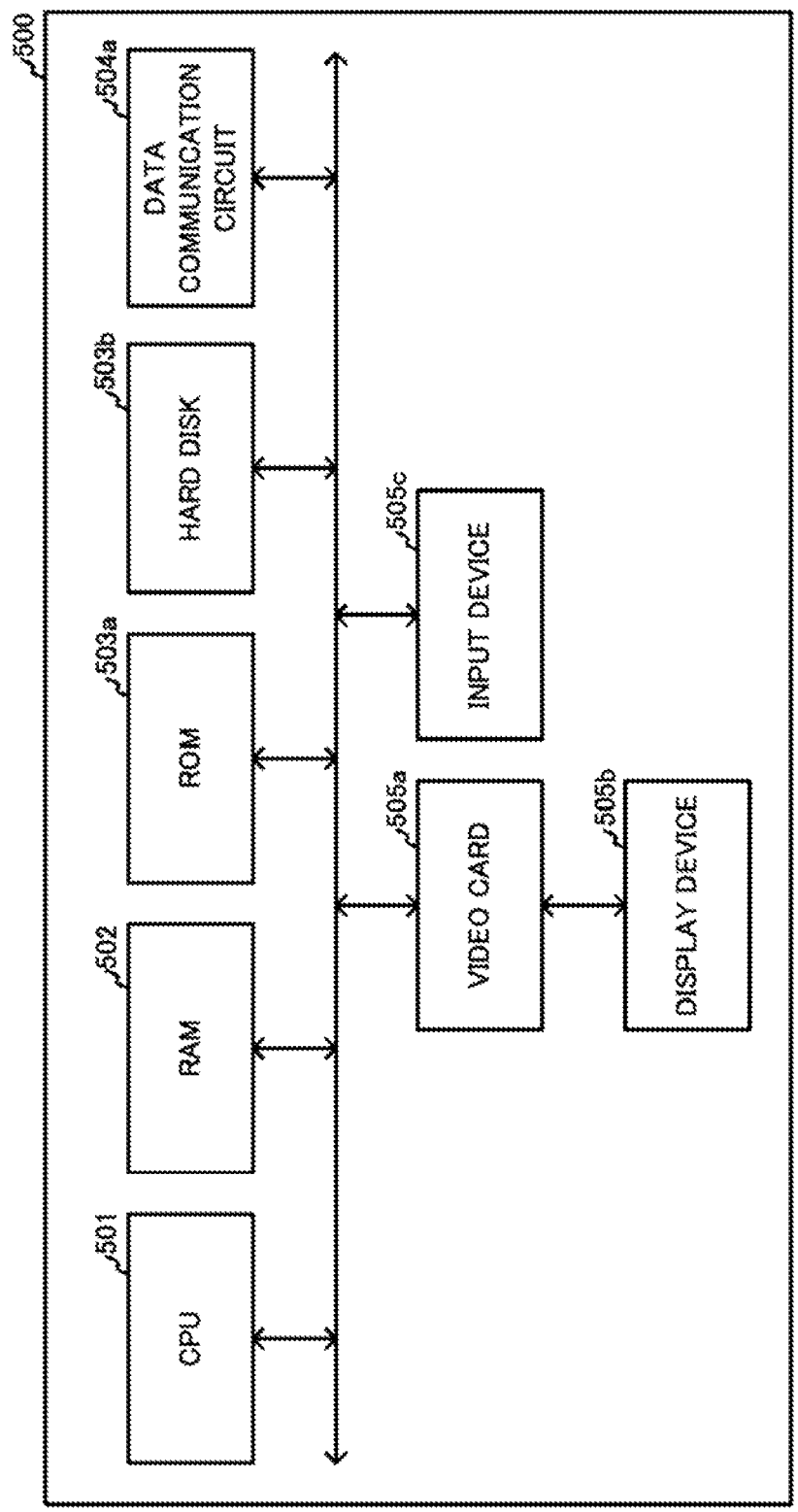
FIG. 6 is a hardware configuration drawing illustrating a configuration example of a control device of the delivery system.

The control device 500 is a server device and, as illustrated in FIG. 6, includes a CPU 501, a RAM 502, a ROM 503a, a hard disk 503b, a data communication circuit 504a, a video card 505a, a display device 505b, and an input device 505c. In the present embodiment, it is described that the control device 500 includes one CPU 501, but the present embodiment is not limited thereto and the control device 500 may include a plurality of CPUs.

The configurations and functions of the CPU 501, the RAM 502, the ROM 503a, the video card 505a, the display device 505b, and the input device 505c of the control device 500 are the same as the configurations and functions of the CPU 191, the RAM 192, the ROM 193a, the video card 195a, the display device 195b, and the input device 195c of the control device 190 of the first vehicle 100 illustrated in FIG. 5. The input device 505c may be implemented as one or more of a keyboard, a mouse, a touch pad, and a button.

The hard disk 503b of the control device 500 stores various types of programs, and various types of data and tables in which data is stored that are used in the execution of the various types of programs. The control device 500 may include flash memory instead of the hard disk 503b.

The data communication circuit 504a of the control device 500 is implemented as an NIC and, in one example, carries out wireless data communication, in accordance with a communication standard such as LTE or 5G, with the first vehicle 100, the second vehicle 200, and the mobile terminals 901 to 905 that are connected to the internet IN.

In one example, the control device 500 is installed in an office of a delivery company that delivers articles. When an article is brought into the office, a worker working at the office reads a slip affixed to cardboard in which the article is packaged, and confirms the address of a delivery destination of the article, a specified time block specified as a desired delivery time block of the article, and contact information of a recipient of the article. Thereafter, the worker performs an operation on the input device 505c of the control device 500 for inputting the address of the delivery destination, a start time and an end time of the specified time block, and the contact information.

Figure 7:
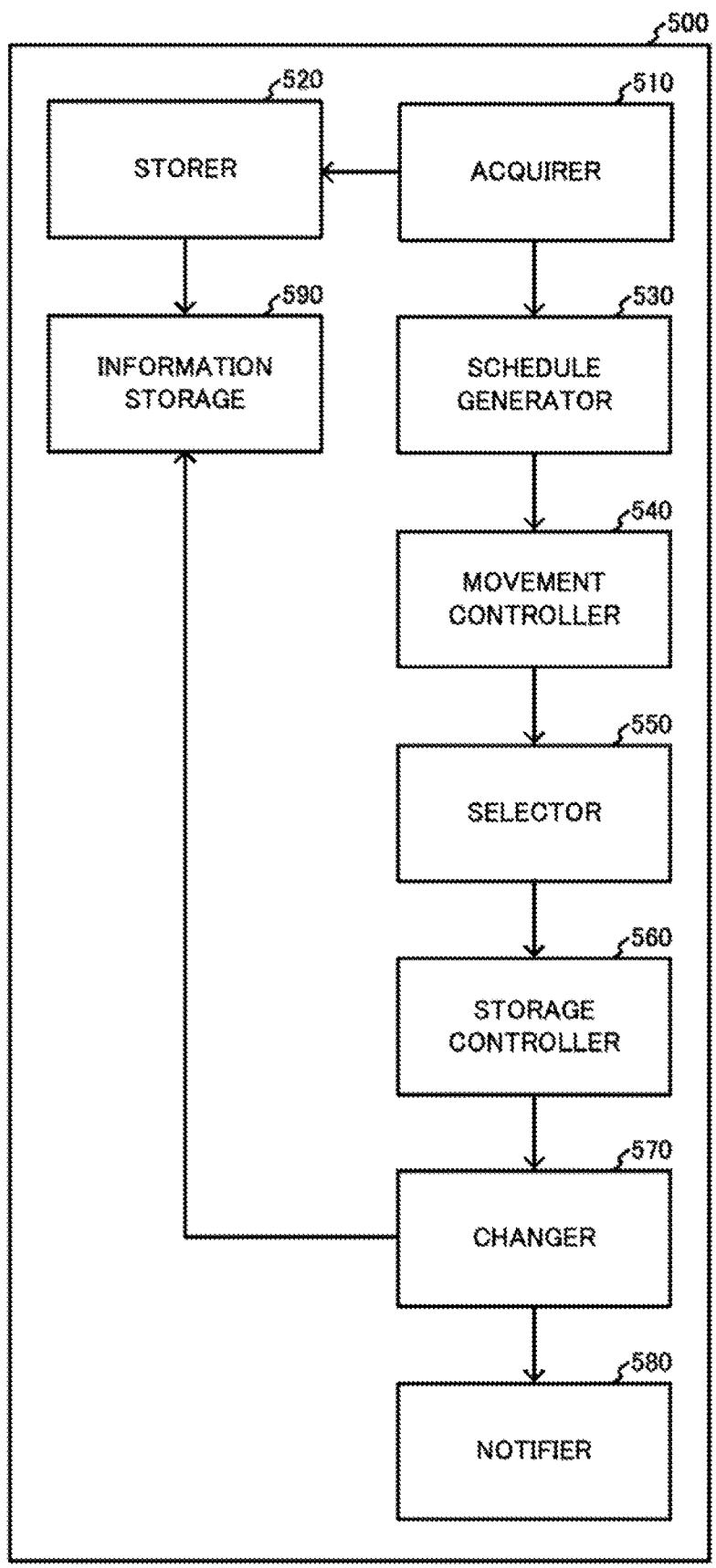
FIG. 7 is a functional block drawing illustrating an example of the functions of the control device of the delivery system.

When the input device 505c of the control device 500 inputs a signal corresponding to the operation of the worker, the CPU 501 of the control device 500 executes non-illustrated article information storage processing for storing information about the article. As a result, the CPU 501 functions as an acquirer 510 such as illustrated in FIG. 7 that acquires the information about the article on the basis of the signal input by the input device 505c, and as a storer 520 that stores the information about the article in the hard disk 503b. The hard disk 503b functions as an information storage 590 in which an article table such as illustrated in FIG. 8 is stored. The information about the article is stored in the article table.

The information about the article includes an article identification (ID) that is identification information identifying an article, identification information that identifies a receiving location that is the delivery destination of that article and also is the location where the article is to be received, information expressing the start time and information expressing the end time of the specified time block of that article, information expressing the contact information of the recipient of that article, and state information expressing a delivery state of that article.

In the present embodiment, it is described that the receiving location is an area that has a range predetermined for each receiving location, and includes the entrances and lobbies of apartment complexes and office buildings, and the doorsteps of houses. However, the receiving location is not limited thereto.

When the execution of the article information storage processing starts, the acquirer 510 acquires, on the basis of the inputted signal, the information expressing the address of the delivery destination of the article, the information expressing the start time and the information expressing the end time of the specified time block of the article, and the information expressing the contact information of the recipient of the article. Next, the acquirer 510 acquires, from the information storage 590, the identification information of the receiving location that is stored in advance in association with the acquired address. Note that the receiving location is located at the address. Thereafter, the acquirer 510 generates a random number, for example, and generates the article ID on the basis of the generated random number. Next, the acquirer 510 sets the state information of the article to state information expressing an undelivered state.

Next, the storer 520 associates the generated article ID, the acquired identification information of the receiving location, the information expressing the start time and the information expressing the end time of the specified time block, the information expressing the contact information, and the state information expressing the undelivered state, stores the associated information in a new record and, then, adds that record to the article table of FIG. 8. Thereafter, the storer 520 ends the execution of the non-illustrated article information storage processing.

The CPU 501 of the control device 500 executes non-illustrated schedule generation processing for generating schedules for the first vehicle 100 and the second vehicle 200 on a predetermined time interval, such as 10 minutes. Thus, the CPU 501 functions as a schedule generator 530 such as illustrated in FIG. 7 that generates schedules for the first vehicle 100 and the second vehicle 200.

A schedule table such as illustrated in FIG. 9 is stored in the information storage 590. Information about the schedules is stored in the schedule table. A plurality of records are stored in the schedule table. In each record, identification information "100" or "200" of the first vehicle 100 or the second vehicle 200, the identification information of the receiving location, and information expressing a movement start time that is a time at which the first vehicle 100 or the second vehicle 200 starts moving toward the receiving location are associated and stored. Additionally, information expressing a scheduled arrival time that is a time at which the first vehicle 100 or the second vehicle 200 is scheduled to arrive at that receiving location, and a scheduled departure time at which the first vehicle 100 or the second vehicle 200 is scheduled to depart from that receiving location are associated with the identification information "100" or "200" and the identification information of the receiving location, and this associated information is stored. Furthermore, the article ID identifying the article scheduled to be stored in the first vehicle 100 or the second vehicle 200 and delivered to the receiving location, and state information expressing a movement state of the first vehicle 100 or the second vehicle 200 to the receiving location are associated with the identification information "100" or "200" and the identification information of the receiving location, and this associated information is stored.

When the execution of the schedule generation processing starts, a schedule generator 530 determines whether or not a record storing the identification information "100" of the first vehicle 100 exists in the schedule table illustrated in FIG. 9. At this time, when it is determined that no such record exists, the schedule generator 530 determines that there are no un-executed schedules and no schedules in execution for the first vehicle 100, and starts the generation of a schedule for the first vehicle 100.

When the generation of the schedule for the first vehicle 100 starts, the schedule generator 530 acquires, from among the records stored in the article table of FIG. 8, one or a plurality of records in which state information expressing the undelivered state is stored, and generates the schedule for the first vehicle 100 by using known scheduling technology on the acquired one or plurality of records.

In the present embodiment, an example is given of a case in which the schedule generator 530 generates a schedule such as illustrated in FIG. 10. The schedule illustrated in FIG. 10 includes a schedule in which the first vehicle 100 stores a first article and a third article respectively identified by the article IDs "G1" and "G3", starts movement at "09:00" toward a first receiving location identified by the identification information "P1", arrives at the first receiving location at "09:10", and stays at the first receiving location until the first article identified by the article ID "G1" is received or until "09:50."

The reason the scheduled arrival time at the first receiving location is "09:10" is that information expressing the start time "09:20" of the specified time block is stored in the article table of FIG. 8 in association with the article ID "G1" and the identification information "P1" of the first receiving location and, due to this, a schedule is generated whereby the first vehicle 100 arrives at the first receiving location at "09:10", which is a time that is a predetermined time margin "00:10" earlier than the start time "09.20" of the specified time block. Additionally, the reason the scheduled departure time from the first receiving location is "09:50" is because information expressing the end time "09:50" of the specified time block is stored in the article table in association with the article ID "G1" and the identification information "P1" of the first receiving location. Note that the time margin is not limited to "00:10", and a person skilled in the art can determine, by experiment, an optimal time margin.

As such, the schedule generator 530 associates the identification information "100" of the first vehicle 100, the identification information "P1" of the first receiving location, information expressing the movement start time "09:00" of the first vehicle 100 to the first receiving location, information expressing the scheduled arrival time "09:10", and information expressing the scheduled departure time "09:50", and stores the associated information in the schedule table of FIG. 9. Additionally, the schedule generator 530 associates the article ID "G1" of the article scheduled to be received from the first vehicle 100 at the first receiving location and the state information expressing a non-departed state in which the first vehicle 100 has not yet departed for the first receiving location, with the identification information "100" of the first vehicle 100 and the identification information "P1" of the first receiving location, and stores the associated information. Next, the schedule generator 530 updates the state information associated with the article ID "G1" in the article table to state information expressing an in-delivery state.

Likewise, the schedule generator 530 associates the identification information "100" of the first vehicle 100, the identification information "P2" of the second receiving location, information expressing the movement start time "10:10", information expressing the scheduled arrival time "10:20", information expressing the scheduled departure time "11:20", the article ID "G3", and state information expressing the non-departed state, and stores the associated information in the schedule table. Additionally, the schedule generator 530 updates the state information associated with the article ID "G3" in the article table to state information expressing the in-delivery state.

The schedule generator 530 associates the identification information "100", the identification information "P0" of the office, information expressing the movement start time "11:20", information expressing the scheduled arrival time "11:30", and state information expressing the non-departed state, and stores the associated information in the schedule table. Thereafter, the schedule generator 530 determines that the generation of the schedule for the first vehicle 100 is ended.

When a determination is made that a record in which the identification information "100" of the first vehicle 100 is stored exists in the schedule table illustrated in FIG. 9, the schedule generator 530 determines that there is an un-executed schedule or a schedule in execution for the first vehicle 100.

When a determination is made that the generation of the schedule for the first vehicle 100 is ended, or when a determination is made that an un-executed schedule or a schedule in execution for the first vehicle 100 exists, the schedule generator 530 determines whether or not a record in which the identification information "200" of the second vehicle 200 is stored exists in the schedule table. At this time, when the schedule generator 530 determines such a record exists, the schedule generator 530 determines that there is an un-executed schedule or a schedule in execution for the second vehicle 200 and ends the execution of the non-illustrated schedule generation processing. In contrast, when a determination is made that no such record exists, the schedule generator 530 determines that there are no un-executed schedules and no schedules in execution for the second vehicle 200, and generates a schedule for the second vehicle 200 such as illustrated in FIG. 10.

The schedule illustrated in FIG. 10 includes a schedule in which the second vehicle 200 stores a second article, a fourth article, and a fifth article respectively identified by the article IDs "G2", "G4", and "G5", starts movement at "09:20" toward the first receiving location, arrives at the first receiving location at "09:30", and stays at the first receiving location until the second article identified by the article ID "G2" is received or until "10:00."

As such, the schedule generator 530 associates the identification information "200" of the second vehicle 200, the identification information "P1" of the first receiving location, information expressing the movement start time "09:20", information expressing the scheduled arrival time "09:30", information expressing the scheduled departure time "10:00", the article ID "G2", and state information expressing the non-departed state, and stores the associated information in the schedule table of FIG. 9. Additionally, the schedule generator 530 updates the state information associated with the article ID "G2" in the article table of FIG. 8 to state information expressing the in-delivery state.

Likewise, the schedule generator 530 stores, in the schedule table, the identification information "200" of the second vehicle 200, the identification information "P2" of the second receiving location, information expressing the movement start time "10:10", information expressing the scheduled arrival time "10:20", information expressing the scheduled departure time "10:50", the article ID "G4", and state information expressing the non-departed state, and updates the state information associated with the article ID "G4" in the article table to state information expressing the in-delivery state.

Furthermore, the schedule generator 530 stores, in the schedule table, the identification information "200" of the second vehicle 200, identification information "P3" of a third receiving location, information expressing the movement start time "10:50", information expressing the scheduled arrival time "11:00", information expressing the scheduled departure time "11:20", the article ID "G5", and state information expressing the non-departed state, and updates the state information associated with the article ID "G5" in the article table to state information expressing the in-delivery state.

The schedule generator 530 associates the identification information "200" of the second vehicle 200, the identification information "P0" of the office, information expressing the movement start time "11:20", information expressing the scheduled arrival time "11:30", and state information expressing the non-departed state, and stores the associated information in the schedule table. Thereafter, the schedule generator 530 determines that the generation of the schedule for the second vehicle 200 is ended, and ends the execution of the non-illustrated schedule generation processing.

When the execution of the schedule generation processing ends, the CPU 501 of the control device 500 acquires information about the schedule stored in the schedule table of FIG. 9, and displays the acquired information on the display device 505b illustrated in FIG. 6. As such, since the identification information "100" of the first vehicle 100, the article ID "G1" of the first article, and the article ID "G3" of the third article are associated and displayed on the display device 505b, the worker that views the display device 505b stores the first article and the third article in the storage boxes 160 of the first vehicle 100. Thereafter, the worker performs, on the input device 505c of the control device 500, an operation of inputting information about the storage boxes 160 in which the first article and the third article are respectively stored.

When the input device 505c of the control device 500 inputs a signal corresponding to the operation of the worker, the CPU 501 of the control device 500 executes non-illustrated box information storage processing for storing the information about the storage boxes 160. A storage box table such as illustrated in FIG. 11 is stored in the information storage 590. The information about the storage boxes 160 is stored in the storage box table in the box information storage processing.

A plurality of records are stored in advance in the storage box table. The identification information "100" or "200" of the first vehicle 100 or the second vehicle 200, and a box ID that identifies the storage box 160 or 260 of the first vehicle 100 or the second vehicle 200 are associated and stored in advance in each record. Additionally, information expressing a position at which the storage box 160 or 260 identified by the box ID is disposed in the first vehicle 100 or the second vehicle 200 is associated in advance with the identification information "100" or "200" of the first vehicle 100 or the second vehicle 200 and the box ID. Furthermore, in an initial state, a symbol "–" expressing that no articles are stored in the storage box, and a text string "NULL" expressing that a password used to authenticate the recipient of the article is not set are associated in advance with the identification information "100" or "200" and the box ID. Moreover, in an initial state, a transfer flag having a value "false" expressing that the article is not a transfer article to be transferred is associated in advance with the identification information "100" or "200" and the box ID.

In the present embodiment, an example of a case is described in which the worker stores the first article in the storage box 160 of the first vehicle 100 identified by the box ID "B01", and stores the third article in the storage box 160 identified by the box ID "B03."

When the execution of the non-illustrated box information storage processing starts, the CPU 501 of the control device 500 acquires, on the basis of an inputted signal and as the information about the storage boxes, the identification information "100" of the first vehicle 100, the article ID "G1" of the first article, and the box ID "B01" of the storage box 160 in which the first article is stored. Next, the CPU 501 generates, for example, on the basis of random numbers, a text string "password1" expressing the password used to authenticate the recipient of the first article. Thereafter, the CPU 501 updates the symbol "−" and the text string "NULL" associated with the identification information "100" of the first vehicle 100 and the box ID "B01" in the storage box table illustrated in FIG. 11 to the article ID "G1" of the first article and the text string "password1" expressing the generated password.

Likewise, the CPU 501 of the control device 500 acquires, on the basis of an inputted signal, the identification information "100" of the first vehicle 100, the article ID "G3" of the third article, and the box ID "B03", and generates a text string "password3" expressing the password. Additionally, the CPU 501 updates the symbol "−" and the text string "NULL" associated with the identification information "100" and the box ID "B03" in the storage box table to the article ID "G3" of the third article and the text string "password3." Thereafter, the CPU 501 ends the execution of the non-illustrated box information storage processing.

Likewise, since the identification information "200" of the second vehicle 200, the article ID "G2" of the second article, and the article ID "G4" of the fourth article are associated and displayed on the display device 505*b*, the worker that views the display device 505*b* stores the second article and the fourth article in the second vehicle 200.

Likewise, in the present embodiment, an example of a case is described in which the worker stores the second article in the storage box 260 of the second vehicle 200 identified by the box ID "B12", stores a fourth article in the storage box 260 of the second vehicle 200 identified by the box ID "B14", and stores a fifth article in the storage box 260 of the second vehicle 200 identified by the box ID "B15."

The worker further performs, on the input device 505*c* of the control device 500, an operation of inputting the box information about the storage boxes 260 in which the second article and the fourth article are respectively stored. When the input device 505*c* of the control device 500 inputs signals corresponding to the operations, the CPU 501 of the control device 500 again executes the non-illustrated box information storage processing. As a result, the CPU 501 updates the symbol "−" and the text string "NULL" associated with the identification information "200" of the second vehicle 200 and the box ID "B12" in the storage box table to the article ID "G2" of the second article and the text string "password2" expressing the password: and updates the symbol "−" and the text string "NULL" associated with the identification information "200" and the box ID "B14" to the article ID "G4" of the fourth article and the text string "password4." Additionally, the CPU 501 updates the symbol "−" and the text string "NULL" associated with the identification information "200" of the second vehicle 200 and the box ID "B15" to the article ID "G5" of the fifth article and the text string "password5" expressing the password.

Figure 12:
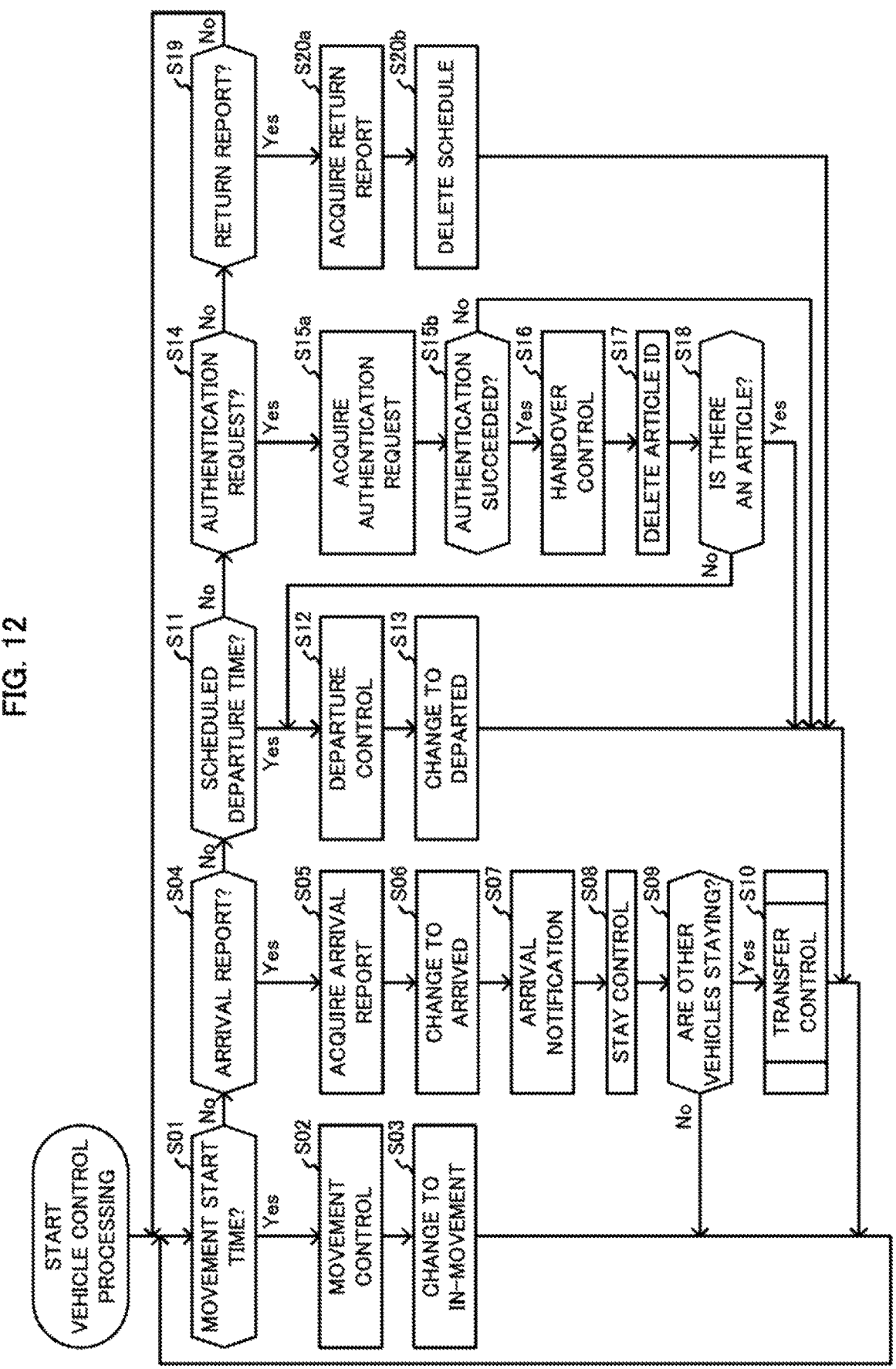
FIG. 12 is a flowchart illustrating an example of vehicle control processing executed by the control device of the delivery system according to the embodiment.

Upon start-up, the CPU 501 of the control device 500 executes vehicle control processing such as illustrated in FIG. 12 for controlling the first vehicle 100 and the second vehicle 200. As a result, the CPU 501 functions as a movement controller 540 such as illustrated in FIG. 7 that causes the first vehicle 100 and the second vehicle 200 to move to the receiving location. Additionally, the CPU 501 functions as a selector 550 that, when the first vehicle 100 and the second vehicle 200 stay at the same receiving location, selects one of the first vehicle 100 and the second vehicle 200 as a remaining vehicle that remains at the receiving location, and selects the other as a departing vehicle that departs from the receiving location.

Furthermore, the CPU 501 of the control device 500 functions as a storage controller 560 that identifies an article stored in the departing vehicle as a transfer article to be transferred from the departing vehicle to the remaining vehicle, and causes the identified transfer article to be stored in the remaining vehicle; and as a changer 570 that changes the scheduled departure time of the departing vehicle from the receiving location to a time earlier than before being changed when the transfer article is stored in the remaining vehicle. Moreover, the CPU 501 functions as a notifier 580 that, when the scheduled departure time of the departing vehicle is changed, outputs an extension notification informing that the time at which the receiving period of the transfer article stored in the remaining vehicle ends is extended to the scheduled departure time of the remaining vehicle from that receiving location.

When the execution of the vehicle control processing illustrated in FIG. 12 starts, the movement controller 540 acquires a system time from the operating system (OS), for example. In the present embodiment, as a specific example, a case is described in which a system time of "09:00" is acquired.

The movement controller 540 acquires, from the schedule table illustrated in FIG. 9, one time "09:00", from the movement start times associated with the state information expressing the non-departed state, that is earlier than the system time "09:00". Since the identification information "100" of the first vehicle 100 and the identification information "P1" of the first receiving location are associated with the acquired movement start time "09:00", the movement controller 540 determines that the movement start time "09:00" at which the first vehicle 100 starts movement to the first receiving location has arrived (step S01: Yes).

Next, the movement controller 540 references a non-illustrated receiving location table in which information about the receiving locations is stored in advance. The non-illustrated receiving location table is stored in advance in the information storage 590, and a plurality of records is stored in advance in the receiving location table. The identification information of the receiving location, representative geographical location information expressing the latitude and longitude of a representative geographical location of the receiving location, and range information expressing a range of the receiving location are associated and stored in each record of the receiving location table.

In the present embodiment, the representative geographical location of the receiving location is described as being the entrance/exit of the receiving location, for example. However, the present embodiment is not limited thereto, and the representative geographical location of the receiving location may be any geographical location where the receiving location and a path on which the first vehicle 100 and the second vehicle 200 can move contact. Additionally, the representative geographical location of the receiving location is not limited to a geographical location where the receiving location and a path on which the first vehicle 100 and the second vehicle 200 can move contact and, may, for example, be a center point of the smallest circle that encompasses the receiving location or the center point of the largest circle encompassed by the receiving location.

In the present embodiment, it is described that, since the shape of the receiving location is polygonal, the range information of the receiving location is information expressing positions of a plurality of vertices of the receiving location, using coordinate values of a coordinate system that has the representative geographical location as the origin. However, the present embodiment is not limited thereto and, when the shape of the receiving location is circular and, also, the representative geographical location of the receiving location is the center point of the receiving location, the range information of the receiving location may be information expressing the radius of the receiving location. Furthermore, when the shape of the receiving location is elliptical and, also, the representative geographical location of the receiving location is an intersection between the long axis and the short axis of the receiving location, the range information of the receiving location may be information expressing the lengths of the long axis and the short axis.

The movement controller 540 acquires, from the referenced receiving location table, the representative geographical location information and the range information of the first receiving location associated with the identification information "P1" of the first receiving location. Thereafter, the movement controller 540 generates a movement command that includes the identification information "P1", the representative geographical location information, and the range information of the first receiving location, and that commands movement to the first receiving location. Next, the movement controller 540 outputs the generated movement command to the data communication circuit 504*a* illustrated in FIG. 6 with the first vehicle 100 as the destination to carry out movement control of the first vehicle 100 (step S02).

Thereafter, the changer 570 changes the state information associated with the identification information "100" of the first vehicle 100 and the identification information "P1" of the first receiving location in the schedule table of FIG. 9 to state information expressing in-movement (step S03) and, then, repeats the processing from step S01.

Figure 13:
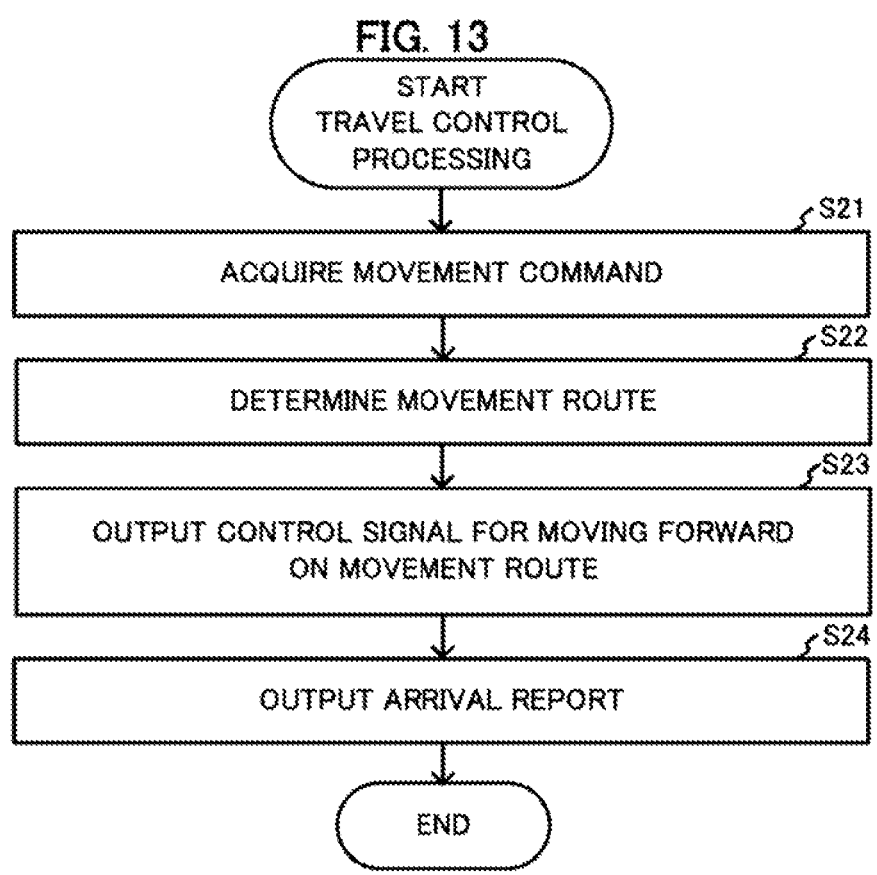
FIG. 13 is a flowchart illustrating an example of travel control processing executed by the first vehicle and the second vehicle.

When the first data communication circuit 194*a* of the first vehicle 100 receives the movement command from the control device 500, the CPU 191 of the first vehicle 100 executes travel control processing such as illustrated in FIG. 13 in which the non-illustrated motors that rotate the plurality of wheels are controlled in order to move the first vehicle 100 in accordance with the movement command.

When the execution of the travel control processing starts, the CPU 191 of the first vehicle 100 acquires the movement command from the first data communication circuit 194*a* (step S21), and acquires the identification information "P1", the representative geographical location information, and the range information of the first receiving location that are included in the acquired movement command. Next, the CPU 191 of the first vehicle 100 identifies the latitude and longitude of the first vehicle 100 on the basis of a signal output from the GPS circuit 196.

Thereafter, the CPU 191 of the first vehicle 100 reads a plurality of records from a non-illustrated partial route table in which information related to partial routes on which the first vehicle 100 can move, such as roads, for example, is stored in advance. The partial route table is stored in advance in the flash memory 193*b*. The latitude and longitude of a start node of a partial route, the latitude and longitude of an end node of the partial route, and a length of an edge that is the partial route are associated and stored in advance in each record of the partial route table.

The CPU 191 of the first vehicle 100 executes a route search algorithm such as, for example, Dijkstra's algorithm using the identified latitude and longitude of the first vehicle 100, the length of the edge that is the partial route and the latitude and longitude of the nodes stored in each of the read plurality of records, and the latitude and longitude of the representative geographical location of the first receiving location expressed in the representative geographical location information. Thus, the CPU 191 calculates the shortest overall route from the current position of the first vehicle 100 to the representative geographical location of the first receiving location, and determines the calculated overall route as a movement route (step S22).

Next, in order to cause the first vehicle 100 to move forward on the movement route, the CPU 191 of the first vehicle 100 acquires a signal from the GPS circuit 196, and generates a control signal that causes the first vehicle 100 to travel so as to reduce the difference between the latitude and longitude of the first vehicle 100 expressed in the acquired signal and the latitude and longitude of the closest node of the plurality of un-passed nodes included in the movement route. Thereafter, the CPU 191 outputs the generated control signal to the drive circuit 199 that drives the non-illustrated motors that rotate the plurality of wheels including the wheels 111 and 112 (step S23). Next, as long as there are un-passed nodes, the CPU 191 of the first vehicle 100 repeats the processing described above from the processing of acquiring of the signal from the GPS circuit 196.

Thereafter, when there are no un-passed nodes left, the CPU 191 of the first vehicle 100 determines that the first vehicle 100 has arrived at the first receiving location. Next, the CPU 191 generates an arrival report that includes the identification information "P1" of the first receiving location and the identification information "100" of the first vehicle 100, and that informs that the first vehicle 100 has arrived at the first receiving location. Thereafter, the CPU 191 outputs the generated arrival report to the first data communication circuit 194*a* with the control device 500 as the destination (step S24) and, then, ends the execution of the travel control processing.

The movement controller 540 of the control device 500 outputs the movement command by executing step S02 and step S03 of FIG. 12 and, then, again executes the processing of step S01. At this time, the movement controller 540 again acquires the system time, and determines that there are no times in the schedule table of FIG. 9 later than the system time among the movement start times expressed in the information associated with state information expressing the non-departed state. Due to this, the movement controller 540 determines that the movement start time for the un-executed schedule has not arrived (step S01: No).

Next, the movement controller 540 of the control device 500 determines that the arrival report sent from the first vehicle 100 is received by the data communication circuit 504*a* (step S04: Yes), and acquires the arrival report from the data communication circuit 504*a* (step S05). Thereafter, the movement controller 540 acquires, from the acquired arrival report, the identification information "100" of the first vehicle 100 and the identification information "P1" of the first receiving location at which the first vehicle 100 has arrived.

Next, the changer 570 changes the state information associated with the identification information "100" of the first vehicle 100 and the identification information "P1" of the first receiving location in the schedule table illustrated in FIG. 9 to state information expressing an arrived state (step S06).

Thereafter, the notifier 580 acquires, from the schedule table, the article ID "G1" associated with the identification information "100" of the first vehicle 100 and the identification information "P1" of the first receiving location, and acquires the information expressing the contact information associated with the article ID "G1" in the article table illustrated in FIG. 8. Additionally, the notifier 580 acquires, from the storage table illustrated in FIG. 11, the text string "password1" expressing the password associated with the article ID "G1." Thereafter, the notifier 580 generates an arrival notification such as an electronic mail, a message for an application, or the like notifying that the first article identified by the article ID "G1" has arrived at the first receiving location and notifying the text string "password1" expressing the password used to authenticate the recipient of the first article. Next, the notifier 580 outputs the generated arrival notification to the data communication circuit 504a with the contact information of the recipient expressed in the acquired information as the destination (step S07).

The recipient of the first article is carrying the mobile terminal 901 illustrated in FIG. 1. The mobile terminal 901 is implemented as a smartphone, and includes a CPU, a RAM, a ROM, a flash memory, a data communication circuit, and a touch screen that are non-illustrated and that have the same configurations and functions as the CPU 191, the RAM 192, the ROM 193a, the flash memory 193b, the first data communication circuit 194a, and the touch screen 195 of the first vehicle 100 illustrated in FIG. 5. Additionally, the mobile terminal 901 includes a non-illustrated microphone that inputs signals expressing ambient sound, a non-illustrated voice communication circuit for carrying out voice communication with a non-illustrated base station using radio waves, and a non-illustrated speaker that outputs sound in accordance with signals output by the CPU. Note that the mobile terminals 902 to 905 are carried by the recipients of the second article to the fifth article, and have the same configuration and functions as the configuration and functions of the mobile terminal 901.

When the non-illustrated data communication circuit of the mobile terminal 901 receives the arrival notification from the control device 500, the non-illustrated CPU displays the arrival notification on the touch screen. As such, if, for example, the recipient views the arrival notice and it is expedient to the recipient, the recipient moves to the first receiving location to receive the first article.

After the arrival notification is output in step S07 of FIG. 12, the movement controller 540 generates a stay command commanding to stay at first receiving location, and outputs the generated stay command to the data communication circuit 504a with the first vehicle 100 that has arrived at the first receiving location as the destination. Thus, the movement controller 540 executes stay control for causing the first vehicle 100 to stay at the first receiving location (step S08).

When the first data communication circuit 194a of the first vehicle 100 receives the stay command, the CPU 191 of the first vehicle 100 outputs signals commanding imaging to be performed to the imaging devices 119, 181, and 182 and, then, acquires the two images output by each of the imaging devices 119, 181, and 182. Next, the CPU 191 performs template matching on the acquired two images to identify an image area corresponding to an object located near the first vehicle 100 such as a floor, a wall, a chair, a table, an intercom or other equipment, and a vehicle other than the first vehicle 100. Thereafter, the CPU 191 calculates, on the basis of a difference in the position of the identified image region in the two images (that is, the parallax), a coordinate range of the object in three-dimensional space with the representative geographical location as the origin. Thereafter, the CPU 191 determines, on the basis of the calculated coordinate range and the range information expressing the range of the first receiving location and as a stay position of the first vehicle 100, a position at the first receiving location unlikely to obstruct traffic such as a position near the wall of the first receiving location, for example, and calculates positional coordinates of the determined stay position.

Next, the CPU 191 calculates the positional coordinates of the first vehicle 100, generates a command signal for traveling so as to reduce the difference between the positional coordinates of the determined stay position and the positional coordinates of the first vehicle 100, and outputs the generated control signal to the drive circuit 199. Thus, the first vehicle 100 moves to the determined stay position of the first receiving location. Thereafter, the CPU 191 of the first vehicle 100 stops outputting the command signal that causes the plurality of wheels to rotate, thereby causing the first vehicle 100 to stay at the first receiving location.

After outputting the stay command in step S08, the selector 550 searches the schedule table of FIG. 9 for identification information associated with the identification information "P1" of the first receiving location and the state information expressing the arrived state. As a result, the selector 550 acquires the identification information "100" of the first vehicle 100, but does not acquire the identification information "200" of the second vehicle 200. The reason the identification information "200" is not acquired is because the second vehicle 200 has not arrived at the first receiving location.

As a result, the selector 550 determines that only the first vehicle 100 is staying at the first receiving location, and that the second vehicle 200, which is another vehicle, is not staying at the first receiving location (step S09; No). Since the second vehicle 200 is not staying at the first receiving location, the selector 550 determines that articles cannot be transferred between the first vehicle 100 and the second vehicle 200. Thereafter, the processing described above is repeated from step S01.

Thereafter, when the system time becomes "09:20", the movement controller 540 acquires, from the schedule table illustrated in FIG. 9, the movement start time "09:20" that is a time equal to or earlier than the system time "09:20" and that is associated with the identification information "200" of the second vehicle 200 and the identification information "P1" of the first receiving location, from among the movement start times associated with state information expressing the non-departed state. As such, the movement controller 540 determines that the movement start time "09:20", which is the time that the second vehicle 200 is scheduled to start movement to the first receiving location, has arrived (step S01: Yes).

Next, the movement controller 540 outputs a movement command commanding movement to the first receiving location, with the second vehicle 200 as the destination (step S02). Thereafter, the changer 570 changes the state information associated with the identification information "200" of the second vehicle 200 and the identification information "P1" of the first receiving location in the schedule table to state information expressing in-movement (step S03). Thereafter, the processing described above is repeated from step S01.

When the movement command is received, the second vehicle 200 executes the travel control processing illustrated in FIG. 13 to start moving toward the first receiving location. Thereafter, when the second vehicle 200 arrives at the first receiving location, the second vehicle 200 sends, to the control device 500, an arrival report that includes the identification information "P1" of the first receiving location and the identification information "200" of the second vehicle 200.

After the execution of step S03 of FIG. 12, the movement controller 540 of the control device 500 sequentially executes the processing of steps S01 to S04, thereby determining that the arrival report sent by the second vehicle 200 is received (step S04: Yes).

Thereafter, the processing of steps S05 to S08 is executed again. As a result, the state information associated with the identification information "200" of the second vehicle 200 and the identification information "P1" of the first receiving location in the schedule table of FIG. 9 is changed to state information expressing the arrived state, and stay control for causing the second vehicle 200 to stay at the first receiving location is executed. Additionally, an arrival notification informing that the second article has arrived at the first receiving location and also informing the password used to authenticate the recipient of the second article is sent to the mobile terminal 902 carried by the recipient of the second article.

Figure 14:
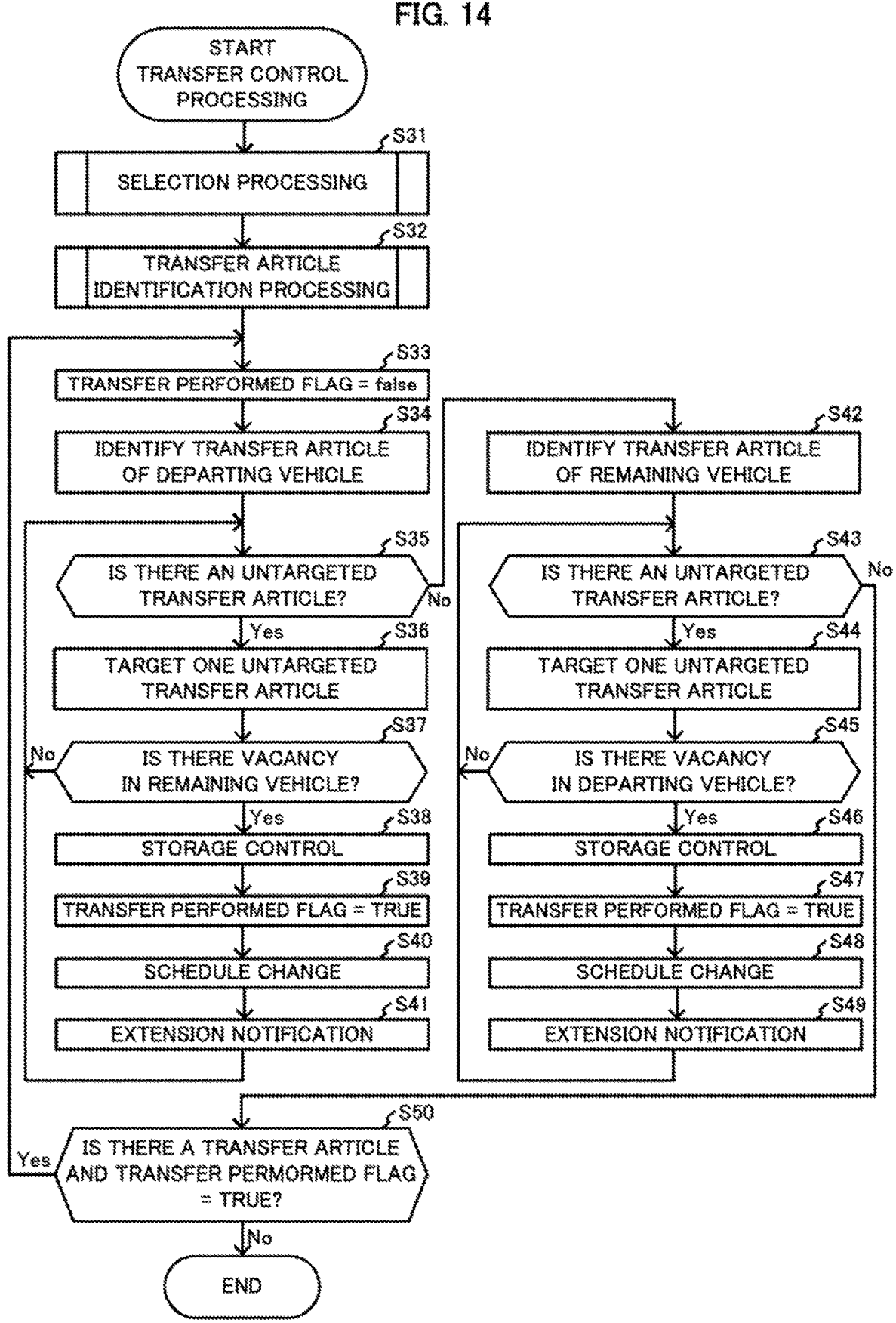
FIG. 14 is a flowchart illustrating an example of transfer control processing executed by the control device of the delivery system.

Next, the selector 550 acquires, from the schedule table illustrated in FIG. 9, the identification information "100" of the first vehicle 100 and the identification information "200" of the second vehicle 200 that are associated with the identification information "P1" of the first receiving location and the state information expressing the arrived state. As a result, the selector 550 determines that the first vehicle 100 and the second vehicle 200 are staying at the first receiving location (step S09; Yes of FIG. 12). Thereafter, in a case in which the first vehicle 100 and the second vehicle 200 are staying at the same receiving location, transfer control processing such as illustrated in FIG. 14 is executed in which an article stored in the first vehicle 100 and an article stored in the second vehicle 200 are transferred at that receiving location (step S10).

Figure 15:
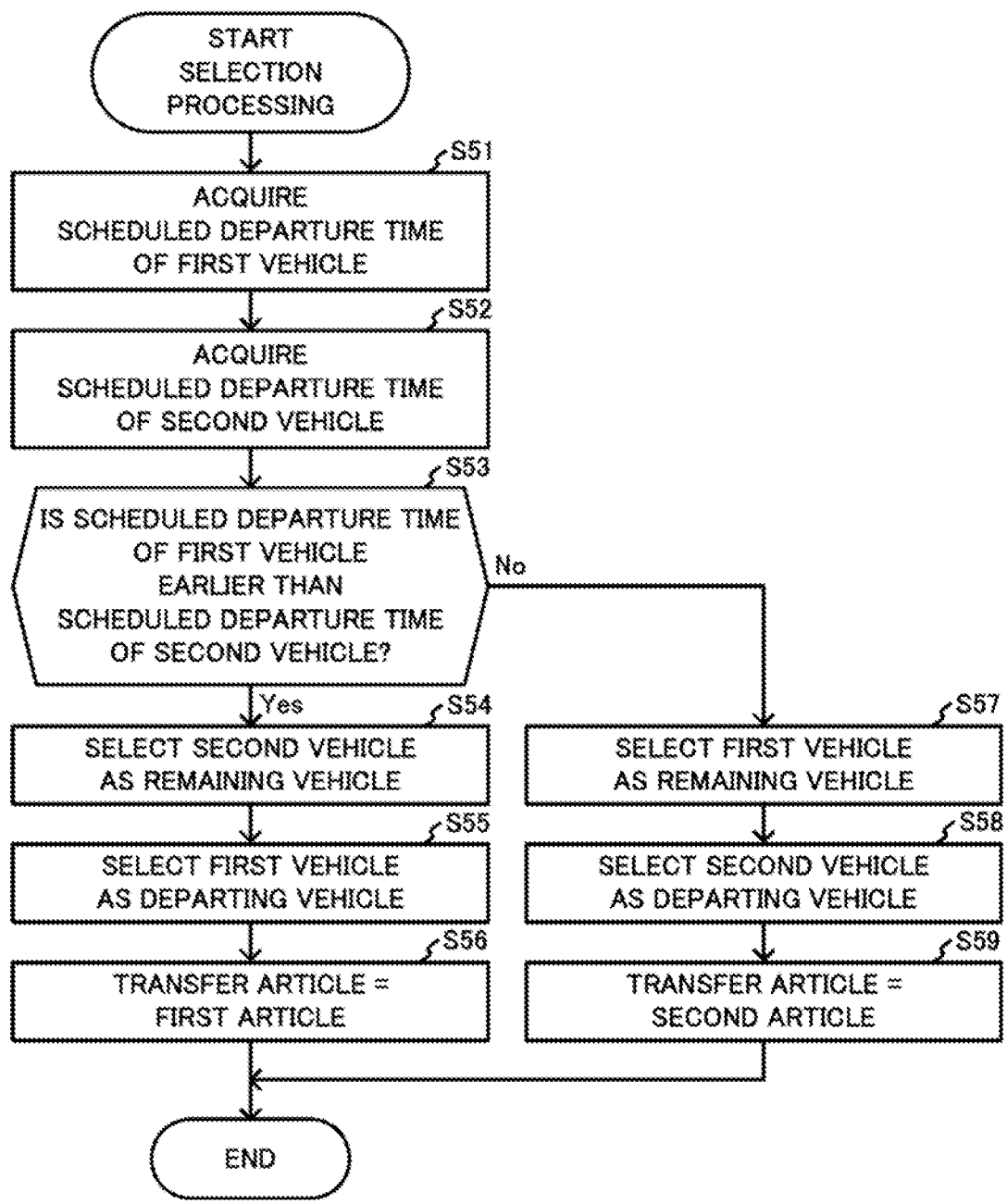
FIG. 15 is a flowchart illustrating an example of selection processing executed by the control device of the delivery system.

When the execution of the transfer control processing starts, selection processing such as illustrated in FIG. 15 is executed in which one of the first vehicle 100 and the second vehicle 200 is selected as a remaining vehicle that is to remain at the first receiving location, and the other is selected as a departing vehicle that is to depart from the first receiving location (step S31).

When the execution of the selection processing starts, the acquirer 510 acquires, from the schedule table of FIG. 9, the information expressing the scheduled departure time "09:50" associated with the identification information "100" of the first vehicle 100 and the identification information "P1" of the first receiving location. The information acquired in this manner is information expressing the scheduled departure time of the first vehicle 100 from the first receiving location (step S51). Likewise, the acquirer 510 acquires, from the schedule table, information expressing the scheduled departure time associated with the identification information "200" of the second vehicle 200 and the identification information "P1" of the first receiving location, thereby acquiring information expressing the scheduled departure time "10:00" of the second vehicle 200 from the first receiving location (step S52).

Next, the selector 550 determines that the scheduled departure time "09:50" of the first vehicle 100 from the first receiving location is earlier than the scheduled departure time "10:00" of the second vehicle 200 from the first receiving location (step S53; Yes). Thereafter, the selector 550 selects the second vehicle 200 as the remaining vehicle (step S54), and selects the first vehicle 100 as the departing vehicle (step S55).

Thereafter, the storage controller 560 identifies the first article, which is stored in the first vehicle 100 selected as the departing vehicle, as a transfer article to be transferred from the departing vehicle to the remaining vehicle (step S56). The reason the first article is identified as a transfer article is because, when the first article is transferred to the second vehicle 200 selected as the remaining vehicle, the first vehicle 100 will no longer store an article scheduled to be received at the first receiving location and, as a result, can depart from the first receiving location after the transfer of the first article is completed.

Thereafter, the changer 570 changes the transfer flag "false" associated, in the storage box table illustrated in FIG. 11, with the article ID "G1" of the first article identified as a transfer article to a flag "TRUE" expressing that the article is a transfer article and, then, ends the execution of the selection processing.

Figure 16:
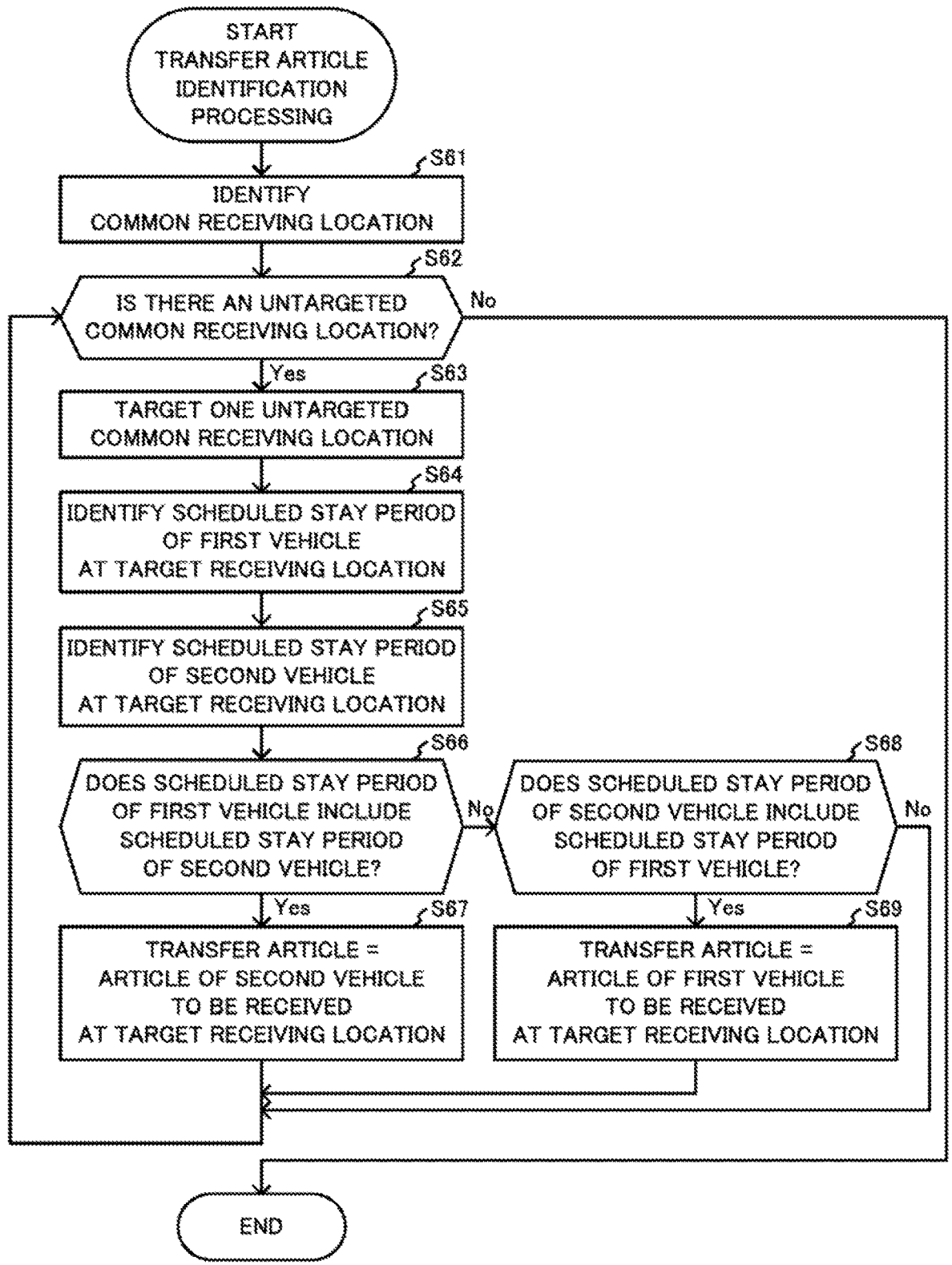
FIG. 16 is a flowchart illustrating an example of transfer article identification processing executed by the control device of the delivery system.

After the selection processing is executed in step S31 of FIG. 14, transfer article identification processing such as illustrated in FIG. 16 is executed in which a transfer article is identified from articles to be received at receiving locations other than the first receiving location (step S32).

When the execution of the transfer article identification processing starts, the storage controller 560 acquires, from the schedule table illustrated in FIG. 9, the identification information "P2" of the second receiving location associated with identification information "100" of the first vehicle 100 and information expressing the scheduled arrival time "10:10" that is later than the scheduled arrival time "09:00" at the first receiving location. As a result, the storage controller 560 identifies the second receiving location as the receiving location that the first vehicle 100 is scheduled to arrive at after departing from the first receiving location.

Likewise, the storage controller 560 identifies the second receiving location and the third receiving location as receiving locations that the second vehicle 200 is scheduled to arrive at after departing from the first receiving location. Thereafter, the storage controller 560 identifies the second receiving location that both the first vehicle 100 and the second vehicle 200 are scheduled to arrive at as a common receiving location (step S61). In contrast, the storage controller 560 does not identify the third receiving location at which the second vehicle 200 is scheduled to arrive but the first vehicle 100 is not scheduled to arrive as a common receiving location.

Next, since, of the identified common receiving locations, the second receiving location has not been targeted, the storage controller 560 determines that there is an untargeted common receiving location (step S62: Yes), targets the second receiving location as one untargeted common receiving location, and sets the second receiving location as a target receiving location (step S63).

Thereafter, the acquirer 510 acquires the scheduled arrival time "10:20" and the scheduled departure time "11:20" associated in the schedule table of FIG. 9 with the identification information "100" of the first vehicle 100 and the identification information "P2" of the second receiving location that is the target receiving location. Next, the storage controller 560 identifies a scheduled stay period, which is a period that the first vehicle 100 is scheduled to stay at the target receiving location, as from the scheduled arrival time "10:20" to the scheduled departure time "11:20" (step S64). Likewise, the acquirer 510 acquires the scheduled arrival time "10:20" and the scheduled departure time "10:50" associated with the identification information "200" of the second vehicle 200 and the identification information "P2" of the target receiving location. Next, the storage controller 560 identifies the scheduled stay period of the second vehicle 200 at the target receiving location as from the scheduled arrival time "10:20" to the scheduled departure time "10:50" (step S65).

Thereafter, the storage controller 560 determines that the scheduled stay period of the first vehicle 100 includes the scheduled stay period of the second vehicle 200 (step S66; Yes). The reason for such a determination is because the time "10:20" at which the scheduled stay period of the first vehicle 100 starts and the time "10:20" at which the scheduled stay period of the second vehicle 200 starts match, and the time "11:20" at which the scheduled stay period of the first vehicle 100 ends is later than the time "10:50" at which the scheduled stay period of the second vehicle 200 ends.

As such, when the fourth article that is scheduled to be received from the second vehicle 200 at the second receiving location is transferred to the first vehicle 100, the need for the second vehicle 200 to move to the second receiving location is eliminated. Therefore, the storage controller 560 identifies the fourth article as a transfer article (step S67). Next, the changer 570 changes the transfer flag "false" associated, in the storage box table illustrated in FIG. 11, with the article ID "G4" of the fourth article identified as a transfer article to the flag "TRUE" expressing that the article is a transfer article.

Thereafter, the storage controller 560 returns to step S62 of FIG. 16, determines that there are no untargeted common receiving locations (step S62: No), and ends the execution of the transfer article identification processing.

After the execution of the transfer article identification processing in step S32 of FIG. 14, the changer 570 initializes a transfer performed flag expressing whether or not a transfer has been performed to a flag "false" expressing that a transfer has not been performed (step S33).

Next, the storage controller 560 acquires the article ID "G1" of the first article associated, in the storage box table of FIG. 11, with the identification information "100" of the first vehicle 100 selected as the departing vehicle and the transfer flag "TRUE" expressing that the article is a transfer article, thereby identifying the transfer article of the departing vehicle (step S34).

Next, since, of the acquired transfer articles, the first article has not yet been targeted, the storage controller 560 determines that there is an untargeted transfer article (step S35: Yes), targets the first article as one of the untargeted articles, and sets the first article as a target article (step S36).

Next, the storage controller 560 acquires information, in the storage box table, expressing a disposal position "left, row 1 column 1" of the storage box 160 associated with the article ID "G1" of the first article that is the target article. The storage controller 560 identifies, on the basis of the acquired information, that the first article is stored in the storage box 160 disposed at the row 1 column 1 position on the left side surface of the first vehicle 100 (hereafter referred to as "left, row 1 column 1, box 160").

Next, the storage controller 560 identifies, on the basis of the information expressing the acquired disposal position "left, row 1 column 1", the storage boxes 260 disposed at row 1 column 1 and row 1 column 2 on the right side surface, and the storage boxes 260 disposed at row 1 column 1 and row 1 column 2 on the left side surface of the second vehicle 200 as receivable boxes capable of receiving the first article that is pushed out from the left, row 1 column 1, box 160 of the first vehicle 100 in order to carry out the transfer. These storage boxes 260 are identified as receivable boxes because, as described while referencing FIG. 4, the storage box 160 of the first vehicle 100 pushes the first article out horizontally and, as such, the storage boxes 260 capable of directly facing the storage box 160 can receive the first article that is pushed out.

In one example, it is sufficient to adjust the advancing directions and the relative positions of the first vehicle 100 and the second vehicle 200 according to the following procedure to cause the storage box 260 of row 1 column 1 on the right side surface of the second vehicle 200 and the left, row 1 column 1, box 160 of the first vehicle 100 to directly face each other. As illustrated in FIG. 2, such a procedure includes firstly setting the advancing directions of the first vehicle 100 and the second vehicle 200 to the same direction and, next, adjusting the positions of the first vehicle 100 and the second vehicle 200 so that the surface of the front side of the locker device 170 of the first vehicle 100 and the surface of the front side of the locker device 270 of the second vehicle 200 are coplanar.

Additionally, it is possible to set the advancing directions of the first vehicle 100 and the second vehicle 200 to the same direction and, in this state, adjust the position of the first vehicle 100 to a position farther back in the advancing direction than the second vehicle 200 to cause the storage box 260 of row 1 column 2 on the right side surface of the second vehicle 200 and the left, row 1 column 1, box 160 of the first vehicle 100 to directly face each other.

Furthermore, it is possible to cause the advancing directions of the first vehicle 100 and the second vehicle 200 to oppose each other and, in this state, adjust the positions of the first vehicle 100 and the second vehicle 200 so that the surface of the front side of the locker device 170 and the surface of the back side of the locker device 270 are coplanar to cause the storage box 260 of row 1 column 2 on the left side surface and the left, row 1 column 1, box 160 to directly face each other.

Moreover, it is possible to set the advancing direction of the first vehicle 100 and the advancing direction of the second vehicle 200 to oppose each other and, in this state, adjust the position of the first vehicle 100 so as to be behind the second vehicle 200 in the advancing direction of the first vehicle 100 to cause the storage box 260 of row 1 column 1 on the left side surface and the left, row 1 column 1, box 160 to directly face each other.

Thereafter, since the symbol "–" expressing that an article is not stored is associated, in the storage box table of FIG. 11, with the identification information "200" of the second vehicle 200 and the information expressing the disposal position "right, row 1 column 1" which is one of the storage boxes 260 identified as receivable boxes, the storage controller 560 determines that there is a vacancy in the receivable boxes 260 of the second vehicle 200 selected as the remaining vehicle (step S37: Yes of FIG. 14). Note that, when a determination is made that there are no vacancies in all of the receivable boxes 260 (step S37; No), the storage controller 560 repeats the processing from step S35 to transfer a different transfer article.

When a determination is made that there is a vacancy in the receivable boxes 260 (step S37: Yes), the storage controller 560 generates a transfer command commanding that the first article be transferred from the left, row 1 column 1, box 160 of the first vehicle 100 to the storage box 260 disposed at the row 1 column 1 position on the right side surface of the second vehicle 200 (hereinafter referred to as "right, row 1 column 1, box 260"). Next, the storage controller 560 adds, to the transfer command, information in which the identification information "100" of the first vehicle 100 is associated with the information expressing the disposal position "left, row 1 column 1", and information in which the identification information "200" of the second vehicle 200 is associated with the information expressing the disposal position "right, row 1 column 1" and, then, outputs the transfer command to the data communication circuit 504a with the first vehicle 100 and the second vehicle 200 as destinations. As a result, the storage controller 560 carries out storage control for causing the first article stored in the first vehicle 100 selected as the departing vehicle to be stored in the second vehicle 200 selected as the remaining vehicle (step S38).

When the first data communication circuit 194a of the first vehicle 100 receives the transfer command, the CPU 191 of the first vehicle 100 acquires the transfer command and acquires the information included in the transfer command. Thereafter, the CPU 191 outputs signals commanding imaging to be performed to the imaging devices 119, 181, and 182, then acquires the two images output by each of the imaging devices 119, 181, and 182, and identifies the positional coordinates and the advancing direction of the second vehicle 200 on the basis of the parallax of the acquired two images. Next, the CPU 191 generates a control signal on the basis of the identified positional coordinates and advancing direction of the second vehicle 200 and the information acquired from the transfer command, and outputs the generated control signal to the drive circuit 199 that is connected to the non-illustrated motors that rotate the plurality of wheels. As a result, the CPU191 of the first vehicle 100 changes the position and the advancing direction of the first vehicle 100 so that the left, row 1 column 1, box 160 of the first vehicle 100 and the right, row 1 column 1, box 260 of the second vehicle 200 directly face each other separated the distance d that is shorter than the height H of the door 162. When the second vehicle 200 receives the transfer command, the position and the advancing direction of the second vehicle 200 are changed in the same manner as the first vehicle 100.

The CPU 191 of the first vehicle 100 again outputs a signal commanding imaging to be performed to the imaging device 182 set on the left side surface of the chassis 110 and, then, acquires the two images output from the imaging device 182. Next, the CPU 191 determines, on the basis of the parallax of the acquired two images, whether or not the left, row 1 column 1, box 160 of the first vehicle 100 and the right, row 1 column 1, box 260 of the second vehicle 200 are directly facing each other separated by the distance d. At this time, when a determination is made that the left, row 1 column 1, box 160 and the right, row 1 column 1, box 260 are not directly facing each other separated by the distance d, the CPU 191 repeats the processing described above from the processing of changing the position and the advancing direction of the first vehicle 100.

Figure 4:
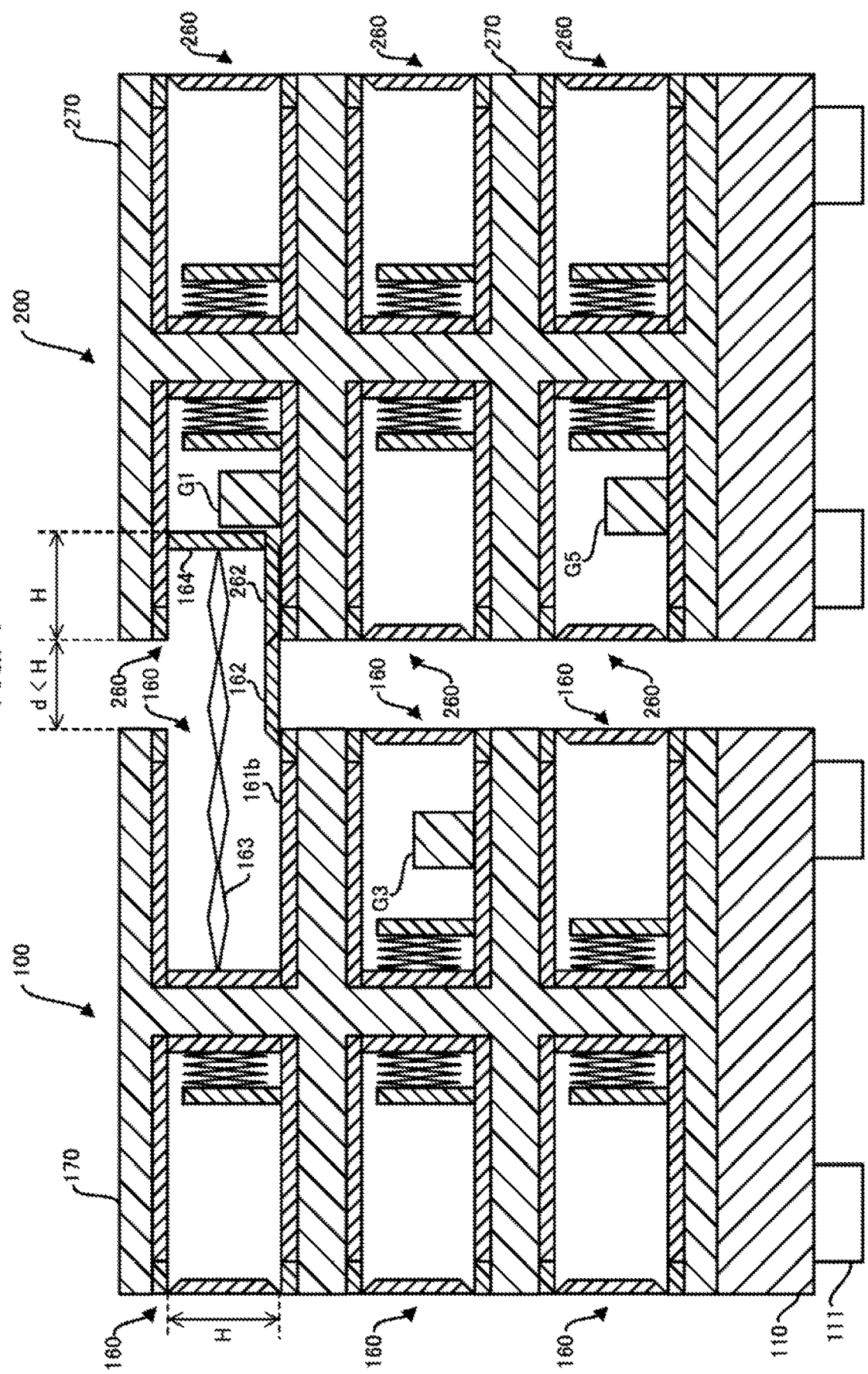
FIG. 4 is a cross-sectional view illustrating the first vehicle and the second vehicle according to the embodiment.

When a determination is made that the left, row 1 column 1, box 160 and the right, row 1 column 1, box 260 are directly facing each other separated by the distance d, the CPU 191 of the first vehicle 100 outputs, to the drive circuit 199 connected to the non-illustrated motors, a control signal for unlocking the door 162 of the left, row 1 column 1, box 160 and a control signal for setting the state of the door 162 to the outwardly open state. As a result, the door 162 functions as a bridge spanning between the left, row 1 column 1, box 160 and the right, row 1 column 1, box 260 as illustrated in FIG. 4. For the second vehicle 200, as with the first vehicle 100, after a determination is made that the left, row 1 column 1, box 160 and the right, row 1 column 1, box 260 are directly facing each other, the state of the expansion/contraction mechanism of the right, row 1 column 1, box 260 is set to the fully contracted state, the door 262 is unlocked, and the state of the door 262 is set to the inwardly open state. The CPU 191 of the first vehicle 100 again outputs a control signal to the imaging device 182 and, then, determines whether or not the right, row 1 column 1, box 260 is in the inwardly open state on the basis of the images output from the imaging device 182. When a determination is made that the right, row 1 column 1, box 260 is not in the inwardly open state, the CPU 191 repeats the processing described above from the processing of outputting a control signal to the imaging device 182. When a determination is made that the right, row 1 column 1, box 260 is in the inwardly open state, the CPU 191 outputs, to the drive circuit 199, a control signal for setting the expansion/contraction mechanism 165 of the left row 1 column 1, box 160 to the fully extended state.

When the expansion/contraction mechanism 165 is extended as illustrated in FIG. 4, the slide plate 164 pushed by the expansion/contraction mechanism 165 slides on the surface of the bottom plate 161b of the left, row 1 column 1, box 160, the surface of the back side of the door 162, and the surface of the front side of the door 262 of the right, row 1 column 1, box 260. As a result, the first article stored in the left, row 1 column 1, box 160 is transferred by being pushed by the slide plate 164 farther inside the right, row 1 column 1, box 260 than the door 262.

Thereafter, the CPU 191 of the first vehicle 100 sequentially outputs, to the drive circuit 199, a control signal for setting the state of the expansion/contraction mechanism 165 of the left, row 1 column 1, box 160 to the fully contracted state, a control signal for setting the state of the door 162 to the closed state, and a control signal for locking the door 162. When a determination is made, on the basis of the images output from the non-illustrated imaging device set on the right side surface of the locker device 270 of the second vehicle 200, that the state of the door 162 of the left, row 1 column 1, box 160 of the first vehicle 100 is in the closed state, the second vehicle 200 determines that the transfer has ended. Thereafter, the second vehicle 200 sets the state of the door 262 of the right, row 1 column 1, box 260 to the closed state and, then, locks the door 262.

When the transfer of the first article ends, the changer 570 changes the value of the transfer performed flag to a value "TRUE" expressing that a transfer has been performed (step S39 of FIG. 14). Next, the changer 570 acquires the article ID "G1" of the first article and the text string "password1" expressing the password that are associated, in the storage box table of FIG. 11, with the identification information "100" of the first vehicle 100 and the information expressing the disposal position "left, row 1 column 1" of the storage box 160 in which the first article was stored prior to the transfer. Next, the changer 570 changes the symbol "−" and the text string "NULL", associated with the identification information "200" of the second vehicle 200 and the information expressing the disposal position "right, row 1 column 1" of the storage box 260 in which the first article became stored due to the transfer, to the acquired article ID "G1" of the first article and the text string "password1" expressing the password. Thereafter, the changer 570 changes the article ID "G1", the text string, and the transfer flag "TRUE" that are associated, in the storage box table, with the identification information "100" of the first vehicle 100 and the information expressing the disposal position "left, row 1 column 1" of the storage box 160, to the symbol "−" expressing that an article is not stored, the text string "NULL" expressing that a password is not set, and the flag "false" expressing that the article is not a transfer article.

Additionally, in the schedule table of FIG. 9, the changer 570 deletes the article ID "G1" of the first article that is associated with the identification information "100" of the first vehicle 100 and the identification information "P1" of the first receiving location, thereby changing the schedule table of FIG. 9 to a schedule table such as illustrated in FIG. 17. Such changes and deletions are carried out because the first vehicle 100 selected as the departing vehicle no longer stores the first article due to the transfer.

Since the article ID associated with the identification information "100" of the first vehicle 100, the identification information "P1" of the first receiving location, and the state information expressing the arrived state is eliminated from the schedule table, the changer 570 determines that there is no longer an article to be received from the first vehicle 100 at the first receiving location where the first vehicle 100 is staying. As such, the changer 570 determines that the first vehicle 100 selected as the departing vehicle can depart from the first receiving location.

Next, the changer 570 acquires the system time. In the present embodiment, as a specific example, a case is described in which a system time of "09:40" is acquired. In the schedule table of FIG. 9, the changer 570 changes the scheduled departure time "09:50" that is associated with the identification information "100" of the first vehicle 100 and the identification information "P1" of the first receiving location to the system time "09:40", thereby changing from the schedule table of FIG. 9 to the schedule table of FIG. 17. As a result, the changer 570 changes the schedule of the first vehicle 100 illustrated in FIG. 10 in which "09:50" is set as the scheduled departure time from the first receiving location, to a schedule such as illustrated in FIG. 18 in which "09:40" is set as the scheduled departure time from the first receiving location (step S40 of FIG. 14).

Additionally, the changer 570 associates the article ID "G1" of the first article with the identification information "200" of the second vehicle 200 and the identification information "P1" of the first receiving location and stores this associated information while retaining the article ID "G2" of the second article that is associated with the identification information "200" of the second vehicle 200 and the identification information "P1" of the first receiving location, thereby changing from the schedule table of FIG. 9 to the schedule table of FIG. 17. Such changes and storing are carried out because the second vehicle 200 selected as the remaining vehicle that remains at the first receiving location now stores the first article in addition to the second article due to the transfer.

The scheduled departure time "10:00" of the second vehicle 200 from the first receiving location is later than the unchanged scheduled departure time "09:50" of the first vehicle 100 and, as such, in the case where transfer of the first article from the first vehicle 100 to the second vehicle 200 is performed, the first article can be received at the first receiving location later than in the case where such transfer is not performed. As such, the notifier 580 generates an extension notification informing that the end time of the receiving period in which the first article can be received is extended from "09:50" to "10:00." Next, the notifier 580 acquires, from the article table illustrated in FIG. 8, the contact information of the recipient associated with the article ID "G1" of the first article, and outputs the generated extension notification to the data communication circuit 504a with the contact information as the destination (step S41 of FIG. 14).

Next, returning to step S35, since the storage controller 560 already targeted the only transfer article stored in the departing vehicle, the storage controller 560 determines that there are no untargeted transfer articles stored in the departing vehicle (step S35; No).

Next, the storage controller 560 acquires the article ID "G4" of the fourth article associated, in the storage box table of FIG. 11, with the identification information "200" of the second vehicle 200 selected as the remaining vehicle and the transfer flag "TRUE" expressing that the article is a transfer article, thereby identifying a transfer article of the remaining vehicle (step S42).

Next, the storage controller 560 executes the same processing as in steps S35 to S41 (steps S43 to S49). As a result, the storage controller 560 stores the fourth article, which is a transfer article stored in the second vehicle 200, in the first vehicle 100 and, then, sets the value of the transfer performed flag to "TRUE."

In the present embodiment, a specific example is described of a case in which the fourth article is stored in the storage box 260 disposed at the row 1 column 2 position on the right side surface of the second vehicle 200 and, as after transferring, is stored in the storage box 160 disposed at the row 1 column 2 position on the left side surface of the first vehicle 100.

The changer 570 acquires the article ID "G4" of the fourth article and the text string "password4" expressing the password that are associated, in the storage box table of FIG. 11, with the identification information "200" of the second vehicle 200 and information expressing the disposal position "right, row 1 column 2" of the storage box 260 in which the fourth article is stored prior to the transfer. Next, the changer 570 changes the symbol "–" and the text string "NULL", which are associated with the identification information "100" of the first vehicle 100 and the information expressing the disposal position "left, row 1 column 2" of the storage box 160 in which the fourth article became stored due to the transfer, to the acquired article ID "G4" of the fourth article and the text string "password4" expressing the password. Thereafter, the changer 570 changes the article ID "G4", the text string "password4", and the transfer flag "TRUE" that are associated, in the storage box table, with the identification information "200" of the second vehicle 200 and the information expressing the disposal position "right, row 1 column 2" of the storage box 260, to the symbol "–" expressing that an article is not stored, the text string "NULL" expressing that a password is not set, and the flag "false" expressing that the article is not a transfer article.

Additionally, in the schedule table of FIG. 9, the changer 570 deletes the article ID "G4" of the fourth article that is associated with the identification information "200" of the second vehicle 200 and the identification information "P2" of the second receiving location. Such changes and deletions are carried out because the second vehicle 200 no longer stores the fourth article due to the transfer.

Furthermore, since the article ID associated with the identification information "200" of the second vehicle 200, the identification information "P2" of the second receiving location, and the state information expressing the non-departed state is eliminated from the schedule table, the changer 570 determines that the schedule related to the second receiving location for second vehicle 200 is unnecessary. Next, the changer 570 changes from the schedule table of FIG. 9 to the schedule table of FIG. 17 by deleting the record in which the identification information "200" of the second vehicle 200 and the identification information "P2" of the second receiving location are stored, thereby deleting the schedule related to the second receiving location from the schedule for the second vehicle 200, as illustrated in FIG. 18.

Additionally, in the schedule table of FIG. 9, the changer 570 associates the article ID "G4" of the fourth article with the identification information "100" of the first vehicle 100 and the identification information "P2" of the second receiving location and stores this associated information while retaining the article ID "G3" of the third article that is associated with the identification information "100" of the first vehicle 100 and the identification information "P2" of the second receiving location. As a result, the schedule table of FIG. 9 is changed to the schedule table of FIG. 17. Such changes and storing are carried out because the first vehicle 100 that moves to the second receiving location now stores the fourth article in addition to the third article due to the transfer.

Thereafter, the notifier 580 outputs an extension notification informing that the end time of the receiving period in which the fourth article can be received is extended from the scheduled departure time "10:50", which is the time at which the second vehicle 200 that stored the fourth article is scheduled to depart from the second receiving location, to the scheduled departure time "11:20" of the first vehicle 100 that now stores the fourth article due to the transfer from the second receiving location.

Next, returning to step S43 of FIG. 14, since the storage controller 560 already targeted the only transfer article stored in the remaining vehicle, the storage controller 560 determines that there are no untargeted transfer articles stored in the remaining vehicle (step $43: No).

Thereafter, although the value of the transfer performed flag is "TRUE" expressing that a transfer has been performed, since the transfer flag of the value "TRUE" expressing that the article is a transfer article is not stored in the storage box table of FIG. 11, the storage controller 560 determines that there are no transfer articles (step S50; No), and ends the execution of the transfer control processing.

Note that, when the storage controller 560 determines that there is a transfer article that is not transferred due to a lack of a vacancy among the receivable boxes and, also, that the value of the transfer performed flag is "TRUE" (step S50; Yes), there is a possibility that, due to the transfer of a different transfer article, a vacancy has been created in the receivable boxes determined not to have a vacancy at the time of the transfer of that transfer article and, therefore, the processing described above is repeated from step S33.

After the execution of the transfer control processing in step S10 of FIG. 12, the movement controller 540 of the control device 500 sequentially executes the processing of steps S01 and S04, thereby determining that the arrival report is not received (step S04: No). Next, the movement controller 540 acquires the system time. In the present embodiment, as a specific example, a case is described in which a system time of "09:41" is acquired.

The movement controller 540 searches the changed schedule table of FIG. 17 for a time earlier than or equal to the system time "09:41" from among the scheduled departure times associated with the arrived state information, and acquires the scheduled departure time "09:40" that is changed by the changer 570. Since the scheduled departure time "09:40" is associated with the identification information "100" of the first vehicle 100 selected as the departing vehicle and the identification information "P1" of the first receiving location, the movement controller 540 determines that the scheduled departure time "09:40" of the first vehicle 100 from the first receiving location has arrived (step S11: Yes of FIG. 12).

Next, the movement controller 540 generates a depart command commanding departure from the first receiving location, and outputs the generated depart command to the data communication circuit 504*a* with the first vehicle 100 as the destination. As a result, the movement controller 540 executes departure control for causing the first vehicle 100 to depart from the first receiving location (step S12).

When the first data communication circuit 194*a* of the first vehicle 100 receives the depart command, the CPU 191 of the first vehicle 100 acquires a signal from the GPS circuit 196, and generates a control signal that causes the first vehicle 100 to travel so as to reduce the difference between the latitude and longitude expressed in the acquired signal and the representative geographical location information expressing the latitude and longitude of the representative geographical location that is the entrance/exit of the first receiving location. Next, the CPU 191 outputs the generated control signal to the drive circuit 199 that is connected to the motors that rotate the plurality of wheels and the like. Thus, the first vehicle 100 moves to the entrance/exit of the first receiving location in order to depart from the first receiving location.

In the present embodiment, it is described that, until a movement command is received from the control device 500, the first vehicle 100 that has departed from a receiving location including the first receiving location stops on a road, a river beach, a park, or a schoolyard where parking and stopping is not forbidden, or in a parking lot where the first vehicle 100 is allowed to park. However, the present embodiment is not limited thereto, and the first vehicle 100 that has departed from the receiving location may circle roads at a predetermined speed near the departed receiving location. The same is true for the second vehicle 200 that has departed from the receiving location.

To realize this, the CPU 191 of the first vehicle 100 reads information expressing the latitude and longitude of a stopping position of the first vehicle 100 that is stored in advance in the flash memory 193*b*. Next, the CPU 191 uses the read information, the representative geographical location information expressing the latitude and longitude of the representative geographical location that is the entrance/exit of the first receiving location, and the information stored in the non-illustrated partial route table to determine a movement route from the entrance/exit of the first receiving location to the stopping position. Thereafter, the CPU 191 generates a control signal for causing the first vehicle 100 to move forward on the determined movement route, and outputs the generated control signal to the drive circuit 199. As a result, the first vehicle 100 departs from the first receiving location and moves to the stopping position of the first vehicle 100.

After the execution of the departure control in step S12 for causing the first vehicle 100 selected as the departing vehicle to depart from the first receiving location, the changer 570 changes the state information associated with the identification information "100" of the first vehicle 100 and the identification information "P1" of the first receiving location in the schedule table of FIG. 17 to state information expressing departed (step S13 of FIG. 12).

In the present embodiment, as a specific example, a description is given of a case in which the recipient of the second article arrives at the first receiving location from after the first vehicle 100 selected as the departing vehicle departs from the first receiving location until the time "10:00" at which the second vehicle 200 selected as the remaining vehicle is scheduled to depart from the first receiving location.

When the recipient arrives at the first receiving location, the recipient confirms the second vehicle 200 that continues to stay at the first receiving location. Thereafter, the recipient performs an operation on the non-illustrated touch screen of the second vehicle 200 for inputting the password displayed on the mobile terminal 902. When the touch screen inputs a signal corresponding to the operation, the non-illustrated CPU of the second vehicle 200 acquires, on the basis of the inputted signal, the text string "password2" expressing the input password. Thereafter, the CPU generates an authentication request that includes the identification information "200" of the second vehicle 200 and the acquired text string "password2" and that requests authentication of the recipient, and outputs the generated authentication request to the non-illustrated first data communication circuit with the control device 500 as the destination.

After the execution of step S13 of FIG. 12, the movement controller 540 of the control device 500 sequentially executes the processing of steps S01, S04, and S11, thereby determining that the scheduled departure time has not arrived (step S11: No). Next, the storage controller 560 determines that the authentication request is received by the data communication circuit 504a (step S14: Yes), and acquires the authentication request from the data communication circuit 504a (step S15a). Thereafter, the storage controller 560 acquires, from the acquired authentication request, the identification information "200" of the second vehicle 200 and the text string "password2" expressing the password. Next, since a record in which the identification information "200" of the second vehicle 200 and the acquired text string "password2" are stored is stored in the storage box table of FIG. 11, the storage controller 560 determines that the authentication of the recipient has succeeded (step S15b: Yes).

Note that, in a case in which the storage controller 560 determines that a record in which the identification information "200" and the text string "password2" are stored is not stored in the storage box table, the storage controller 560 determines that the authentication of the recipient has failed (step S15b: No), and outputs a failure report informing that authentication has failed to the data communication circuit 504a with the second vehicle 200 as the destination. Thereafter, the processing described above is repeated from step S01. Additionally, when the non-illustrated first data communication circuit of the second vehicle 200 receives the failure report, the non-illustrated CPU of the second vehicle 200 displays an error message on the non-illustrated display device.

When a determination is made that authentication has succeeded (step S15b; Yes), the storage controller 560 acquires information expressing the box ID "B12" or the disposal position "right, row 1 column 2" associated with the identification information "200" of the second vehicle 200 and the text string "password2" in the storage box table of FIG. 11. Next, the storage controller 560 generates a success report informing that authentication has succeeded, and a handover command that includes the information expressing the box ID "B12" or the disposal position "right, row 1 column 2" and that commands the second article stored in the storage box 260 identified by that information to be handed over to the recipient. Thereafter, the storage controller 560 outputs the success report and the handover command to the data communication circuit 504a with the second vehicle 200 as the destination, thereby performing handover control for causing the article to be handed over to the recipient (step S16 of FIG. 12).

When the non-illustrated first data communication circuit of the second vehicle 200 receives the success report and the handover command, the non-illustrated CPU of the second vehicle 200 acquires the handover command from the first data communication circuit, and acquires the information expressing the box ID "B12" or the disposal position "right, row 1 column 2" included in the handover command. Thereafter, the CPU outputs, to the non-illustrated drive circuit, a control signal for unlocking the door 262 of the storage box 260 identified by that information, and a control signal for setting the state of the door 262 to the outwardly open state. Thereafter, the CPU outputs, to the non-illustrated imaging device set on the right side surface of the locker device 270, a signal commanding imaging to be performed, then acquires the images output from the imaging device, and determines, on the basis of the acquired images, that the recipient has received the second article. Thereafter, the CPU outputs, to the first data communication circuit with the control device 500 as the destination, a handover report that includes the identification information "200" of the second vehicle 200 and the information expressing the box ID "B12" or the disposal position "right, row 1 column 2", and that informs that the second article that had been stored in the storage box 260 identified by that information has been handed over.

When the data communication circuit 504a of the control device 500 receives the handover report, the changer 570 acquires the handover report from the data communication circuit 504a. Next, the changer 570 acquires the article ID "G2" of the second article that is associated with the identification information "200" of the second vehicle 200 and the box ID "B12" included in the handover report. Thereafter, the changer 570 changes the article ID "G2" and the text string "password2" associated with the identification information "200" and the box ID "B12" to the symbol "–" and the text string "NULL."

Additionally, in the changed schedule table of FIG. 17, the changer 570 deletes the article ID "G2" of the second article that is associated with the identification information "200" of the second vehicle 200 and the identification information "P1" of the first receiving location (step S17 of FIG. 12). Next, since the article ID "G1" of the first article is associated with the identification information "200" of the second vehicle 200 and the identification information "P1" of the first receiving location, the changer 570 determines that the second vehicle 200 is storing the first article that is scheduled to be received at the first receiving location (step S18: Yes). Thereafter, the processing described above is repeated from step S01.

In the present embodiment, as a specific example, a description is given of a case in which the recipient of the first article does not appear at the first receiving location before the scheduled departure time "10:00" from the first receiving location of the second vehicle 200 selected as the remaining vehicle.

When the system time becomes "10:00", the movement controller 540 of the control device 500 sequentially executes the processing of steps S01, S04, and S11, thereby determining that the scheduled departure time "10:00" from the first receiving location of the second vehicle 200 selected as the remaining vehicle has arrived (step S11: Yes). Thereafter, departure control for causing the second vehicle 200 to depart from the first receiving location while storing the first article is executed by executing the processing of steps S12 and S13.

Thereafter, returning to step S01, when the system time becomes "10:10", the movement controller 540 determines that the movement start time "10:10" to the second receiving location of the first vehicle 100 has arrived (step S01: Yes). Thereafter, the processing of steps S02 and S03 is executed, thereby executing movement control for causing the first vehicle 100, storing the first article for which the recipient did not appear and the third article and the fourth article that are scheduled to be received at the second receiving location, to move to the second receiving location. However, movement control for causing the second vehicle 200 to move to the second receiving location is not executed. Such movement control is executed because the schedule related to the second receiving location for the second vehicle 200 is deleted and, as such, there are no records in the changed schedule table of FIG. 17 in which the identification information "200" of the second vehicle 200, the identification information "P2" of the second receiving location, and the movement start time "10:10" of the second vehicle 200 to the second receiving location are stored.

Then, after repeating the processing described above from step S01, the movement controller 540 determines that the arrival report is received from the first vehicle 100 that has arrived at the second receiving location (step S04: Yes), and the processing of steps S05 to S07 is executed. Thus, an arrival notification informing that the third article has arrived at the second receiving location is sent to the mobile terminal 903 of the recipient of the third article, and an arrival notification informing that the fourth article has arrived at the second receiving location is sent to the mobile terminal 904 of the recipient of the fourth article.

Thereafter, the movement controller 540 executes stay control for causing the first vehicle 100 to stay at the second receiving location (step S08), and the selector 550 determines that only the first vehicle 100 is staying at the second receiving location, and that the second vehicle 200, which is another vehicle, is not staying at the second receiving location (step S09: No). Thereafter, the processing described above is repeated from step S01.

Thereafter, when the system time becomes "10:50", a determination is made that the movement start time "10:50" of the second vehicle 200 to the third receiving location has arrived (step S01: Yes), and the processing of steps S02 and S03 is executed.

Then, after repeating the processing described above from step S01, steps S01 to S04 are sequentially executed, thereby making a determination that the arrival report is received from the second vehicle 200 that has arrived at the third receiving location (step S04: Yes), and the processing of steps S05 to S09 is executed. Thus, an arrival notification informing that the fifth article has arrived at the third receiving location is sent to the mobile terminal 905 of the recipient of the fifth article. Thereafter, a determination is made that only the second vehicle 200 is staying at the third receiving location (step S09: No), and the processing described above is repeated from step S01.

In the present embodiment, as a specific example, a description is given of a case in which the recipient of the third article and the recipient of the fourth article do not appear at the second receiving location before the scheduled departure time "11:20" from the second receiving location of the first vehicle 100, and the recipient of the fifth article appears at the third receiving location by the scheduled departure time "11:20" from the third receiving location of the second vehicle 200.

A determination is made that an authentication request for the recipient of the fifth article is received (step S14: Yes) by sequentially executing steps S01, S04, and S11, and the processing of steps S15a to S16 is executed. Thus, the fifth article stored in the second vehicle 200 is received by the recipient.

Thereafter, in the changed schedule table of FIG. 17, the changer 570 deletes the article ID "G5" of the fifth article that is associated with the identification information "200" of the second vehicle 200 and the identification information "P3" of the third receiving location (step S17). Next, since an article ID is not associated with the identification information "200" of the second vehicle 200 and the identification information "P3" of the third receiving location, the changer 570 determines that the second vehicle 200 is not storing an article that is scheduled to be received at the third receiving location (step $18: No).

Thereafter, departure control for causing the second vehicle 200 to depart from the third receiving location is executed by executing the processing of steps S12 and S13 and, then, the processing described above is repeated from step S01.

Thereafter, when the system time becomes "11:20", the processing of steps S01, S04, and S11 is sequentially executed and, as a result, a determination is made that the scheduled departure time "11:20" from the second receiving location of the first vehicle 100 has arrived (step S11: Yes). Then, the processing of steps S12 and S13 is executed. Thus, the first vehicle 100 is caused to depart from the second receiving location.

Thereafter, a determination is made in step S01 that the movement start time "11:20", at which the first vehicle 100 and the second vehicle 200 are to start moving to the office, has arrived (step S01: Yes), and the processing of steps S02 and S03 is executed. Thus, movement control is executed for causing the first vehicle 100 and the second vehicle 200 to move to the office. When the CPU 191 of the first vehicle 100 determines, on the basis of a signal output from the GPS circuit 196, that the first vehicle 100 has arrived at the office, the CPU 191 outputs, to the data communication circuit 104a with the control device 500 as the destination, a return report that includes the identification information "100" of the first vehicle 100 and that informs that the first vehicle 100 has returned to the office. Thereafter, the data communication circuit 104a of the first vehicle 100 sends the return report to the control device 500. In a manner similar to the first vehicle 100, the second vehicle 200 sends a return report that includes the identification information "200" of the second vehicle 200.

Thereafter, when steps S01, S04, S11, S14, and S19 are sequentially executed, the changer 570 of the control device 500 determines that the arrival report is received by the data communication circuit 504a (step S19: Yes) and acquires the return report from the data communication circuit 504a (step S20a). Thereafter, the changer 570 deletes the schedules executed by the first vehicle 100 or the second vehicle 200 by deleting, from the schedule table of FIG. 17, the records in which the identification information "100" of the first vehicle 100 or the identification information "200" of the second vehicle 200 included in the acquired return report is stored (step S20b). Thereafter, the processing described above is repeated from step S01. Note that, in a case in which a determination is made that the return report is not received (step S19: No), the processing is repeated from step S01.

According to these configurations, the control device 500 includes the selector 550 that selects one of the first vehicle 100 and the second vehicle 200 as the remaining vehicle that stores the first article and the second article and that remains at the first receiving location where the first article and the second article are to be received, and selects the other as the departing vehicle that departs from the first receiving location, when the second vehicle 200 storing the second article arrives at the first receiving location while the first vehicle 100 storing the first article stays at the first receiving location. Additionally, the control device 500 includes the storage controller 560 that identifies the first article or the second article stored in the selected departing vehicle as a transfer article to be transferred from the departing vehicle to the remaining vehicle, and causes the identified transfer article to be stored in the remaining vehicle, and the movement controller 540 that causes the departing vehicle to depart from the first receiving location when the transfer article is stored in the remaining vehicle. As such, even though the control device 500 causes the first vehicle 100 or the second vehicle 200 selected as the departing vehicle to depart from the first receiving location, the second vehicle 200 or the first vehicle 100 selected as the remaining vehicle stores the transfer article and continues to stay at the first receiving location. As a result, the transfer article can be caused to be received at the first receiving location. Therefore, the control device 500 can reduce the area at the first receiving location occupied by the first vehicle 100 and the second vehicle 200 in order to cause the transfer article to be received at the first receiving location and, as such, decrease in the use efficiency of the first receiving location can be suppressed.

In the present embodiment, it is described that the use efficiency of the receiving location is calculated by dividing the area usable by a person using the receiving location by the area of the receiving location, but the present embodiment is not limited thereto. The area usable by a person using the receiving location includes the area of regions where objects such as the first vehicle 100 and the second vehicle 200, for example, are not placed.

According to these configurations, the acquirer 510 of the control device 500 acquires, from the schedule table illustrated in FIG. 9, the identification information "100" identifying the first vehicle 100 in association with the information expressing the scheduled departure time "09:50" that is the time at which the first vehicle 100 is scheduled to depart from the first receiving location. Additionally, the acquirer 510 acquires the identification information "200" identifying the second vehicle 200 in association with the scheduled departure time "10:00" that is the time at which the second vehicle 200 is scheduled to depart from the first receiving location. Furthermore, when the selector 550 of the control device 500 determines that the scheduled departure time "09:50" of the first receiving location that is associated with the identification information "100" of the first vehicle 100 is earlier than the scheduled departure time "10:00" of the first receiving location that is associated with the identification information "200" of the second vehicle 200, the selector 550 selects the first vehicle 100 as the departing vehicle and selects the second vehicle 200 as the remaining vehicle. As such, the control device 500 can hold the first article stored in the first vehicle 100 at the first receiving location until the scheduled departure time "10:00" of the second vehicle 200, which is later than the scheduled departure time "09:50" of the first vehicle 100. That is, the control device 500 can extend the time in which the recipient of the first article can receive the first article at the first receiving location while suppressing decreases in the operating efficiency of the first vehicle 100.

According to these configurations, the movement controller 540 of the control device 500 causes the first vehicle 100 to stay at the first receiving location when the first vehicle 100 arrives at the first receiving location, and, also, causes the second vehicle 200 to stay at the first receiving location when the second vehicle 200 arrives at the first receiving location. Additionally, when the second vehicle 200 is selected as the remaining vehicle, the first article stored in the first vehicle 100 selected as the departing vehicle is identified as a transfer article, and that transfer article is stored in the second vehicle 200, the movement controller 540 of the control device 500 causes the first vehicle 100 to depart from the first receiving location at the time "09:40" that is earlier than the scheduled departure time "09:50" of the first receiving location acquired in association with the identification information "100" of the first vehicle 100 from the schedule table of FIG. 9. Therefore, the control device 500 can cause the first vehicle 100 to depart from the first receiving location at a time earlier than the unchanged scheduled departure time "09:50", even if the first article has not been received by the recipient.

According to these configurations, when the second vehicle 200 is selected as the remaining vehicle and, also, the first article identified as a transfer article is transferred to the second vehicle 200 from the first vehicle 100 selected as the departing vehicle, the notifier 580 of the control device 500 outputs a notification informing that the time "09:50" at which the receiving period of the first article ends is extended to the scheduled departure time "10:00" of the second vehicle 200 from the first receiving location. As a result, when the recipient of the first article checks this notification, the recipient can ascertain that the first article can be received at the first receiving location even if the non-extended time "09:50" has passed, provided that the extended time "10:00" has not passed. Therefore, in addition to improving the convenience of the user, the control device 500 can improve the possibility of the first article being received and, as such, the possibility of the first article being re-delivered can be reduced and delivery efficiency can be improved.

In the present embodiment, it is explained that the delivery efficiency is calculated by dividing the total number of articles received from the first vehicle 100 and the second vehicle 200 by the sum of the total delivery time from when the first vehicle 100 departs from the office to when the first vehicle 100 returns to the office and the total delivery time from when the second vehicle 200 departs from the office to when the second vehicle 200 returns to the office. However, the present embodiment is not limited thereto.

According to these configurations, the first vehicle 100 arrives at the first receiving location further storing the third article, and the second vehicle 200 arrives at the first receiving location further storing the fourth article. Additionally, the acquirer 510 of the control device 500 further acquires, from the schedule table illustrated in FIG. 9 in an associated manner, the identification information "100" identifying the first vehicle 100, the identification information "P2" identifying the second receiving location where the third article and the fourth article are to be received, the scheduled arrival time "10:20" of the first vehicle 100 at the second receiving location, and the scheduled departure time "11:20" of the first vehicle 100 from second receiving location. Furthermore, the acquirer 510 of the control device 500 further acquires, in an associated manner, the identification information "200" of the second vehicle 200, the identification information "P2" of the second receiving location, the scheduled arrival time "10:20" of the second vehicle 200 at the second receiving location, and the scheduled departure time "10:50" of the second vehicle 200 from the second receiving location. In a case in which the scheduled stay period of the first vehicle 100 at the second receiving location, which is the period from the scheduled arrival time "10:20" to the scheduled departure time "11:20" associated with the identification information "100" of the first vehicle 100 and the identification information "P2" of the second receiving location, includes the scheduled stay period of the second vehicle 200 at the second receiving location, which is the period from the scheduled arrival time "10:20" to the scheduled departure time "10:50" associated with the identification information "200" of the second vehicle 200 and the identification information "P2" of the second receiving location, the storage controller 560 of the control device 500 identifies the fourth article stored in the second vehicle 200 as a transfer article and causes the identified transfer article to be stored in the first vehicle 100 at the first receiving location. Additionally, after the fourth article that is the transfer article is stored in the first vehicle 100 in which the third article is stored, the movement controller 540 of the control device 500 causes the first vehicle 100 to move to the second receiving location at which the third article and the fourth article are to be received. As a result, the delivery efficiency and the operating efficiency of the first vehicle 100 and the second vehicle 200 can be improved.

Modified Example 1 of Embodiment

In the present embodiment, it is described that, as illustrated in FIG. 10, the schedule generator 530 of the control device 500 generates a schedule in which the first vehicle 100 departs from the first receiving location at the scheduled departure time "09:50" and, thereafter, the second vehicle 200 departs from the first receiving location at the scheduled departure time "10:00." However, the present embodiment is not limited thereto.

In the present embodiment, it is described that the schedule generator 530 generates a schedule in which the first vehicle 100 and the second vehicle 200 arrive at the second receiving location at the scheduled arrival time "10:20", the second vehicle 200 departs from the second receiving location at the scheduled departure time "10:50" and, thereafter, the first vehicle 100 departs from the second receiving location at the scheduled departure time "11:20." That is, in the present embodiment, it is described that the scheduled stay period of the first vehicle 100 at the second receiving location includes the scheduled stay period of the second vehicle 200 at the second receiving location. However, the present embodiment is not limited thereto.

The schedule generator 530 of the control device 500 according to the present modified example generates a schedule such as illustrated FIG. 19 in which the second vehicle 200 departs from the first receiving location at the scheduled departure time "09:50" and, thereafter, the first vehicle 100 departs from the first receiving location at the scheduled departure time "10:00."

Additionally, the schedule generator 530 according to the present modified example generates a schedule in which the first vehicle 100 and the second vehicle 200 arrive at the second receiving location at the scheduled arrival time "10:20", the first vehicle 100 departs from the second receiving location at the scheduled departure time "10:50" and, thereafter, the second vehicle 200 departs from the second receiving location at the scheduled departure time "11:20." That is, in the present modified example, the scheduled stay period of the second vehicle 200 at the second receiving location includes the scheduled stay period of the first vehicle 100 at the second receiving location.

As such, the identification information "100" identifying the first vehicle 100, the identification information "P1" identifying the first receiving location, and information expressing the scheduled departure time "10:00" that is the time at which the first vehicle 100 is scheduled to depart from the first receiving location are associated, and this associated information is stored in a non-illustrated schedule table according to the present modified example. Additionally, the identification information "200" of the second vehicle 200, the identification information "P1" of the first receiving location, and information expressing the scheduled departure time "09:50" that is the time at which the second vehicle 200 is scheduled to depart from the first receiving location are associated, and this associated information is stored in the non-illustrated schedule table.

The identification information "100" of the first vehicle 100, the identification information "P2" identifying the second receiving location where the third article and the fourth article are to be received, the scheduled arrival time "10:20" of the first vehicle 100 at the second receiving location, and the scheduled departure time "10:50" of the first vehicle 100 from second receiving location are associated, and this associated information is stored in the non-illustrated schedule table. Additionally, the identification information "200" of the second vehicle 200, the identification information "P2" of the second receiving location, the scheduled arrival time "10:20" of the second vehicle 200 at the second receiving location, and the scheduled departure time "11:20" of the second vehicle from second receiving location are associated, and this associated information is stored in the non-illustrated schedule table.

As such, in the selection processing illustrated in FIG. 15, the acquirer 510 of the control device 500 according to the present modified example acquires, from the non-illustrated schedule table, the information expressing the scheduled departure time "10:00" associated with the identification information "100" identifying the first vehicle 100 and the identification information "P1" of the first receiving location (step S51). Additionally, the acquirer 510 acquires, from the non-illustrated schedule table, the information expressing the scheduled departure time "09:50" associated with the identification information "200" and the identification information "P1" (step S52).

Thereafter, the selector 550 determines that the scheduled departure time "10:00" of the first vehicle 100 from the first receiving location is not earlier than the scheduled departure time "09:50" of the second vehicle 200 from the first receiving location (step S53; No). Next, the selector 550 selects the first vehicle 100 as the remaining vehicle that remains at the first receiving location (step S57), and selects the second vehicle 200 as the departing vehicle that departs from the first receiving location (step S58).

Thereafter, the storage controller 560 identifies the second article, which is stored in the second vehicle 200 selected as the departing vehicle, as a transfer article to be transferred from the departing vehicle to the remaining vehicle (step S59). Thereafter, in the storage box table illustrated in FIG. 11, the changer 570 changes the transfer flag "false" associated with the article ID "G2" of the second article identified as a transfer article to a flag value "TRUE" expressing that the article is a transfer article and, then, ends the execution of the selection processing.

Thereafter, in the transfer article identification processing of FIG. 16, the storage controller 560 according to the present modified example determines that the scheduled stay period of the first vehicle 100 at the second receiving location does not include the scheduled stay period of the second vehicle 200 at the second receiving location (step S66; No). Next, the storage controller 560 determines that the scheduled stay period of the second vehicle 200 includes the scheduled stay period of the first vehicle 100 (step S68: Yes).

Thereafter, the storage controller 560 identifies the third article that is scheduled to be received from the first vehicle 100 at the second receiving location as a transfer article (step S69). Next, the storage controller 560 repeats the processing described above from step S62 until there are no untargeted common receiving locations and, thereafter, ends the execution of the transfer article identification processing.

Next, in step S38 of FIG. 14, the storage controller 560 of the control device 500 according to the present modified example carries out storage control for causing the second article, which is the transfer article stored in the second vehicle 200 selected as the departing vehicle, to be stored in the first vehicle 100 selected as the remaining vehicle. Next, in step S40, in the non-illustrated schedule table, the changer 570 of the control device 500 according to the present modified example changes the scheduled departure time "09:50" stored in association with the identification information "200" of the second vehicle 200 to a time earlier than before changing. Thereafter, in step S41, the notifier 580 of the control device 500 according to the present modified example outputs an extension notification informing that the time "09:50" at which the receiving period of the second article ends is extended to the scheduled departure time "10:00" of the first vehicle 100 from the first receiving location.

Thereafter, in step S46, the storage controller 560 carries out storage control for causing the third article, which is a transfer article stored in the first vehicle 100 selected as the remaining vehicle, to be stored in the second vehicle 200 selected as the departing vehicle at the first receiving location. Next, in step S48, in the non-illustrated schedule table, the changer 570 of the control device 500 according to the present modified example associates the article ID "G3" of the third article with the identification information "200" of the second vehicle 200 and the identification information "P2" of the second receiving location and stores this associated information while retaining the article ID "G4" of the fourth article that is associated with the identification information "200" of the second vehicle 200 and the identification information "P2" of the second receiving location.

Furthermore, the changer 570 deletes the article ID "G3" of the third article that is associated with the identification information "100" of the first vehicle 100 and the identification information "P2" of the second receiving location. Furthermore, since the article ID associated with the identification information "100" of the first vehicle 100, the identification information "P2" of the second receiving location, and the state information expressing the non-departed state is eliminated from the non-illustrated schedule table, the changer 570 determines that the schedule of the first vehicle 100 related to the second receiving location is unnecessary. Therefore, the changer 570 deletes the record in which the identification information "100" of the first vehicle 100 and the identification information "P2" of the second receiving location are stored, thereby deleting the schedule of the first vehicle 100 related to the second receiving location.

Thereafter, in step S49, the notifier 580 of the control device 500 according to the present modified example outputs an extension notification informing that the time "10:50" at which the receiving period of the third article ends is extended to the scheduled departure time "11:20" of the second vehicle 200 from the second receiving location.

Next, when, in step S11 of FIG. 12, a determination is made that the changed scheduled departure time of the second vehicle 200 has arrived, the movement controller 540 of the control device 500 according to the present modified example executes departure control for causing the second vehicle 200 to depart from the first receiving location.

Thereafter, when, in step S01, a determination is made that the movement start time "10:10" of the second vehicle 200 has arrived, the movement controller 540 executes movement control for causing the second vehicle 200 to move to the second receiving location. However, since the record in which the movement start time "10:10" of the first vehicle 100 to the second receiving location has been deleted from the non-illustrated schedule table, the movement controller 540 does not execute movement control for causing the first vehicle 100 to move to the second receiving location.

Modified Example 2 of Embodiment

In the present embodiment and in Modified Example 1 of the present embodiment, it is described that the schedule generator 530 of the control device 500 generates schedules such as illustrated in FIGS. 10 and 19 in which the scheduled arrival time of the first vehicle 100 at the second receiving location and the scheduled arrival time of the second vehicle 200 at the second receiving location are the same and, also, the scheduled departure time of the first vehicle 100 from the second receiving location and the scheduled departure time of the second vehicle 200 from the second receiving location are different.

However, the present embodiment is not limited thereto, and a configuration is possible in which the schedule generator 530 generates a schedule in which the scheduled arrival time of the first vehicle 100 at the second receiving location and the scheduled arrival time of the second vehicle 200 at the second receiving location are different, and the scheduled departure time of the first vehicle 100 from the second receiving location and the scheduled departure time of the second vehicle 200 from the second receiving location are the same.

When the scheduled arrival time of the first vehicle 100 at the second receiving location is earlier than the scheduled arrival time of the second vehicle 200 at the second receiving location, the storage controller 560 determines, in the transfer article identification processing of FIG. 16, that the scheduled stay period of the first vehicle 100 at the second receiving location includes the scheduled stay period of the second vehicle 200 at the second receiving location (step S66; Yes). Thereafter, the storage controller 560 identifies the fourth article that is scheduled to be received from the second vehicle 200 at the second receiving location as a transfer article (step S67).

In contrast, when the scheduled arrival time of the first vehicle 100 at the second receiving location is later than the scheduled arrival time of the second vehicle 200 at the second receiving location, the storage controller 560 determines that the scheduled stay period of the first vehicle 100 at the second receiving location does not include the scheduled stay period of the second vehicle 200 at the second receiving location (step S66; No). Next, the storage controller 560 determines that the scheduled stay period of the second vehicle 200 at the second receiving location includes the scheduled stay period of the first vehicle 100 at the second receiving location (step S68; Yes). Thereafter, the storage controller 560 identifies the third article, which is scheduled to be received from the first vehicle 100 at the second receiving location, as a transfer article (step S69).

Modified Example 3 of Embodiment

In the present embodiment, it is described that, as illustrated in FIG. 10, the schedule generator 530 of the control device 500 generates a schedule in which the first vehicle 100 departs from the first receiving location at the scheduled departure time "09:50" and, thereafter, the second vehicle 200 departs from the first receiving location at the scheduled departure time "10:00." However, the present embodiment is not limited thereto.

In the present embodiment, it is described that the schedule generator 530 of the control device 500 generates a schedule in which the first vehicle 100 and the second vehicle 200 arrive at the second receiving location at the scheduled arrival time "10:20", the second vehicle 200 departs from the second receiving location at the scheduled departure time "10:50" and, thereafter, the first vehicle 100 departs from the second receiving location at the scheduled departure time "11:20." However, the present embodiment is not limited thereto.

The schedule generator 530 of the control device 500 according to the present modified example generates a schedule such as illustrated FIG. 20 in which the first vehicle 100 and the second vehicle 200 depart from the first receiving location at the scheduled departure time "10:00."

Additionally, the schedule generator 530 of the control device 500 according to the present modified example generates a schedule in which the first vehicle 100 and the second vehicle 200 arrive at the second receiving location at the scheduled arrival time "10:20", and the first vehicle 100 and the second vehicle 200 depart from the second receiving location at the scheduled departure time "11:20."

As such, in the selection processing illustrated in FIG. 15, the selector 550 of the control device 500 according to the present modified example determines that the scheduled departure time "10:00" of the first vehicle 100 from the first receiving location is not earlier than the scheduled departure time "10:00" of the second vehicle 200 from the first receiving location (step S53; No). Thereafter, the selector 550 executes steps S57 to S59, thereby selecting the first vehicle 100 as the remaining vehicle, and selecting the second vehicle 200 as the departing vehicle.

However, the present embodiment is not limited thereto, and a configuration is possible in which, when a determination is made that the scheduled departure time "10:00" of the first vehicle 100 from the first receiving location is the same as the scheduled departure time "10:00" of the second vehicle 200 from the first receiving location, the selector 550 selects the second vehicle 200 as the remaining vehicle and selects the first vehicle 100 as the departing vehicle.

Additionally, since the scheduled stay period of the first vehicle 100 at the second receiving location matches the scheduled stay period of the second vehicle 200 at the second receiving location, the storage controller 560 according to the present modified example determines, in the transfer article identification processing of FIG. 16, that the scheduled stay period of the first vehicle 100 includes the scheduled stay period of the second vehicle 200 (step S66; Yes). Next, the storage controller 560 identifies the fourth article, which is scheduled to be received from the second vehicle 200 at the second receiving location, as a transfer article (step S67).

However, the present embodiment is not limited thereto, and a configuration is possible in which, when a determination is made that the scheduled stay period of the first vehicle 100 at the second receiving location matches the scheduled stay period of the second vehicle 200 at the second receiving location, the storage controller 560 identifies the third article, which is scheduled to be received from the first vehicle 100 at the second receiving location, as a transfer article.

Furthermore, the present embodiment is not limited thereto, and a configuration is possible in which, when a determination is made that the scheduled departure time "10:00" of the first vehicle 100 from the first receiving location is the same as the scheduled departure time "10:00" of the second vehicle 200 from the first receiving location, the selector 550 of the control device 500 selects, in accordance with a predetermined rule or on the basis of random numbers, one of the first vehicle 100 and the second vehicle 200 as the remaining vehicle and the other as the departing vehicle.

For example, the predetermined rule may be a rule for selecting, from the first vehicle 100 and the second vehicle 200, the vehicle of which the scheduled arrival time at the first receiving location is later as the remaining vehicle and the vehicle of which the scheduled arrival time is earlier as the departing vehicle. The control device 500 performs selection in this manner because, compared to the vehicle of which the scheduled arrival time is earlier, the motor of the vehicle of which the scheduled arrival time is later has cooled less due to heat generated by moving. According to this configuration, the control device 500 can prevent the non-illustrated motors of the first vehicle 100 and the second vehicle 200 from breaking down due to continuous driving or driving in shorter intervals.

Additionally, a configuration is possible in which, when a determination is made that the scheduled stay period of the first vehicle 100 at the second receiving location matches the scheduled stay period of the second vehicle 200 at the second receiving location, the storage controller 560 of the control device 500 selects, in accordance with a predetermined rule or on the basis of random numbers, one of the first vehicle 100 and the second vehicle 200 as a transfer source and the other as a transfer destination. That is, the storage controller 560 may identify, as a transfer article, an article scheduled to be received from the vehicle selected as the transfer source at the second receiving location. Modified Example 4 of Embodiment In the present embodiment, it is described that the scheduled stay period of the first vehicle 100 at the second receiving location includes the scheduled stay period of the second vehicle 200 at the second receiving location. Additionally, in Modified Example 1 of the present embodiment, it is described that the scheduled stay period of the second vehicle 200 at the second receiving location includes the scheduled stay period of the first vehicle 100 at the second receiving location.

However, in this modified example of the present embodiment, the schedule generator 530 of the control device 500 generates, for example, a schedule in which the first vehicle 100 arrives at the second receiving location at the scheduled arrival time "09:50" and, thereafter, departs from the second receiving location at the scheduled departure time "10:50." Additionally, the schedule generator 530 generates a schedule in which the second vehicle 200 arrives at the second receiving location at the scheduled arrival time "10:20" and, thereafter, departs from the second receiving location at the scheduled departure time "11:20." That is, in the present modified example, the scheduled stay period of the first vehicle 100 at the second receiving location does not include the scheduled stay period of the second vehicle 200 at the second receiving location and, also, the scheduled stay period of the second vehicle 200 does not include the scheduled stay period of the first vehicle 100.

As such, in the transfer article identification processing of FIG. 16, the storage controller 560 according to the present modified example determines that the scheduled stay period of the first vehicle 100 at the second receiving location does not include the scheduled stay period of the second vehicle 200 at the second receiving location (step S66; No). Next, the storage controller 560 determines that the scheduled stay period of the second vehicle 200 does not include the scheduled stay period of the first vehicle 100 (step S68: No). Thereafter, the storage controller 560 does not identify a transfer article and repeats the processing from step S62.

Modified Example 5 of Embodiment

It is described that the first vehicle 100 and the second vehicle 200 according to the present embodiment stop on roads or the like, or circle on roads or the like from after departing from the first receiving location until the arrival of the movement start time when movement to the second receiving location or the third receiving location starts. However, the present embodiment is not limited thereto, and the first vehicle 100 and the second vehicle 200 according to the present modified example start moving to the second receiving location or the third receiving location upon departure from the first receiving location.

As such, the schedule generator 530 of the control device 500 according to the present modified example executes non-illustrated schedule generation processing to generate schedules such as illustrated in FIG. 10 for the first vehicle 100 and the second vehicle 200 and, then, modifies the generated schedules to schedules such as illustrated in FIG. 21. As such, in the schedule table illustrated in FIG. 9, the schedule generator 530 modifies the movement start time "10:10" associated with the identification information "100" of the first vehicle 100 and the identification information "P2" of the second receiving location to the same time as the scheduled departure time "09:50" associated with the identification information "100" and the identification information "P1" of the first receiving location. The schedule generator 530 carries out such a modification in order to cause the first vehicle 100 to start moving to the second receiving location at the same time as departing from the first receiving location.

The schedule generator 530 calculates a scheduled movement time "00:10" of the first vehicle 100 from the first receiving location to the second receiving location by subtracting the movement start time "10:10" from the scheduled arrival time "10:20" associated, in the schedule table of FIG. 9, with the identification information "100" and the identification information "P2." Next, the schedule generator 530 modifies the scheduled arrival time "10:20" associated with the identification information "100" and the identification information "P2" to a time "10:00" that is a scheduled movement time "00:10" later than the modified movement start time "09:50."

Thereafter, the schedule generator 530 modifies the movement start time "10:10" associated with the identification information "200" of the second vehicle 200 and the identification information "P2" of the second receiving location to the same time as the scheduled departure time "10:00" associated with the identification information "200" and the identification information "P1" of the first receiving location and, also, modifies the scheduled arrival time "10:20" to "10:10."

Next, in step S40 of the transfer control processing illustrated in FIG. 14, the changer 570 of the control device 500 according to the present modified example changes the scheduled departure time "09:50" associated with the identification information "100" of the first vehicle 100 selected as the departing vehicle and the identification information "P1" of the first receiving location to the system time "09:40", as in the present embodiment. Thereafter, the changer 570 changes the movement start time "09:50" associated with the identification information "100" of the first vehicle 100 and the identification information "P2" of the second receiving location to the same time as the changed scheduled departure time "09:40."

As in the present embodiment, in step S48, the changer 570 according to the present modified example determines that the schedule of second vehicle 200 related to the second receiving location is made unnecessary due to the transfer of the article, and deletes the record, in which the identification information "200" of the second vehicle 200 and the identification information "P2" of the second receiving location are stored, from the schedule table of FIG. 9. Thereafter, the changer 570 changes the movement start time "10:50" associated with the identification information "200" of the second vehicle 200 and the identification information "P3" of the third receiving location to the same time as the scheduled departure time "10:00" from the first receiving location, and changes the scheduled arrival time "11:00" at the third receiving location to "10:10."

According to these configurations, when the first vehicle 100 is selected as the departing vehicle, the changer 570 of the control device 500 changes the scheduled departure time "09:50" from the first receiving location associated with the identification information "100" of the first vehicle 100 and the identification information "P1" of the first receiving location to a time "09:40" that is earlier than before changing. Additionally, the changer 570 changes the movement start time "09:50" to the second receiving location associated with the identification information "100" of the first vehicle 100 and the identification information "P2" of the second receiving location to the same time as the changed scheduled departure time "09:40" from the first receiving location, and changes the scheduled arrival time "10:00" at the second receiving location to a time "09:50" that is earlier than before changing. Due to this, the control device 500 can hold, at the second receiving location, the third article and the fourth article that are to be received at the second receiving location from the time "09:50", which is earlier than the unchanged scheduled arrival time "10:00", until the scheduled departure time "12:20." As a result, the period in which the recipient can receive the third article or the fourth article at the second receiving location can be extended.

Modified Example 6 of Embodiment

In the present embodiment, it is described that only the first article, which is scheduled to be received at the first receiving location and is stored in the first vehicle 100 selected as the departing vehicle, is transferred to the second vehicle 200 selected as the remaining vehicle. However, the present embodiment is not limited thereto.

Additionally, in the present embodiment, it is described that only the fourth article, which is stored in the second vehicle 200 and is scheduled to be received at the second receiving location, is transferred to the first vehicle 100. However, the present embodiment is not limited thereto.

For example, a configuration is possible in which, if an article A and an article B scheduled to be received at the first receiving location are stored in the first vehicle 100 selected as the departing vehicle, the article A and the article B are transferred to the second vehicle 200 selected as the remaining vehicle.

As another example, a configuration is possible in which, if an article C and an article D scheduled to be received at the second receiving location are stored in the second vehicle 200, the article C and the article D are transferred to the first vehicle 100 at the first receiving location.

In such a case, it is sufficient that, in step S56 of FIG. 15, among the articles stored in the first vehicle 100 selected as the departing vehicle, the article A and the article B scheduled to be received at the first receiving location are identified as transfer articles.

Additionally, in such a case, it is sufficient that, in step S67 of FIG. 16, among the articles stored in the second vehicle 200, the article C and the article D scheduled to be received at the second receiving location that is the target receiving location are identified as transfer articles.

Thereafter, the processing of steps S35 to S41 of FIG. 14 is repeated and, when there is a vacancy in the receivable boxes 260 corresponding to the storage box 160 in which the article A is stored, the article A is transferred from the first vehicle 100 to the second vehicle 200 and, when there is a vacancy in the receivable boxes 260 corresponding to the storage box 160 in which the article B is stored, the article B is transferred.

Additionally, the processing of steps S43 to S49 of FIG. 14 is repeated and, when there is a vacancy in the receivable boxes 160 corresponding to the storage box 260 in which the article C is stored, the article C is transferred from the second vehicle 200 to the first vehicle 100 and, when there is a vacancy in the receivable boxes 160 corresponding to the storage box 260 in which the article D is stored, the article D is transferred.

Modified Example 7 of Embodiment

In the present embodiment, it is described that the delivery system 1 includes two vehicles, namely the first vehicle 100 and the second vehicle 200, and the control device 500 that controls the two vehicles. However, the present embodiment is not limited thereto.

The delivery system 1 according to the present modified example includes k vehicles (where k is an integer of 3 or greater), and the control device 500. In a case in which l vehicles (where l is an integer equal to or greater than 3 and equal to or less than k) stay at the first receiving location, the control device 500 repeatedly executes the transfer control processing illustrated in FIG. 15 l-1 times in accordance with the following procedure.

Firstly, the control device 500 executes a first transfer control processing with the vehicle that arrived first at the first receiving location as the first vehicle 100 and the vehicle that arrived second at the first receiving location as a second vehicle.

Next, the control device 500 initializes a value of a variable m expressing the number of times the transfer control processing is executed to a value "1." Thereafter, the control device 500 executes the m+1th transfer control processing with the vehicle selected as the remaining vehicle in the mth transfer control processing as the first vehicle 100 and the vehicle that arrived 2+mth at the first receiving location as the second vehicle.

Thereafter, the control device 500 increases the value of the variable m by a value "1", and then, determines whether or not the value of the variable m is l-1 or greater. At this time, when a determination is made that the value of the variable m is less than l-1, the control device 500 determines that the transfer control processing has not been executed for all of the l vehicles staying at the first receiving location, and repeats the processing described above from the m+1th transfer control processing.

In contrast, when a determination is made that the value of the variable m is l-1 or greater, the control device 500 determines that the transfer control processing has been executed for all of the l vehicles staying at the first receiving location, and ends the repeated execution of the transfer control processing.

Modified Example 8 of Embodiment

It is described that the storage box 160 of the first vehicle 100 according to the present embodiment includes, as constituents used in the transferring of articles, an expansion/contraction mechanism 165 such as illustrated in FIG. 4, and a slide plate 164 that is caused to slide toward the outside of the storage box 160 due to the extension of the expansion/contraction mechanism 165.

Figure 23:
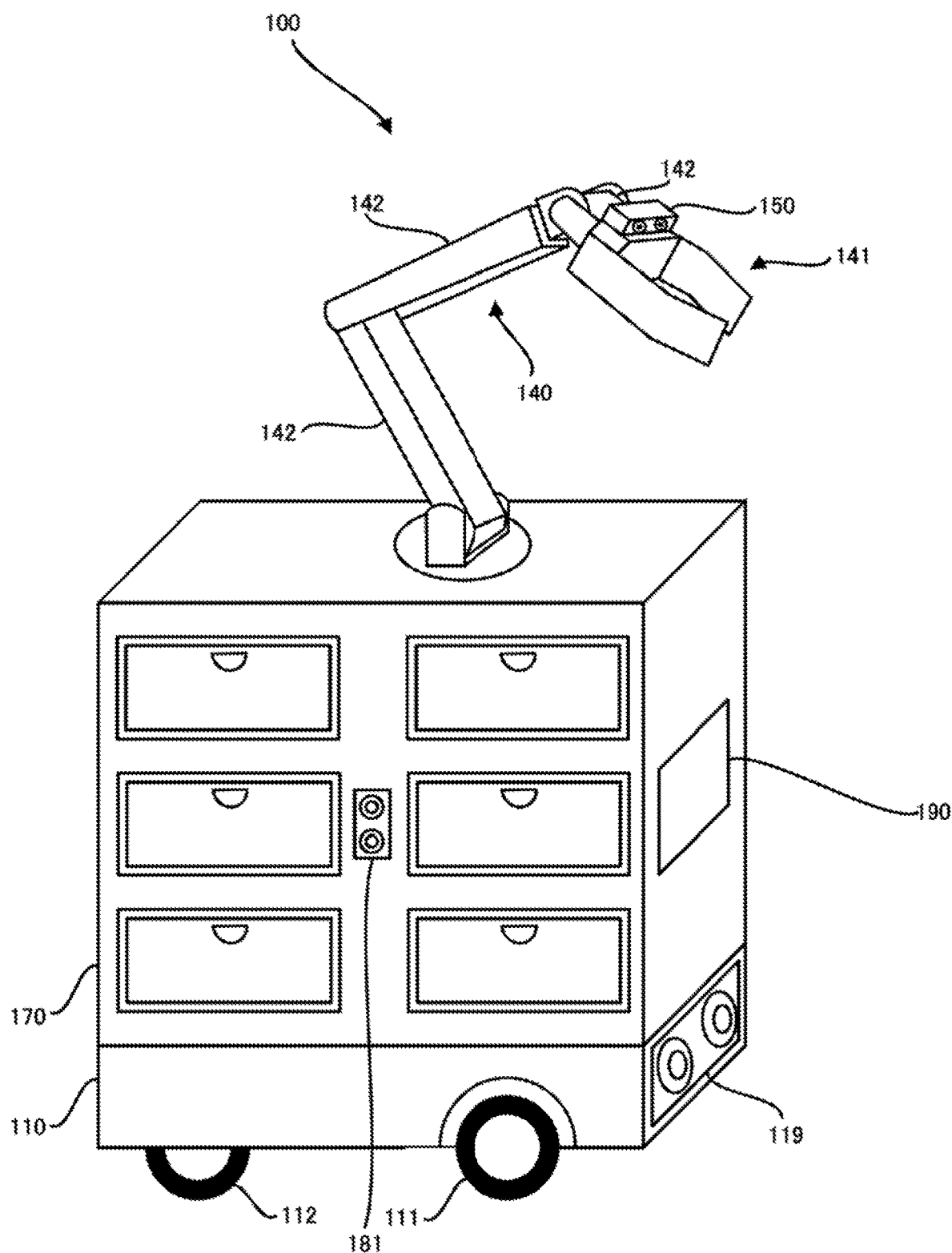
FIG. 23 is an appearance configuration drawing illustrating an example of the appearance of the first vehicle according to Modified Example 8 of the embodiment.

However, the first vehicle 100 according to the present modified example further includes, as a constituent used in the transferring of articles, a robot arm 140 such as illustrated in FIG. 23 on the top surface of the locker device 170. The second vehicle 200 according to the present modified example does not include a robot arm.

The robot arm 140 is implemented as a vertical articulated robot. The robot arm 140 includes a drive circuit that drives a non-illustrated motor in accordance with signals output from the control device 190, and a two-claw-type gripper 141 that is opened and closed in parallel by the motor. The robot arm 140 also includes an imaging device 150 that is mounted on the gripper 141 and that has an optical axis that is directed toward the tips of the claws of the gripper 141, a plurality of joint structures that can be moved by motors, and a plurality of arms 142 that move around the joint structures. The gripper 141 is not limited to two-claw-type grippers and may have three or more claws, or may include a plurality of fingers instead of the two claws.

The imaging device 150 of the robot arm 140 is implemented as a digital stereo camera. The imaging device 150 performs imaging in accordance with signals output from the control device 190, and outputs, to the control device 190, two images that have parallax with each other. This is for the control device 190 to identify, on the basis of the parallax, the positional coordinates in three-dimensional space, the size, and the like of the article to be gripped by the gripper 141.

The input/output port 198 of the control device 190 illustrated in FIG. 5 is connected, via non-illustrated communication cables, to the non-illustrated drive circuit and the imaging device 150 of the robot arm 140. The input/output port 198 outputs, to the drive circuit or the imaging device 150 of the robot arm 140, command signals output from the CPU 191, and inputs, to the CPU 191, signals output from the imaging device 150.

In the present modified example, as in the present embodiment, an example is described of a case in which a transfer command commanding transfer of the first article from the left, row 1 column 1, box 160 of the first vehicle 100 to the right, row 1 column 1, box 260 of the second vehicle 200 is sent from the control device 500.

When the first vehicle 100 receives the transfer command, the position and the advancing direction of the first vehicle 100 are changed in accordance with the transfer command such that the left, row 1 column 1, storage box 160 and the right, row 1 column 1, storage box 260 directly face each other. In the same manner, the position and the advancing direction of the second vehicle 200 are changed.

Next, the CPU 191 of the first vehicle 100 outputs, to the drive circuit 199 connected to the non-illustrated motors, a control signal for unlocking the door 162 of the left, row 1 column 1, storage box 160 and a control signal for setting the state of the door 162 to the outwardly open state. Likewise, the second vehicle 200 unlocks the door 262 of the right, row 1 column 1, box 260, and sets the state of the door 262 to the outwardly open state.

Thereafter, the CPU 191 of the first vehicle 100 outputs, to the input/output port 198 connected to the robot arm 140, a control signal for directing the optical axis of the imaging device 150 in a direction capable of imaging the opening of the left, row 1 column 1, box 160. Thereafter, the CPU 191 outputs, to the imaging device 150 via the input/output port 198, a signal commanding imaging to be performed, and inputs, via the input/output port 198, a signal output from the imaging device 150. The CPU 191 acquires two images on the basis of the inputted signal, and calculates, on the basis of the parallax of the acquired two images, the positional coordinates in three-dimensional space and the sizes of the opening of the left, row 1 column 1, box 160 and the first article stored farther inside the box 160 than the opening. Likewise, the CPU 191 of the first vehicle 100 calculates the positional coordinates in three-dimensional space and the size of the opening of the right, row 1 column 1, box 260. In the present modified example, it is described that the calculated positional coordinates are relative coordinates based on the robot arm 140, but the present modified example is not limited thereto.

Next, on the basis of the positional coordinates and the sizes of the opening of the left, row 1 column 1, box 160, the first article, and the opening of the right, row 1 column 1, box 260, the CPU 191 generates a control signal for causing the robot arm 140 to grip the first article stored in the left, row 1 column 1, box 160 and store the first article in the right, row 1 column 1, box 260. Thereafter, the CPU 191 outputs the generated control signal to the robot arm 140 via the input/output port 198, and the robot arm 140 operates in accordance with the control signal to transfer the first article from the left, row 1 column 1, box 160 to the right, row 1 column 1, box 260.

Modified Example 9 of Embodiment

It is described that the first vehicle 100 according to the Modified Example 8 of the present embodiment includes, as a constituent used in the transferring of articles, a robot arm 140 such as illustrated in FIG. 23 on the top surface of the locker device 170, and that the second vehicle 200 according to the Modified Example 8 of the present embodiment does not include a robot arm.

However, the second vehicle 200 according to the present modified example includes a non-illustrated robot arm on the top surface of the locker device 270, similar to the first vehicle 100. As such, when the first vehicle 100 and the second vehicle 200 receive a transfer command from the control device 500, the CPU 191 of the first vehicle 100 determines that, of the first vehicle 100 and the second vehicle 200, the vehicle of the transfer source in which the transfer article is stored uses the robot arm of the transfer source to remove the transfer article from the transfer source and store the transfer article in the vehicle of the transfer destination. The non-illustrated CPU of the second vehicle 200 makes a similar determination.

However, the present modified example is not limited thereto, and a configuration is possible in which the CPU 191 of the first vehicle 100 determines that, of the first vehicle 100 and the second vehicle 200, the vehicle of the transfer destination uses the robot arm of the transfer destination to remove the transfer article from the transfer source and store the transfer article in the vehicle of the transfer destination. In this case, the non-illustrated CPU of the second vehicle 200 makes a similar determination.

Furthermore, the present modified example is not limited thereto, and a configuration is possible in which the CPU 191 of the first vehicle 100 and the non-illustrated CPU of the second vehicle 200 determine, on the basis of random numbers, which of the robot arm 140 of the first vehicle 100 and the robot arm of the second vehicle 200 is used to transfer the article.

In this case, when the first data communication circuit 194a of the first vehicle 100 receives the transfer command, the CPU 191 of the first vehicle 100 generates a random number and outputs the generated random number to the second data communication circuit 194b with the second vehicle 200 as the destination. Similar to the first vehicle 100, the second vehicle 200 generates a random number and sends the generated random number to the first vehicle 100. Thereafter, when the second data communication circuit 194b of the first vehicle 100 receives the random number from the second vehicle 200, the CPU 191 of the first vehicle 100 determines whether or not the random number generated by the first vehicle 100 is greater than the received random number.

At this time, when the CPU 191 of the first vehicle 100 determines that the random number generated by the first vehicle 100 is greater than the received random number, a determination is made that the first vehicle 100 becomes a parent vehicle and the robot arm 140 of the first vehicle 100 is used to transfer the article. Likewise, when the second vehicle 200 determines that the random number generated by the second vehicle 200 is less than the received random number, a determination is made that the second vehicle 200 becomes a daughter vehicle and the robot arm of the second vehicle 200 is not used to transfer the article.

In contrast, when the CPU 191 of the first vehicle 100 determines that the random number generated by the first vehicle 100 is smaller than the received random number, a determination is made that the first vehicle 100 becomes the daughter vehicle and the robot arm 140 of the first vehicle 100 is not used. The second vehicle 200 makes a similar determination.

When the CPU 191 of the first vehicle 100 determines that the random number generated by the first vehicle 100 is equal to the received random number, the processing described above is repeated from the processing of generating random numbers.

Modified Example 10 of Embodiment

In Modified Example 8 of the embodiment, it is described that the delivery system 1 includes the first vehicle 100 that is a ground vehicle and that includes a robot arm 140 such as illustrated in FIG. 23, and the second vehicle 200 that is a ground vehicle and that does not include a robot arm.

Figure 24:
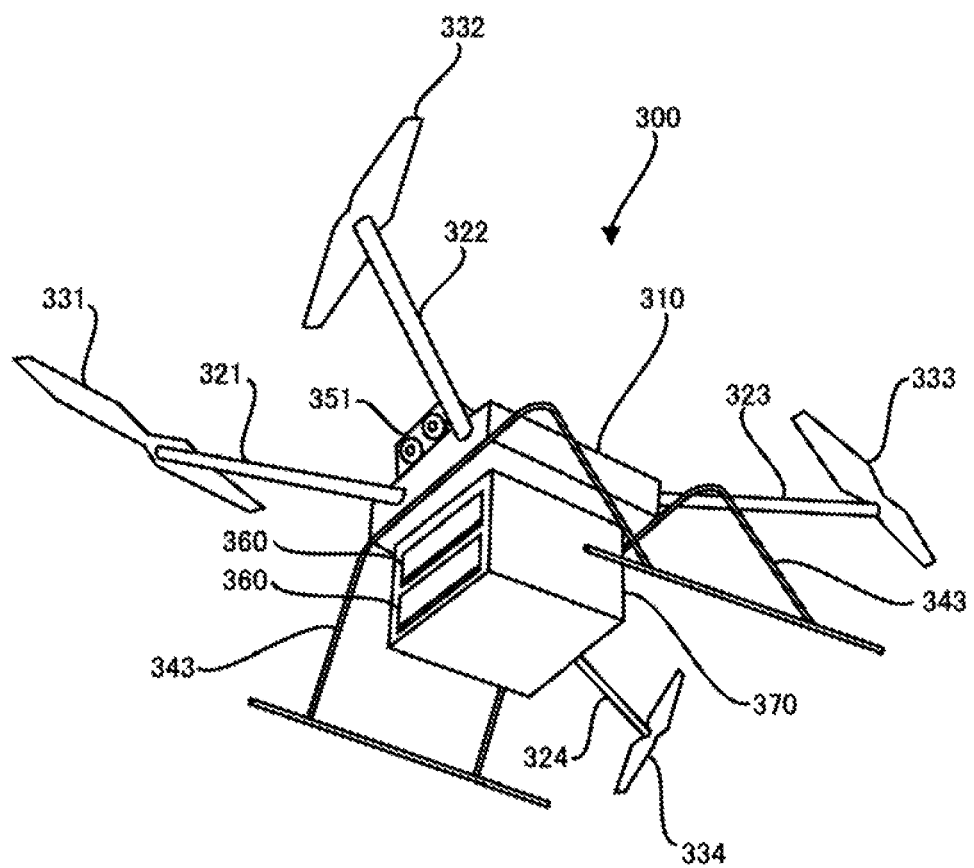
FIG. 24 is an appearance configuration drawing illustrating an example of the appearance of the second vehicle according to Modified Example 10 of the embodiment.

However, Modified Example 8 is not limited thereto, and the delivery system 1 according to the present modified example includes the first vehicle 100 that is a ground vehicle and that includes the robot arm 140, and a second vehicle 300 that is an aircraft such as illustrated in FIG. 24.

The second vehicle 300 according to the present modified example is an unmanned aircraft, and includes a control device 310, and a locker device 370 that is fixed to a bottom surface of the control device 310. Storage boxes 360 are arranged so as to form a two-row one-column matrix, and are provided on a front surface of the locker device 370. The configuration and functions of the storage boxes 360 are the same as the configuration and the functions of the storage boxes 160 illustrated in FIG. 2.

The second vehicle 300 includes propeller arms 321, 322 and 323, 324 that respectively protrude forward to the right and forward to the left from the front face of the control device 310, and backward to the left and backward to the right from the back face of the control device 310. Furthermore, the second vehicle 300 includes propellers 331 to 334 that are installed on tips of the propeller arms 321 to 324, and non-illustrated motors that rotate the propellers 331 to 334 in accordance with the control of the control device 310.

Furthermore, the second vehicle 300 includes a support leg 343 that protrudes downward from the bottom surface of the control device 310 and that supports the control device 310. The length in the vertical direction of the support leg 343 is designed to be longer, by a predetermined length, than the length in the vertical direction of the locker device 370. The support leg 343 is set in this manner in order to prevent the locker device 370 of the second vehicle 300 from colliding with the surface of the receiving location when the second vehicle 300 lands at the receiving location.

Furthermore, the second vehicle 300 includes an imaging device 351 that is provided on the top surface of the control device 310 and that has an optical axis that is directed in front of the second vehicle 300. The imaging device 351 is implemented as a digital stereo camera. The imaging device 351 performs imaging in accordance with signals output from the control device 310, and outputs two images obtained by imaging that have parallax with each other to the control device 310.

The control device 310 includes a CPU, a RAM, a ROM, a flash memory, a first data communication circuit, a second data communication circuit, a touch screen, and a GPS circuit that are non-illustrated and that have the same configurations and functions as the CPU 191, the RAM 192, the ROM 193a, the flash memory 193b, the first data communication circuit 194a, the second data communication circuit 194b, the touch screen 195, and the GPS circuit 196 of the control device 190 of the first vehicle 100. In the present modified examples, it is described that the control device 310 includes one CPU, but the present modified example is not limited thereto and the control device 310 may include a plurality of CPUs.

The control device 310 includes a non-illustrated input/output port that is connected to a non-illustrated cable that is connected to the imaging device 351, outputs the signals output by the non-illustrated CPU to the imaging device 351, and inputs the images output by the imaging device 351 into the CPU.

Furthermore, the control device 310 includes a non-illustrated drive circuit that is connected to non-illustrated cables that are respectively connected to the non-illustrated motors that rotate the propellers 331 to 334. The drive circuit drives, in accordance with signals output by the CPU, the non-illustrated motors that rotate the propellers 331 to 334.

When the non-illustrated first data communication circuit of the second vehicle 300 receives, from the control device 500, a movement command to a receiving location, a flight route to the receiving location is determined, and a signal for causing the second vehicle 300 to move forward on the determined flight route is output to the non-illustrated drive circuit that drives the non-illustrated motors that rotate the propellers 331 to 334.

Thereafter, when the second vehicle 300 arrives at the receiving location, the CPU of the second vehicle 300 generates a control signal that controls the propellers 331 to 334 so as to cause the second vehicle 300 to land at the receiving location, and outputs the generated control signal to the non-illustrated drive circuit. Thus, the second vehicle 300 moves to the receiving location, and lands and stays at the receiving location.

The receiving location at which the second vehicle 300 stays includes a port that is a location at which aircraft can take off and land. The port is not limited to entrances and lobbies, and may, for example, be a veranda, a roof, a yard, a parking lot, a park, a schoolyard, or a river beach.

Modified Example 11 of Embodiment

In Modified Example 10 of the embodiment, it is described that the delivery system 1 includes the first vehicle 100 that is a ground vehicle and that includes a robot arm 140 such as illustrated in FIG. 23, and a second vehicle 300 that is an aircraft and is such as illustrated in FIG. 24. However, Modified Example 10 is not limited thereto.

A configuration is possible in which the delivery system 1 includes a first vehicle 100 that is a ground vehicle and that does not include a robot arm 140 such as illustrated in FIG. 23, and a second vehicle 300 that is an aircraft such as illustrated in FIG. 24 and includes a non-illustrated robot arm such as illustrated in FIG. 23 on the bottom surface of the locker device 370.

Additionally, the present modified example is not limited thereto, and a configuration is possible in which the delivery system 1 includes a non-illustrated first vehicle that is an aircraft, and the second vehicle 300 that is an aircraft and that includes a non-illustrated robot arm.

Modified Example 12 of Embodiment

In the present embodiment, it is described that, as illustrated in FIG. 4, the first vehicle 100 and the second vehicle 200 transfer articles in a state in which the storage box 160 for which the state of the door 162 is in the outwardly open state fallen outward and the storage box 260 for which the state of the door 262 is in the inwardly open state fallen inward directly face each other separated the distance d that is shorter than the height H of the door 162. The state of the door 162 is set to the outwardly open state so as to use the door 162 as a bridge spanning between the storage box 160 of the first vehicle 100 and the storage box 260 of the second vehicle 200.

Figure 25:
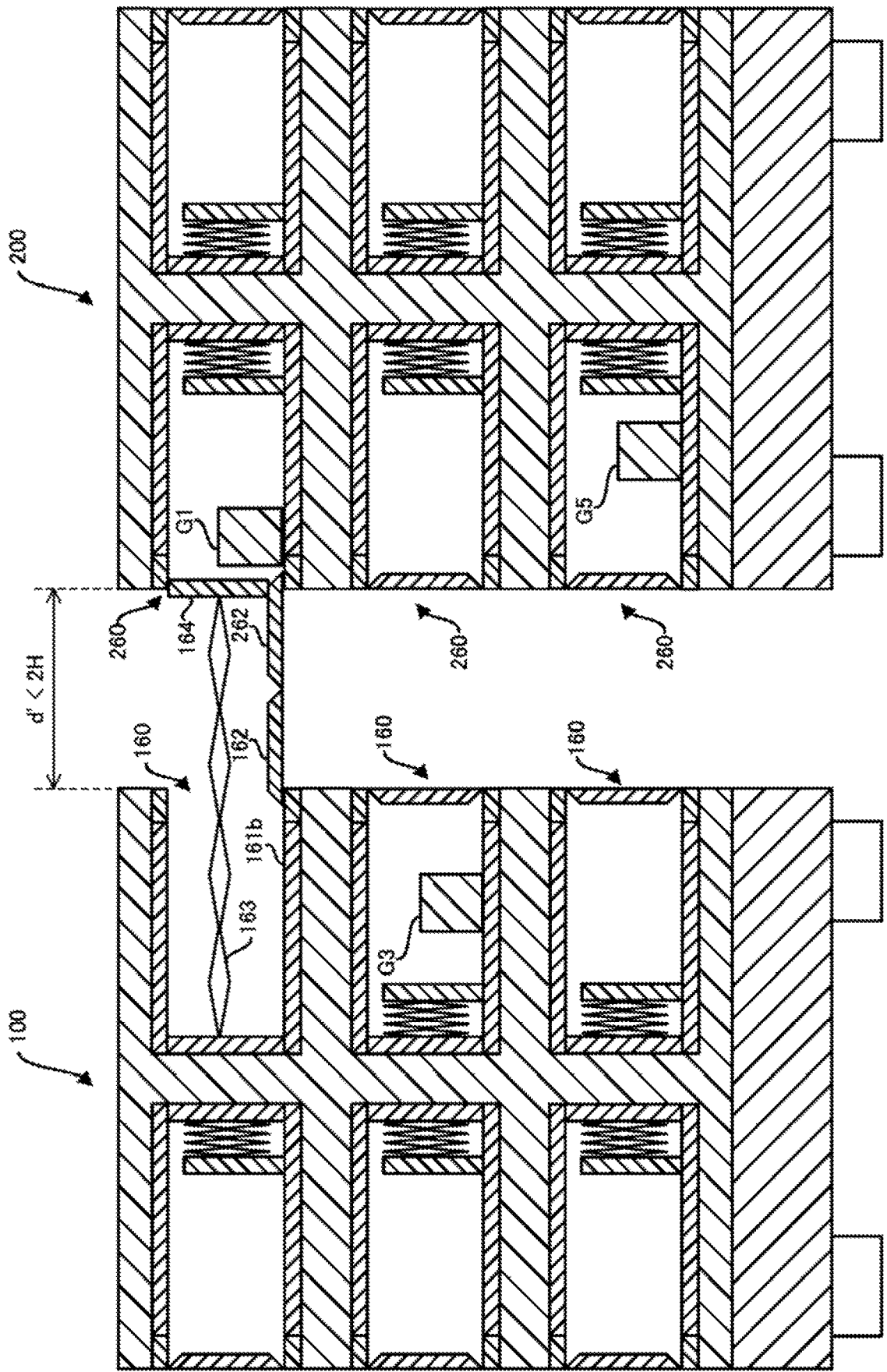
FIG. 25 is a cross-sectional view illustrating the first vehicle and the second vehicle according to Modified Example 12 of the embodiment.

However, the present embodiment is not limited thereto and, as illustrated FIG. 25, the first vehicle 100 and the second vehicle 200 according to the present modified example transfer articles in a state in which the storage box 160 for which the state of the door 162 is in the outwardly open state and the storage box 260 for which the state of the door 262 is in the outwardly open state directly face each other separated a distance d' that is shorter than two-times the height H of the door 162. Thus, in addition to the first vehicle 100 setting the state of the door 162 to the outwardly open state, the second vehicle 200 sets the state of the door 262 to the outwardly open state and, as such, the door 162 and the door 262 can form a bridge spanning between the storage box 160 and the storage box 260. As such, articles can be transferred even if the distance between the first vehicle 100 and the second vehicle 200 is greater than in the present embodiment in which only the door 162 forms the bridge.

Modified Example 13 of Embodiment

In the present embodiment, it is described that the receiving location includes the entrances and lobbies of apartment complexes and office buildings, and the doorsteps of houses. However, the receiving location is not limited thereto. The receiving location includes the entrances and lobbies of public facilities such as schools, hospitals, government offices, courthouses, train stations, airports and the like, and of commercial facilities such as department stores, hotels, outlet malls, and the like. Additionally, the receiving location may be the yard or parking lot of a house, an apartment complex, an office building, a public facility, or a commercial facility. Furthermore, the receiving location may be a park, a river beach, a forest, or a mountain.

Modified Example 14 of Embodiment

In the present embodiment, it is described that the first vehicle 100 and the second vehicle 200 include a plurality of wheels including the wheels 111 and 112, such as illustrated in FIG. 2. However, the first vehicle 100 and the second vehicle 200 are not limited thereto. A configuration is possible in which the first vehicle 100 and the second vehicle 200 include two legs that include a plurality of joints, and walk bipedally. Additionally, the number of legs of the first vehicle 100 and the second vehicle 200 is not limited to two, and may be three or more. Furthermore, the first vehicle 100 and the second vehicle 200 may, for example, further include an endless track such as a caterpillar (registered trademark) that surrounds the plurality of wheels.

Modified Example 15 of Embodiment

In Modified Example 10 of the embodiment, it is described that the second vehicle 300 is an unmanned aircraft, but Modified Example 10 is not limited thereto and a configuration is possible in which the second vehicle 300 is an unmanned flying object.

Additionally, the first vehicle 100 and the second vehicle 200 need not be aircraft, and a configuration is possible in which the first vehicle 100 and the second vehicle 200 are water vehicles or underwater vehicles.

Furthermore, the first vehicle 100 and the second vehicles 200 and 300 need not be unmanned and, provided that, with the exception of the control by the control device 500, the first vehicle 100 and the second vehicles 200 and 300 are autonomous traveling or flying objects, a person may ride the first vehicle 100 or the second vehicles 200 and 300.

Modified Example 16 of Embodiment

It is described that the CPU 501 of the control device 500 according to the present embodiment functions as the acquirer 510, the movement controller 540, the selector 550, the storage controller 560, the changer 570, and the notifier 580 as illustrated in FIG. 7 by executing vehicle control processing such as illustrated in FIG. 12. However, the present embodiment is not limited thereto.

Figure 26:
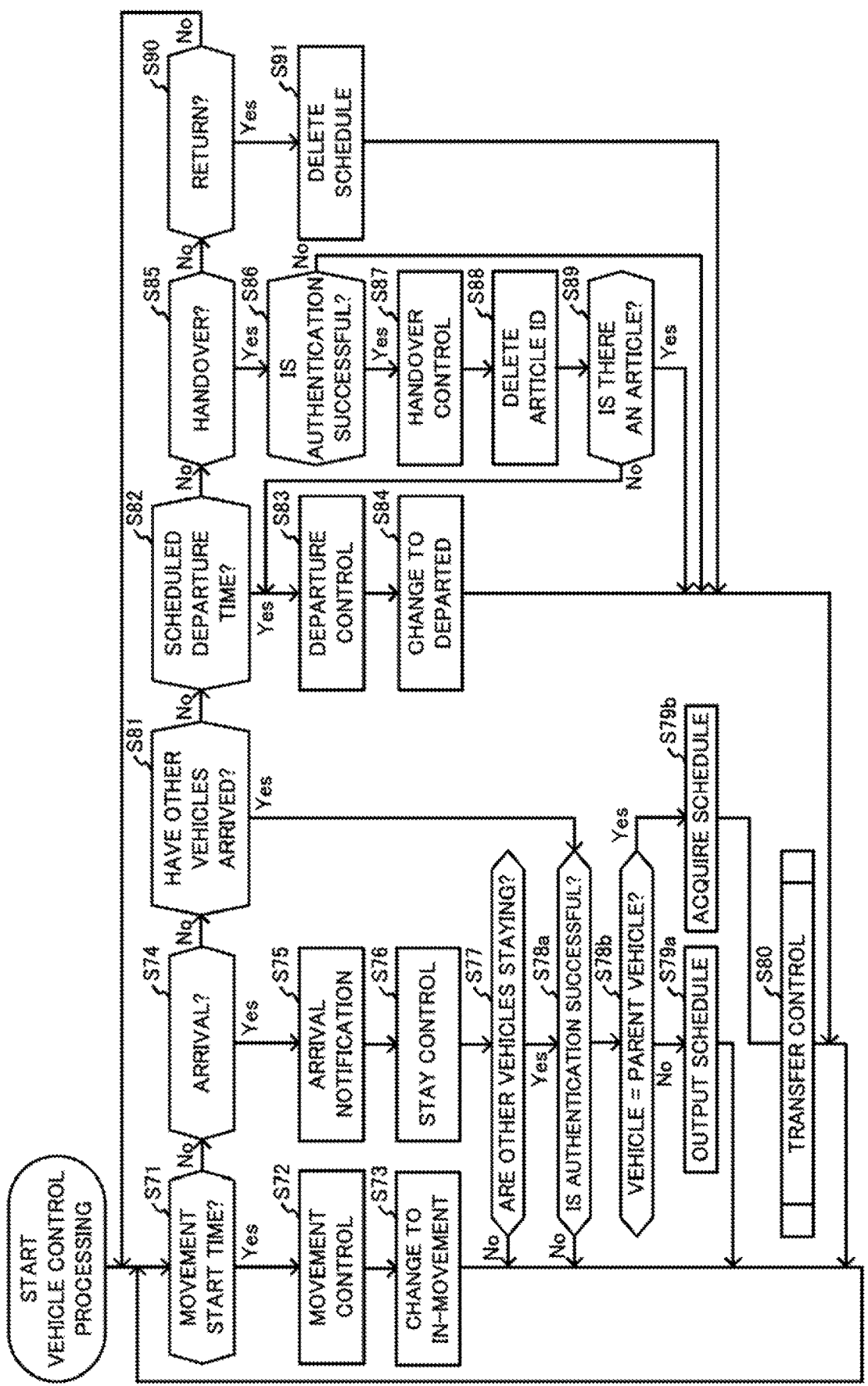
FIG. 26 is a flowchart illustrating an example of vehicle control processing executed by the control device of the delivery system according to Modified Example 16 of the embodiment.

The CPU 501 of the control device 500 according to the present modified example does not execute vehicle control processing such as illustrated in FIG. 12. As such, the CPU 191 of the first vehicle 100 according to the present modified example executes vehicle control processing such as illustrated in FIG. 26. Due to this, the CPU 191 of the first vehicle 100 functions as a movement controller 940, a selector 950, a storage controller 960, a changer 970, and a notifier 980 such as illustrated in FIG. 27. Additionally, the flash memory 193*b* of the first vehicle 100 functions as an information storage 990. The non-illustrated CPU and flash memory of the second vehicle 200 function in a manner similar to the CPU 191 and the flash memory 193*b* of the first vehicle 100 and, as such, the following description focuses mainly on the first vehicle 100.

A non-illustrated schedule table is stored in advance in the information storage 990 of the first vehicle 100. As in the present embodiment, when the CPU 501 of the control device 500 executes the non-illustrated schedule generation processing to generate a schedule for the first vehicle 100, the CPU 501 outputs information about the generated schedule to the data communication circuit 504*a* with the first vehicle 100 as the destination. When the first data communication circuit 194*a* of the first vehicle 100 receives the information about the schedule of the first vehicle 100, the CPU 191 of the first vehicle 100 acquires the information about the schedule from the first data communication circuit 194*a* and stores the acquired information in the non-illustrated schedule table stored in the information storage 990. As such, the information about the schedule of the first vehicle 100 is stored in the schedule table stored in the information storage 990 of the first vehicle 100, but information about the schedule of the second vehicle 200 is not stored.

A non-illustrated storage box table is stored in advance in the information storage 990 of the first vehicle 100. A worker that stored the article in the first vehicle 100 performs an operation, on the input device 195*c* of the first vehicle 100, for inputting the information about the storage box 160 in which the article has been stored. When the input device 195*c* of the first vehicle 100 inputs a signal corresponding to this operation, the CPU 191 of the first vehicle 100 executes the non-illustrated box information storage processing described in the present embodiment to store the information about the storage box 160 in the storage box table. As such, the information about the storage box 160 of the first vehicle 100 is stored in the storage box table stored in the information storage 990 of the first vehicle 100, but information about the storage box 260 of the second vehicle 200 is not stored.

Upon start-up, the CPU 191 of the first vehicle 100 executes the vehicle control processing illustrated in FIG. 26. When the vehicle control processing starts, the movement controller 940 of the first vehicle 100 determines, on the basis of the system time acquired from the OS and information expressing the movement start time of the non-illustrated schedule table stored in the information storage 990 of the first vehicle 100, whether or not the movement start time of the first vehicle 100 to the first receiving location has arrived (step S71).

At this time, when a determination is made that the movement start time has arrived (step S71: Yes), the movement controller 940 executes the same processing as in steps S02 and S03 of FIG. 12 (steps S72 and S73). As a result, the movement controller 940 starts the execution of the travel control processing illustrated in FIG. 13, and travels to the first receiving location. Thereafter, the processing described above is repeated from step S71.

When a determination is made in step S71 that the movement start time has not arrived (step S71; No) and, thereafter, a determination is made on the basis of a signal output from the GPS circuit 196 that the first vehicle 100 has arrived at the first receiving location (step S74; Yes), the movement controller 940 executes the same processing as the processing of steps S07 and S08 of FIG. 12 (steps S75 and S76), thereby starting the stay at the first receiving location.

Next, the selector 950 of the first vehicle 100 determines whether or not the second vehicle 200 that is another vehicle is staying at the first receiving location (step S77). In order to perform this determination, the selector 950 of the first vehicle 100 outputs signals commanding imaging to be performed to the imaging devices 119, 181, and 182, for example, and then acquires images output from the imaging devices 119, 181, and 182. Next, the selector 950 reads, from the flash memory 193b, a template image of the second vehicle 200 to be used in template matching. Thereafter, the selector 950 performs template matching on the basis of the acquired images and the read template image to detect an image region corresponding to the template image. At this time, when an image region corresponding to the template image is detected, the selector 950 determines that the second vehicle 200 is staying at the first receiving location.

At this time, when a determination is made that the second vehicle 200 that is another vehicle is not staying at the first receiving location (step S77: No), the selector 950 of the first vehicle 100 repeats the processing described above from step S71. In contrast, when a determination is made that the second vehicle 200 is staying at the first receiving location (step S77: Yes), the selector 950 outputs, to the second data communication circuit 194b with the second vehicle 200 as the destination, a code send request that requests the sending of an authentication code in order to authenticate the second vehicle 200.

After the second data communication circuit 194b of the first vehicle 100 sends the code send request to the second vehicle 200, when the second data communication circuit 194b does not receive the authentication code even after a predetermined amount of time passes, the selector 950 of the first vehicle 100 determines that the authentication of the second vehicle 200 has failed (step S78a: No). In contrast, when the second data communication circuit 194b receives the authentication code from the second vehicle 200, the selector 950 acquires the authentication code of the second vehicle 200 that is stored in advance in the flash memory 193b. Next, when a determination is made that the received authentication code and the authentication code stored in advance do not match, the selector 950 determines that the authentication of the second vehicle 200 has failed (step S78a: No). When a determination is made that the authentication has failed, the selector 950 outputs, to the second data communication circuit 194b with the second vehicle 200 as the destination, a failure report informing that the authentication has failed. Thereafter, the processing described above is repeated from step S71.

In contrast, when a determination is made that the received authentication code and the authentication code stored in advance match, the selector 950 of the first vehicle 100 determines that the authentication of the second vehicle 200 has succeeded (step S78a: Yes). Thereafter, the selector 950 outputs, to the second data communication circuit 194b with the second vehicle 200 as the destination, a success report informing that the authentication has succeeded.

Additionally, when the second data communication circuit 194b receives the code send request from the second vehicle 200, the selector 950 of the first vehicle 100 acquires the authentication code of the first vehicle 100 stored in advance in the flash memory 193b, and outputs the acquired authentication code to the second data communication circuit 194b with the second vehicle 200 as the destination. Thereafter, when the second data communication circuit 194b of the first vehicle 100 receives the failure report from the second vehicle 200, a determination is made that the authentication has failed (step S78a: No). Thereafter, the processing is repeated from step S71.

In contrast, when the second data communication circuit 194b of the first vehicle 100 receives the success report from the second vehicle 200, the selector 950 of the first vehicle 100 determines that authentication has succeeded for both the first vehicle 100 and the second vehicle 200 (step S78a: Yes).

Next, the selector 950 of the first vehicle 100 and the non-illustrated selector of the second vehicle 200 carry out the processing using random numbers described in Modified Example 9 of the embodiment to determine one of the first vehicle 100 and the second vehicle 200 as the parent vehicle that will execute the subsequent transfer control processing, and the other as the daughter vehicle that does not execute the transfer control processing.

At this time, when the first vehicle 100 is not determined as the parent vehicle and the second vehicle 200 is determined as the parent vehicle (step S78b; No), the selector 950 of the first vehicle 100 acquires, from the non-illustrated schedule table, information about the schedule of the first vehicle 100, and acquires, from the non-illustrated storage box table, the information about the storage box 160. Thereafter, the selector 950 outputs the acquired information to the second data communication circuit 194b with the second vehicle 200 as the destination (step S79a).

Thereafter, when the second data communication circuit 194b of the first vehicle 100 receives the transfer command from the second vehicle 200 that has executed the transfer control processing, the CPU 191 of the first vehicle 100 executes the same processing as the processing described in the present embodiment and, as a result, a transfer is performed in accordance with the transfer command. Additionally, when the second data communication circuit 194b of the first vehicle 100 receives, from the second vehicle 200, the information about the schedule of the first vehicle 100 and the information about the storage box 160 that are changed due to the execution of the transfer control processing, the non-illustrated schedule table and the non-illustrated storage box table are updated using the received information. Thereafter, the processing described above is repeated from step S71.

In contrast, when the first vehicle 100 is determined as the parent vehicle (step S78b: Yes), the selector 950 of the first vehicle 100 outputs, to the second data communication circuit 194b with the second vehicle 200 as the destination, a schedule sent request that requests the sending of information about the schedule of the second vehicle 200 and the information about the storage box 260. Thereafter, when the second data communication circuit 194b of the first vehicle 100 sends the schedule send request and then receives, from the second vehicle 200, the information about the schedule of the second vehicle 200 and the information about the storage box 260, the selector 950 of the first vehicle 100 acquires the received information about the schedule of the second vehicle 200, and stores the acquired information in the non-illustrated schedule table in which only the information about the schedule of the first vehicle 100 is stored. Additionally, the selector 950 of the first vehicle 100 acquires the received information about the storage box 260, and stores the acquired information in the non-illustrated storage box table in which only the information about the storage box 160 of the first vehicle 100 is stored (step S79*b*).

Thereafter, the CPU 191 of the first vehicle 100 executes the transfer control processing illustrated in FIG. 14 (step S80). Thus, the CPU 191 selects, from the first vehicle 100 and the second vehicle 200, the vehicle of which the scheduled departure time from the first receiving location is later as the remaining vehicle, and the vehicle of which the scheduled departure time is earlier as the departing vehicle.

The CPU 191 identifies a transfer article on the basis of the information about the schedule of the first vehicle 100 and the information about the storage box 160, and the information about the schedule of the second vehicle 200 and the information about the storage box 260, and outputs, to the second data communication circuit 194*b* with the second vehicle 200 as the destination, a transfer command commanding the transfer of the identified transfer article. Thereafter, the CPU 191 executes the same processing as the processing described in the present embodiment and, as a result, a transfer is performed in accordance with the transfer command.

Furthermore, in accordance with the transfer of the article, the CPU 191 changes the information about the schedule of the first vehicle 100 and the information about the storage box 160, and the information about the schedule of the second vehicle 200 and the information about the storage box 260. Thereafter, the changed information about the schedule of the second vehicle 200 and the changed information about the storage box 260 are output to the second data communication circuit 194*b* with the second vehicle 200 as the destination. Thereafter, the CPU 191 deletes the information about the schedule of the second vehicle 200 and the information about the storage box 260 from the non-illustrated schedule table and the non-illustrated storage box table. Thereafter, the processing described above is repeated from step S71.

After step S71 is executed, when a determination is made that the first vehicle 100 has already arrived at the first receiving location, or is at a location other than the first receiving location and, as such, has not arrived at the first receiving location (step S74; No), the selector 950 of the first vehicle 100 determines whether or not the second vehicle 200 that is another vehicle has arrived at the first receiving location (step S81). For example, the selector 950 executes the template matching described in step S77 on a predetermined cycle and, when an image region corresponding to the template image is not detected in the previous execution but is detected in the current execution, the selector 950 determines that the second vehicle 200 has arrived (step S81: Yes). Thereafter, the selector 950 continues the processing from step S78*a* of authenticating the second vehicle 200.

After steps S71 and S74 are executed, when the selector 950 of the first vehicle 100 determines that the second vehicle 200 has not arrived at the first receiving location (step S81: No), the movement controller 940 determines, on the basis of the system time acquired from the OS and information expressing the scheduled departure time of the non-illustrated schedule table, whether or not the scheduled departure time of the first vehicle 100 from the first receiving location has arrived (step S82). At this time, when a determination is made that the scheduled departure time has arrived (step S82: Yes), the movement controller 940 executes the same processing as in steps S12 and S13 of FIG. 12 (steps S83 and S84). As a result, the first vehicle 100 departs from the first receiving location. Thereafter, the processing described above is repeated from step S71.

After steps S71, S74, and S81 are executed, when the movement controller 940 of the first vehicle 100 determines that the scheduled departure time of the first vehicle 100 from the first receiving location has not arrived (step S82: No), the storage controller 960 of the first vehicle 100 determines, on the basis of a signal input by the input device 195*c*, whether or not a handover of the article has been requested by the recipient of the article (step S85). At this time, when a determination is made that the handover of the article has been requested (step S85: Yes), the storage controller 960 executes the same processing as in step S15*b* of FIG. 12 (step S86). As a result, in a case in which the storage controller 960 acquires the text string expressing the password input by the recipient, and a record does not exist in the non-illustrated storage box table in which the acquired text string is stored, the storage controller 960 determines that the authentication of the recipient has failed (step S86; No). Thereafter, the processing described above is repeated from step S71.

In contrast, when a determination is made that a record in which the acquired text string is stored exists in the storage box table, the storage controller 960 determines that the authentication of the recipient has succeeded (step S86: Yes). Thereafter, the storage controller 960 executes the same processing as in steps S16 to S18 of FIG. 12 (steps S87 to S89). As a result, the storage controller 960 acquires the box ID associated, in the storage box table, with the text string expressing the password, and outputs, to the drive circuit 199, a control signal for unlocking the door 162 of the storage box 160 identified by the acquired box ID, and a control signal for setting the state of the door 262 to the outwardly open state. Thereafter, the recipient retrieves the article from the storage box 160, thus ending the handover of the article. Thereafter, the processing described above is repeated from step S71.

After steps S71, S74, S81, and S82 are executed, when the storage controller 960 of the first vehicle 100 determines that the handover of the article has not been requested (step S85: No), the movement controller 940 determines, on the basis of a signal output from the GPS circuit 196, whether or not the first vehicle 100 has returned to the office (step S90). At this time, when a determination is made that the first vehicle 100 has not returned to the office (step S90; No), the processing described above is repeated from step S71. In contrast, when it is determined that the first vehicle 100 has returned to the office (step S90; Yes). The changer 970 executes the same processing as in step S20*b* of FIG. 12 (step S91). As a result, the changer 970 deletes the record stored in the non-illustrated schedule table, thereby deleting the schedule of the first vehicle 100. Thereafter, the processing described above is repeated from step S71.

Modified Example 17 of Embodiment

It is described that the CPU 191 of the first vehicle 100 according to Modified Example 16 of the present embodiment functions as the movement controller 940, the selector 950, and the storage controller 960 illustrated in FIG. 27 by executing vehicle control processing such as illustrated in FIG. 26.

However, Modified Example 16 is not limited thereto and the CPU 501 of the control device 500 according to the present modified example functions as the selector 550 and the storage controller 560, and the CPU 191 of the first vehicle 100 according to the present modified example functions as the movement controller 940. Since the non-illustrated CPU of the second vehicle 200 according to the present modified example functions in the same manner as the CPU 191 of the first vehicle 100, the following description focuses mainly on the first vehicle 100.

As in Modified Example 16 of the present embodiment, the information storage 990 of the first vehicle 100 is stored in advance in the non-illustrated schedule table. Information about the schedule of the first vehicle 100 generated by the control device 500 is stored in the schedule table of the first vehicle 100, but information about the schedule of the second vehicle 200 is not stored. Additionally, a non-illustrated storage box table is stored in advance in the information storage 990 of the first vehicle 100. Information about the storage box 160 of the first vehicle 100 is stored in the storage box table of the first vehicle 100, but information about the storage box 260 of the second vehicle 200 is not stored.

As in Modified Example 16 of the present embodiment, upon start-up, the CPU 191 of the first vehicle 100 executes vehicle control processing such as illustrated in FIG. 26. In the vehicle control processing, when the movement controller 940 of the first vehicle 100 determines that the first vehicle 100 has arrived at the first receiving location (step S74; Yes), the movement controller 940 outputs, to the first data communication circuit 194*a* with the control device 500 as the destination, an arrival report that includes the identification information "P1" of the first receiving location and the identification information "100" of the first vehicle 100. Next, the movement controller 940 of the first vehicle 100 acquires, from the non-illustrated schedule table, the information about the schedule of the first vehicle 100, acquires, from the non-illustrated storage box table, the information about the storage box 160, and outputs the acquired pieces of information to the first data communication circuit 194*a* with the control device 500 as the destination. Thereafter, the movement controller 940 executes the processing of steps S75 and S76 to start the stay at the first receiving location and, then, repeats the processing described above from step S71.

When the data communication circuit 504*a* of the control device 500 receives the arrival report, the CPU 501 of the control device 500 executes non-illustrated arrival time control processing for controlling one or more of the first vehicle 100 and the second vehicle 200 that has arrived at the receiving location. When the execution of the arrival time control processing starts, the acquirer 510 of the control device 500 acquires the arrival report from the data communication circuit 504*a*, and acquires the identification information "100" of the first vehicle 100 and the identification information "P1" of the first receiving location from the acquired arrival report. Next, when the data communication circuit 504*a* receives the information about the schedule of the first vehicle 100 and the information about the storage box 160, the acquirer 510 acquires these pieces of information. Thereafter, the storer 520 associates the identification information "100" of the first vehicle 100 and the information about the schedule of the first vehicle 100, and stores the associated information in the information storage 590. Additionally, the storer 520 associates the identification information "100" and the information about the storage box 160, and stores the associated information in the information storage 590.

Next, the selector 550 acquires the system time from the OS, and acquires, from the information storage 590, the identification information associated with the identification information "P1" of the first receiving location, a scheduled arrival time earlier than the system time, and a scheduled departure time later than the system time. At this time, when only the identification information "100" of the first vehicle 100 is acquired, the selector 550 determines that only the first vehicle 100 is staying at the first receiving location and that the second vehicle 200 that is another vehicle is not staying at the first receiving location, and ends the execution of the non-illustrated arrival time control processing.

In contrast, when the identification information "100" of the first vehicle 100 and the identification information "200" of the second vehicle 200 are acquired, the selector 550 determines that the first vehicle 100 and the second vehicle 200 are staying at the first receiving location. Thereafter, the selection processing illustrated in FIG. 15 and the transfer article identification processing illustrated in FIG. 16 are executed. As a result, the selector 550 selects one of the first vehicle 100 and the second vehicle 200 as the departing vehicle and the other as the remaining vehicle. Additionally, the changer 570 changes the scheduled departure time of the selected departing vehicle from the first receiving location to a time earlier than before changing. Furthermore, the storage controller 560 outputs the transfer command with the first vehicle 100 and the second vehicle 200 as destinations, thereby causing the first vehicle 100 and the second vehicle 200 to transfer the transfer article. In accordance with the transfer of the article, the changer 570 changes the information about the schedule and the information about the storage box 160 that are associated with the identification information "100" of the first vehicle 100, and also the information about the schedule and the information about the storage box 260 that are associated with the identification information "200" of the second vehicle 200.

Thereafter, the changer 570 outputs, to the data communication circuit 504*a* with the first vehicle 100 as the destination, the changed information about the schedule of the first vehicle 100 and the changed information about the storage box 160. Next, the changer 570 outputs, to the data communication circuit 504*a* with the second vehicle 200 as the destination, the changed information about the schedule of the second vehicle 200 and the changed information about the storage box 260. Thereafter, the changer 570 ends the execution of the non-illustrated arrival time control processing.

In the vehicle control processing of FIG. 26, instead of the processing of step S81, the changer 970 of the first vehicle 100 executes processing for determining whether or not the first data communication circuit 194*a* of the first vehicle 100 has received the changed information about the schedule of the first vehicle 100 and the changed information about the storage box 160. At this time, when it is determined that the first data communication circuit 194*a* has received these pieces of information, the changer 970 acquires these pieces of information from the first data communication circuit 194*a*, and changes the information stored in the non-illustrated schedule table and the non-illustrated storage box table to these pieces of acquired information. Thereafter, the processing described above is repeated from step S71.

Modified Example 18 of Embodiment

It is described that the CPU 501 of the control device 500 according to the Modified Example 17 of the present embodiment functions as the selector 550 and the storage controller 560, and the CPU 191 of the first vehicle 100 according 17 Modified Example 17 of the present embodiment functions as the movement controller 940. It is also described that the non-illustrated CPU of the second vehicle 200 according to Modified Example 17 of the present embodiment functions in the same manner as the CPU 191 of the first vehicle 100 according to Modified Example 17 of the present embodiment.

However, Modified Example 17 is not limited thereto, and a configuration is possible in which the CPU 501 of the control device 500 functions as the selector 550, and the CPU 191 of the first vehicle 100 according to Modified Example 17 of the present embodiment functions as the movement controller 940 and the storage controller 960. Additionally, a configuration is possible in which the non-illustrated CPU of the second vehicle 200 functions as a non-illustrated movement controller and a non-illustrated storage controller, in the same manner as the CPU 191 of the first vehicle 100.

However, Modified Example 17 is not limited thereto, and a configuration is possible in which the CPU 501 of the control device 500 functions as the storage control 560, and the CPU 191 of the first vehicle 100 according to Modified Example 17 of the present embodiment functions as the movement controller 940 and the selector 950. Additionally, a configuration is possible in which the non-illustrated CPU of the second vehicle 200 functions as a non-illustrated movement controller and a non-illustrated selector, in the same manner as the CPU 191 of the first vehicle 100.

The present embodiment and Modified Examples 1 to 18 of the present embodiment can be combined with each other. It is possible to provide a control device 500 that includes configurations for realizing the functions according to any the present embodiment and Modified Examples 1 to 15, 17, and 18 of the present embodiment, a control device 190 that includes configurations for realizing the functions according the present embodiment and Modified Examples 1 to 18 of the present embodiment, a control device 290 that includes configurations for realizing the functions according the present embodiment and Modified Examples 1 to 9 and 12 to 18 of the present embodiment, and a control device 310 that includes configurations for realizing the functions according to Modified Examples 10 and 11 of the present embodiment. In addition, it is possible to provide a system that includes a plurality of devices and that includes, as an overall system, configurations for realizing the functions according to any of the present embodiment and Modified Examples 1 to 18 of the present embodiment.

Additionally, by applying a program, existing control devices can each be made to function as the control device 500 according to any of the present embodiment and Modified Examples 1 to 15, 17, and 18 of the present embodiment. That is, by applying a program for realizing the various functional configurations of the control device 500, described in each of the present embodiment and Modified Examples 1 to 15, 17, and 18 of the present embodiment, so as to be executable by a computer (CPU or the like) that controls existing control devices, each of the existing control devices can be caused to each function as the control device 500 according any of the present embodiment and Modified Examples 1 to 15, 17, and 18 of the present embodiment.

Furthermore, by applying a program, an existing control device can each be made to function as the control device 190 according to the present embodiment and Modified Examples 1 to 18 of the present embodiment. That is, by applying a program for realizing the various functional configurations of the control device 190, described in the present embodiment and Modified Examples 1 to 18 of the present embodiment, so as to be executable by a computer (CPU or the like) that controls an existing control device, the existing control device can be caused to function as the control device 190 according the present embodiment and Modified Examples 1 to 18 of the present embodiment.

Additionally, by applying a program, an existing control device can be made to function as the control device 290 according to the present embodiment and Modified Examples 1 to 9 and 12 to 18 of the present embodiment. That is, by applying a program for realizing the various functional configurations of the control device 290, described in the present embodiment and Modified Examples 1 to 9 and 12 to 18 of the present embodiment, so as to be executable by a computer (CPU or the like) that controls an existing control device, the existing control device can be caused to function as the control device 290 according the present embodiment and Modified Examples 1 to 9 and 12 to 18 of the present embodiment.

Furthermore, by applying a program, an existing control device can be made to function as the control device 310 according to Modified Examples 10 and 11 of present embodiment. That is, by applying a program for realizing the various functional configurations of the control device 310 described in Modified Examples 10 and 11 of present embodiment so as to be executable by a computer (CPU or the like) that controls an existing control device, that existing control device can be caused to function as the control device 310 according to Modified Examples 10 and 11 of the present embodiment.

Any distribution method of such a program can be used. For example, the program can be stored and distributed on a recording medium such as a memory card, a compact disc read-only memory (CD-ROM), or a digital versatile disk read-only memory (DVD-ROM), or can be distributed via a communication medium such as the internet.

A method according to the present disclosure can be implemented using the delivery system 1 according to any of the present embodiment and Modified Examples 1 to 18 of the present embodiment. Additionally, the method according to the present disclosure can be implemented using the control device 500 according to any of the present embodiment and Modified Examples 1 to 15 of the present embodiment, and the control device 190 of the first vehicle 100 and the control device 290 of the second vehicle 200 according to Modified Example 16 of present embodiment.

Preferred embodiments of the present disclosure have been described, but the present disclosure should not be construed as being limited to these specific embodiments. Various modifications and changes may be made within the broader spirit and scope of the invention as set forth in the claims.

APPENDICES

Appendix 1

A control device, including:
a selector that selects one of a first vehicle and a second vehicle as a remaining vehicle that stores a first article and a second article and that remains at a receiving location where the first article and the second article are to be received, and selects another of the first vehicle and the second vehicle as a departing vehicle that departs from the receiving location, when the second vehicle storing the second article arrives at the receiving location while the first vehicle storing the first article stays at the receiving location;
a storage controller that identifies the first article or the second article stored in the selected departing vehicle as a transfer article to be transferred from the departing vehicle to the remaining vehicle, and causes the identified transfer article to be stored in the remaining vehicle: and
a movement controller that causes the departing vehicle to depart from the receiving location when the transfer article is stored in the remaining vehicle.

Appendix 2

The control device according to appendix 1, further including:
an acquirer that
associates and acquires identification information identifying the first vehicle and a scheduled departure time that is a time at which the first vehicle is scheduled to depart from the receiving location, and
associates and acquires identification information identifying the second vehicle and a scheduled departure time that is a time at which the second vehicle is scheduled to depart from the receiving location, wherein
the selector
selects the first vehicle as the remaining vehicle and selects the second vehicle as the departing vehicle when the scheduled departure time associated with the identification information of the first vehicle is later than the scheduled departure time associated with the identification information of the second vehicle, and
selects the first vehicle as the departing vehicle and selects the second vehicle as the remaining vehicle when the scheduled departure time associated with the identification information of the first vehicle is earlier than the scheduled departure time associated with the identification information of the second vehicle.

Appendix 3

The control device according to appendix 2, wherein the movement controller
causes the first vehicle to stay at the receiving location when the first vehicle arrives at the receiving location,
causes the second vehicle to stay at the receiving location when the second vehicle arrives at the receiving location, and
causes the first vehicle to depart from the receiving location at a time earlier than the scheduled departure time acquired in association with the identification information of the first vehicle when the second vehicle is selected as the remaining vehicle, the first article stored in the first vehicle selected as the departing vehicle is identified as the transfer article, and the transfer article is stored in the second vehicle.

Appendix 4

The control device according to appendix 3, wherein the movement controller causes the second vehicle to depart from the receiving location at a time earlier than the scheduled departure time acquired in association with the identification information of the second vehicle when the first vehicle is selected as the remaining vehicle, the second article stored in the second vehicle selected as the departing vehicle is identified as the transfer article, and the transfer article is stored in the first vehicle.

Appendix 5

The control device according to any one of appendices 2 to 4, wherein
the first vehicle arrives at a first receiving location that is the receiving location while further storing a third article,
the second vehicle arrives at the first receiving location further storing a fourth article,
the acquirer
further associates and acquires the identification information of the first vehicle, identification information identifying a second receiving location at which the third article and the fourth article are to be received, a scheduled arrival time of the first vehicle at the second receiving location, and a scheduled departure time of the first vehicle from the second receiving location, and
further associates and acquires the identification information of the second vehicle, the identification information of the second receiving location, a scheduled arrival time of the second vehicle at the second receiving location, and a scheduled departure time of the second vehicle from the second receiving location,
the storage controller identifies the fourth article stored in the second vehicle as the transfer article and causes the identified transfer article to be stored in the first vehicle at the first receiving location when a scheduled stay period of the first vehicle at the second receiving location, which is a period from the scheduled arrival time associated with the identification information of the first vehicle and the identification information of the second receiving location to the scheduled departure time, includes a scheduled stay period of the second vehicle at the second receiving location, which is a period from the scheduled arrival time associated with the identification information of the second vehicle and the identification information of the second receiving location to the scheduled departure time, and
the movement controller
causes the first vehicle to move to the second receiving location at which the third article and the fourth article are to be received, after the fourth article that is the transfer article is stored in the first vehicle in which the third article is stored.

Appendix 6

The control device according to appendix 5, wherein
when the scheduled stay period of the second vehicle at the second receiving location includes the scheduled stay period of the first vehicle at the second receiving location, the storage controller identifies the third article stored in the first vehicle as the transfer article, and causes the transfer article to be stored in the second vehicle at the first receiving location, and
the movement controller causes the second vehicle to move to the second receiving location at which the third article and the fourth article are to be received, after the third article that is the transfer article is stored in the second vehicle in which the fourth article is stored.

Appendix 7

The control device according to any one of appendices 2 to 6, further including:
a notifier that
outputs a notification informing that a time at which a receiving period of the second article ends is extended to the scheduled departure time associated with the identification information of the first vehicle when the first vehicle is selected as the remaining vehicle and the second article identified as the transfer article is stored in the first vehicle from the second vehicle selected as the departing vehicle, and
outputs a notification informing that a time at which a receiving period of the first article ends is extended to the scheduled departure time associated with the identification information of the second vehicle when the second vehicle is selected as the remaining vehicle and the first article identified as the transfer article is stored in the second vehicle from the first vehicle selected as the departing vehicle.

Appendix 8

The control device according to any one of appendices 1 to 7, wherein one or more of the first vehicle and the second vehicle is a ground vehicle that moves by traveling, or an aircraft that moves by flying in a sky.

Appendix 9

The control device according to any one of appendices 1 to 8, wherein one or more of the first vehicle and the second vehicle is an unmanned vehicle.

Appendix 10

A vehicle capable of storing an article, the vehicle including:
a selector that selects one of a first vehicle and a second vehicle as a remaining vehicle that stores a first article and a second article and that remains at a receiving location where the first article and the second article are to be received, and selects another of the first vehicle and the second vehicle as a departing vehicle that departs from the receiving location, when the second vehicle storing the second article arrives at the receiving location while the first vehicle storing the first article stays at the receiving location, or when the first vehicle arrives at the receiving location while the second vehicle is staying at the receiving location, the first vehicle being the vehicle and the second vehicle being a vehicle different than the first vehicle;
a storage controller that identifies the first article or the second article stored in the selected departing vehicle as a transfer article to be transferred from the departing vehicle to the remaining vehicle, and causes the identified transfer article to be stored in the remaining vehicle; and
a movement controller that causes the departing vehicle to depart from the receiving location when the transfer article is stored in the remaining vehicle.

Appendix 11

A system, including:
a first vehicle and a second vehicle that are capable of storing articles: and
a control device including
a selector that selects one of the first vehicle and the second vehicle as a remaining vehicle that stores a first article and a second article and that remains at a receiving location where the first article and the second article are to be received, and selects another of the first vehicle and the second vehicle as a departing vehicle that departs from the receiving location, when the second vehicle storing the second article arrives at the receiving location while the first vehicle storing the first article stays at the receiving location,
a storage controller that identifies the first article or the second article stored in the selected departing vehicle as a transfer article to be transferred from the departing vehicle to the remaining vehicle, and causes the identified transfer article to be stored in the remaining vehicle, and
a movement controller that causes the departing vehicle to depart from the receiving location when the transfer article is stored in the remaining vehicle.

Appendix 12
A method, including:
one or a plurality of computers
selecting one of a first vehicle and a second vehicle as a remaining vehicle that stores a first article and a second article and that remains at a receiving location where the first article and the second article are to be received, and selecting another of the first vehicle and the second vehicle as a departing vehicle that departs from the receiving location, when the second vehicle storing the second article arrives at the receiving location while the first vehicle storing the first article stays at the receiving location;
identifying the first article or the second article stored in the selected departing vehicle as a transfer article to be transferred from the departing vehicle to the remaining vehicle, and causing the identified transfer article to be stored in the remaining vehicle; and
causing the departing vehicle to depart from the receiving location when the transfer article is stored in the remaining vehicle.

REFERENCE SIGNS LIST

1 Delivery system
100 First vehicle
110 Chassis
111, 112 Wheel
119, 150, 181, 182, 351 Imaging device
140 Robot arm
141 Gripper
142 Arm
160, 260, 360 Storage box
161 Box body
161$a$ Back plate
161$b$ Bottom plate
161$c$ Ceiling plate
161$d$, 161$e$ Side plate
162, 262 Door
162$a$ Protrusion
162$b$ Deadbolt 162c Top surface
162d Bottom surface
163 Door frame
163a Shaft hole
164 Slide plate
165 Expansion/contraction mechanism
170, 270, 370 Locker device
190, 290, 310, 500 Control device
191, 501 CPU
192, 502 RAM
193a, 503a ROM
193b Flash memory
194a First data communication circuit
194b Second data communication circuit
195 Touch screen
195a, 505a Video card
195b, 505b Display device
195c, 505c Input device
196 GPS circuit
198 Input/output port
199 Drive circuit
200, 300 Second vehicle
321 to 324 Propeller arm
331 to 334 Propeller
343 Support leg
901 to 905 Mobile terminal
503b Hard disk
504a Data communication circuit
510 Acquirer
520 Storer
530 Schedule generator
540, 940 Movement controller
550, 950 Selector
560, 960 Storage controller
570, 970 Changer
580, 980 Notifier
590, 990 Information storage unit
IN Internet

The invention claimed is:

1. A control device, comprising:
at least one memory storing program code; and
at least one processor operable to read the program code and operate as instructed by the program code, wherein the program code includes:
selection code configured to cause the at least one processor to select one of a first vehicle and a second vehicle as a remaining vehicle that stores a first article and a second article and that remains at a receiving location where the first article and the second article are to be received by a recipient, and select another of the first vehicle and the second vehicle as a departing vehicle that departs from the receiving location, when the second vehicle storing the second article arrives at the receiving location while the first vehicle storing the first article stays at the receiving location;
storage control code configured to cause the at least one processor to identify the first article or the second article stored in the selected departing vehicle as a transfer article to be transferred from the departing vehicle to the remaining vehicle, and perform control to cause the identified transfer article to be stored in the remaining vehicle; and
movement control code configured to cause the at least one processor to perform control to cause the departing vehicle to depart from the receiving location when the transfer article is stored in the remaining vehicle.

2. The control device according to claim 1, wherein the program code further includes acquiring code configured to cause the at least one processor to associate and acquire identification information identifying the first vehicle and a scheduled departure time that is a time at which the first vehicle is scheduled to depart from the receiving location, and
associate and acquire identification information identifying the second vehicle and a
scheduled departure time that is a time at which the second vehicle is scheduled to depart from the receiving location, and
the selection code is configured to cause the at least one processor to select the first vehicle as the remaining vehicle and select the second vehicle as the departing vehicle when the scheduled departure time associated with the identification information of the first vehicle is later than the scheduled departure time associated with the identification information of the second vehicle, and
select the first vehicle as the departing vehicle and select the second vehicle as the
remaining vehicle when the scheduled departure time associated with the identification information of the first vehicle is earlier than the scheduled departure time associated with the identification information of the second vehicle.

3. The control device according to claim 2, wherein
the movement control code is configured to cause the at least one processor to perform
control to cause the first vehicle to stay at the receiving location when the first vehicle arrives at the receiving location,
control to cause the second vehicle to stay at the receiving location when the second vehicle arrives at the receiving location, and
the control to cause the first vehicle to depart from the receiving location at a time earlier than the scheduled departure time acquired in association with the identification information of the first vehicle when the second vehicle is selected as the remaining vehicle, the first article stored in the first vehicle selected as the departing vehicle is identified as the transfer article, and the transfer article is stored in the second vehicle.

4. The control device according to claim 3, wherein the movement code is configured to perform the control to cause the second vehicle to depart from the receiving location at a time earlier than the scheduled departure time acquired in association with the identification information of the second vehicle when the first vehicle is selected as the remaining vehicle, the second article stored in the second vehicle selected as the departing vehicle is identified as the transfer article, and the transfer article is stored in the first vehicle.

5. The control device according to claim 4, wherein
the first vehicle is configured to arrive at a first receiving location that is the receiving location while further storing a third article,
the second vehicle is configured to arrive at the first receiving location further storing a fourth article,
the acquiring code is configured to cause the at least one processor to
further associate and acquire the identification information of the first vehicle, identification information identifying a second receiving location at which the third article and the fourth article are to be received, a scheduled arrival time of the first vehicle at the second receiving location, and a scheduled departure time of the first vehicle from the second receiving location, and further associate and acquire the identification information of the second vehicle, the identification information of the second receiving location, a scheduled arrival time of the second vehicle at the second receiving location, and a scheduled departure time of the second vehicle from the second receiving location, the storage control code is configured to cause the at least one processor to identify the fourth article stored in the second vehicle as the transfer article and causes the identified transfer article to be stored in the first vehicle at the first receiving location when a scheduled stay period of the first vehicle at the second receiving location, which is a period from the scheduled arrival time associated with the identification information of the first vehicle and the identification information of the second receiving location to the scheduled departure time, includes a scheduled stay period of the second vehicle at the second receiving location, which is a period from the scheduled arrival time associated with the identification information of the second vehicle and the identification information of the second receiving location to the scheduled departure time, and the movement control code is configured to cause the at least one processor to perform control to cause the first vehicle to move to the second receiving location at which the third article and the fourth article are to be received, after the fourth article that is the transfer article is stored in the first vehicle in which the third article is stored.

6. The control device according to claim 4, wherein
the program code further includes notification code configured to cause the at least one processor to output a notification informing that a time at which a receiving period of the second article ends is extended to the scheduled departure time associated with the identification information of the first vehicle when the first vehicle is selected as the remaining vehicle and the second article identified as the transfer article is stored in the first vehicle from the second vehicle selected as the departing vehicle, and output a notification informing that a time at which a receiving period of the first article ends is extended to the scheduled departure time associated with the identification information of the second vehicle when the second vehicle is selected as the remaining vehicle and the first article identified as the transfer article is stored in the second vehicle from the first vehicle selected as the departing vehicle.

7. The control device according to claim 4, wherein one or more of the first vehicle and the second vehicle is a ground vehicle that moves by traveling on a ground, or an aircraft that moves by flying in a sky.

8. The control device according to claim 3, wherein
the first vehicle is configured to arrive at a first receiving location that is the receiving location while further storing a third article,
the second vehicle is configured to arrive at the first receiving location further storing a fourth article,
the acquiring code is configured to cause the at least one processor to
further associate and acquire the identification information of the first vehicle, identification information identifying a second receiving location at which the third article and the fourth article are to be received, a scheduled arrival time of the first vehicle at the second receiving location, and a scheduled departure time of the first vehicle from the second receiving location, and further associate and acquire the identification information of the second vehicle, the identification information of the second receiving location, a scheduled arrival time of the second vehicle at the second receiving location, and a scheduled departure time of the second vehicle from the second receiving location, the storage control code is configured to cause the at least one processor to identify the fourth article stored in the second vehicle as the transfer article and causes the identified transfer article to be stored in the first vehicle at the first receiving location when a scheduled stay period of the first vehicle at the second receiving location, which is a period from the scheduled arrival time associated with the identification information of the first vehicle and the identification information of the second receiving location to the scheduled departure time, includes a scheduled stay period of the second vehicle at the second receiving location, which is a period from the scheduled arrival time associated with the identification information of the second vehicle and the identification information of the second receiving location to the scheduled departure time, and the movement control code is configured to cause the at least one processor to perform control to cause the first vehicle to move to the second receiving location at which the third article and the fourth article are to be received, after the fourth article that is the transfer article is stored in the first vehicle in which the third article is stored.

9. The control device according to claim 3, wherein
the program code further includes notification code configured to cause the at least one processor to output a notification informing that a time at which a receiving period of the second article ends is extended to the scheduled departure time associated with the identification information of the first vehicle when the first vehicle is selected as the remaining vehicle and the second article identified as the transfer article is stored in the first vehicle from the second vehicle selected as the departing vehicle, and output a notification informing that a time at which a receiving period of the first article ends is extended to the scheduled departure time associated with the identification information of the second vehicle when the second vehicle is selected as the remaining vehicle and the first article identified as the transfer article is stored in the second vehicle from the first vehicle selected as the departing vehicle.

10. The control device according to claim 3, wherein one or more of the first vehicle and the second vehicle is a ground vehicle that moves by traveling on a ground, or an aircraft that moves by flying in a sky.

11. The control device according to claim 2, wherein
the first vehicle is configured to arrive at a first receiving location that is the receiving location while further storing a third article,
the second vehicle is configured to arrive at the first receiving location further storing a fourth article,
the acquiring code is configured to cause the at least one processor to
further associate and acquire the identification information of the first vehicle, identification information identifying a second receiving location at which the third article and the fourth article are to be received, a scheduled arrival time of the first vehicle at the second receiving location, and a scheduled departure time of the first vehicle from the second receiving location, and further associate and acquire the identification information of the second vehicle, the identification information of the second receiving location, a scheduled arrival time of the second vehicle at the second receiving location, and a scheduled departure time of the second vehicle from the second receiving location, the storage control code is configured to cause the at least one processor to identify the fourth article stored in the second vehicle as the transfer article and causes the identified transfer article to be stored in the first vehicle at the first receiving location when a scheduled stay period of the first vehicle at the second receiving location, which is a period from the scheduled arrival time associated with the identification information of the first vehicle and the identification information of the second receiving location to the scheduled departure time, includes a scheduled stay period of the second vehicle at the second receiving location, which is a period from the scheduled arrival time associated with the identification information of the second vehicle and the identification information of the second receiving location to the scheduled departure time, and the movement control code is configured to cause the at least one processor to perform control to cause the first vehicle to move to the second receiving location at which the third article and the fourth article are to be received, after the fourth article that is the transfer article is stored in the first vehicle in which the third article is stored.

12. The control device according to claim 11, wherein when the scheduled stay period of the second vehicle at the second receiving location includes the scheduled stay period of the first vehicle at the second receiving location, the storage control code is configured to cause the at least one processor to identify the third article stored in the first vehicle as the transfer article, and causes the transfer article to be stored in the second vehicle at the first receiving location, and the movement control code is configured to cause the at least one processor to perform control to cause the second vehicle to move to the second receiving location at which the third article and the fourth article are to be received, after the third article that is the transfer article is stored in the second vehicle in which the fourth article is stored.

13. The control device according to claim 12, wherein the program code further includes notification code configured to cause the at least one processor to output a notification informing that a time at which a receiving period of the second article ends is extended to the scheduled departure time associated with the identification information of the first vehicle when the first vehicle is selected as the remaining vehicle and the second article identified as the transfer article is stored in the first vehicle from the second vehicle selected as the departing vehicle, and output a notification informing that a time at which a receiving period of the first article ends is extended to the scheduled departure time associated with the identification information of the second vehicle when the second vehicle is selected as the remaining vehicle and the first article identified as the transfer article is stored in the second vehicle from the first vehicle selected as the departing vehicle.

14. The control device according to claim 11, wherein the program code further includes notification code configured to cause the at least one processor to output a notification informing that a time at which a receiving period of the second article ends is extended to the scheduled departure time associated with the identification information of the first vehicle when the first vehicle is selected as the remaining vehicle and the second article identified as the transfer article is stored in the first vehicle from the second vehicle selected as the departing vehicle, and output a notification informing that a time at which a receiving period of the first article ends is extended to the scheduled departure time associated with the identification information of the second vehicle when the second vehicle is selected as the remaining vehicle and the first article identified as the transfer article is stored in the second vehicle from the first vehicle selected as the departing vehicle.

15. The control device according to claim 2, wherein the program code further includes notification code configured to cause the at least one processor to output a notification informing that a time at which a receiving period of the second article ends is extended to the scheduled departure time associated with the identification information of the first vehicle when the first vehicle is selected as the remaining vehicle and the second article identified as the transfer article is stored in the first vehicle from the second vehicle selected as the departing vehicle, and output a notification informing that a time at which a receiving period of the first article ends is extended to the scheduled departure time associated with the identification information of the second vehicle when the second vehicle is selected as the remaining vehicle and the first article identified as the transfer article is stored in the second vehicle from the first vehicle selected as the departing vehicle.

16. The control device according to claim 2, wherein one or more of the first vehicle and the second vehicle is a ground vehicle that moves by traveling on a ground, or an aircraft that moves by flying in a sky.

17. The control device according to claim 1, wherein one or more of the first vehicle and the second vehicle is a ground vehicle that moves by traveling on a ground, or an aircraft that moves by flying in a sky.

18. The control device according to claim 1, wherein one or more of the first vehicle and the second vehicle is an unmanned vehicle.

19. A system, comprising:

a first vehicle and a second vehicle that are capable of storing articles; and a control device including at least one memory storing program code, and at least one processor operable to read the program code and operate as instructed by the program code, wherein the program code includes:

selection code configured to cause the at least one processor to select one of the first vehicle and the second vehicle as a remaining vehicle that stores a first article and a second article and that remains at a receiving location where the first article and the second article are to be received by a recipient, and select another of the first vehicle and the second vehicle as a departing vehicle that departs from the receiving location, when the second vehicle storing the second article arrives at the receiving location while the first vehicle storing the first article stays at the receiving location;

storage control code configured to cause the at least one processor to identify the first article or the second article stored in the selected departing vehicle as a transfer article to be transferred from the departing vehicle to the remaining vehicle, and perform control to cause the identified transfer article to be stored in the remaining vehicle; and movement control code configured to cause the at least one processor to perform control to cause the departing vehicle to depart from the receiving location when the transfer article is stored in the remaining vehicle.

20. A method, comprising:

one or a plurality of computers selecting one of a first vehicle and a second vehicle as a remaining vehicle that stores a first article and a second article and that remains at a receiving location where the first article and the second article are to be received by a recipient, and selecting another of the first vehicle and the second vehicle as a departing vehicle that departs from the receiving location, when the second vehicle storing the second article arrives at the receiving location while the first vehicle storing the first article stays at the receiving location;

identifying the first article or the second article stored in the selected departing vehicle as a transfer article to be transferred from the departing vehicle to the remaining vehicle, and causing the identified transfer article to be stored in the remaining vehicle; and causing the departing vehicle to depart from the receiving location when the transfer article is stored in the remaining vehicle.

* * * * *